United States Patent
Hayes et al.

(10) Patent No.: US 7,102,688 B2
(45) Date of Patent: Sep. 5, 2006

(54) SYSTEM AND METHOD FOR USING A HAND HELD DEVICE TO DISPLAY A READABLE REPRESENTATION OF AN AUDIO TRACK

(75) Inventors: Patrick H. Hayes, Mission Viejo, CA (US); Steve LanPing Huang, Placentia, CA (US); Joyce M. Presseau, Laguna Beach, CA (US)

(73) Assignee: Universal Electronics Inc., Cypress, CA (US)

( * ) Notice: Subject to any disclaimer, the term of this patent is extended or adjusted under 35 U.S.C. 154(b) by 784 days.

(21) Appl. No.: 09/905,432

(22) Filed: Jul. 13, 2001

(65) Prior Publication Data

US 2002/0140855 A1    Oct. 3, 2002

Related U.S. Application Data

(60) Provisional application No. 60/264,767, filed on Jan. 29, 2001.

(51) Int. Cl.
*H04N 7/00*    (2006.01)
(52) U.S. Cl. .................................................. 348/465
(58) Field of Classification Search ................ 348/465, 348/468, 553, 564, 734; 704/270, 277, 235
See application file for complete search history.

(56) References Cited

U.S. PATENT DOCUMENTS

| | | | |
|---|---|---|---|
| 4,837,414 A | 6/1989 | Edamula | |
| 4,894,789 A | 1/1990 | Yee | |
| 5,005,084 A | 4/1991 | Skinner | |
| 5,307,055 A | 4/1994 | Baskin et al. | |
| 5,410,326 A | 4/1995 | Goldstein | |
| 5,561,849 A * | 10/1996 | Mankovitz | 455/45 |
| 5,574,964 A | 11/1996 | Hamlin | |
| 5,625,608 A * | 4/1997 | Grewe et al. | 369/24.01 |
| 5,648,760 A | 7/1997 | Kumar | |
| 5,671,267 A | 9/1997 | August et al. | |
| 5,710,605 A | 1/1998 | Nelson | |
| 5,724,106 A | 3/1998 | Autry et al. | |
| 5,761,606 A | 6/1998 | Wolzien | |
| 5,810,598 A * | 9/1998 | Wakamoto | 434/156 |
| 5,835,864 A | 11/1998 | Diehl et al. | |
| 5,884,056 A * | 3/1999 | Steele | 715/738 |
| 5,901,366 A | 5/1999 | Nakano et al. | |
| 5,953,005 A * | 9/1999 | Liu | 715/500.1 |

(Continued)

FOREIGN PATENT DOCUMENTS

EP    0561435 A2    9/1993

(Continued)

OTHER PUBLICATIONS

PRONTO User Guide, Universal Electronics Inc., 1999, pp. 1-56.

*Primary Examiner*—Paulos M. Natnael
(74) *Attorney, Agent, or Firm*—Gary R. Jarosik

(57) ABSTRACT

A system and method for using a hand held device having a display to display a readable representation of an audio track of a playing media such as, for example, a television program, a compact disc, or digital video disc. In one embodiment, the system generally includes a consumer appliance for playing the media wherein the consumer appliance is adapted to transmit a signal including data that is a representation of the audio track. In a further embodiment, the representation of the audio track can be downloaded to the hand-held device from an external source such as, for example, a Web site on the Internet.

15 Claims, 38 Drawing Sheets

U.S. PATENT DOCUMENTS

| | | | |
|---|---|---|---|
| 6,002,450 A | 12/1999 | Darbee et al. | |
| 6,040,829 A | 3/2000 | Croy et al. | |
| 6,097,441 A * | 8/2000 | Allport | 348/552 |
| 6,104,334 A * | 8/2000 | Allport | 341/175 |
| 6,127,941 A | 10/2000 | Van Ryzin | |
| 6,130,726 A | 10/2000 | Darbee et al. | |
| 6,195,589 B1 | 2/2001 | Ketcham | |
| 6,256,019 B1 | 7/2001 | Allport | |
| 6,278,499 B1 | 8/2001 | Darbee et al. | |
| 6,285,357 B1 | 9/2001 | Kushiro et al. | |
| 6,328,570 B1 * | 12/2001 | Ng | 434/307 A |
| 6,360,234 B1 * | 3/2002 | Jain et al. | 715/500.1 |
| 6,476,871 B1 * | 11/2002 | Fu | 348/465 |
| 6,496,927 B1 | 12/2002 | McGrane et al. | |
| 6,567,984 B1 * | 5/2003 | Allport | 725/110 |
| 6,572,381 B1 * | 6/2003 | Tsai | 434/307 A |
| 6,584,496 B1 | 6/2003 | Ludtke | |
| 6,903,779 B1 * | 6/2005 | Dyer | 348/465 |
| 2002/0075403 A1 * | 6/2002 | Barone et al. | 348/461 |

FOREIGN PATENT DOCUMENTS

| | | | |
|---|---|---|---|
| EP | 0838768 A2 | 4/1998 | |
| EP | 0967797 A2 | 12/1999 | |
| EP | 0987888 A1 | 3/2000 | |
| EP | 1198069 A1 | 4/2002 | |
| EP | 1204275 A2 | 5/2002 | |
| GB | 2343073 A | 4/2000 | |
| JP | 10282982 | * | 10/1998 |
| JP | 1031997 | * | 12/1998 |
| WO | WO 00/40016 | 7/2000 | |
| WO | WO 00/58935 | 10/2000 | |
| WO | WO 01/20572 A1 | 3/2001 | |
| WO | WO 01/39150 A2 | 5/2001 | |
| WO | WO 01/69567 A2 | 9/2001 | |

* cited by examiner

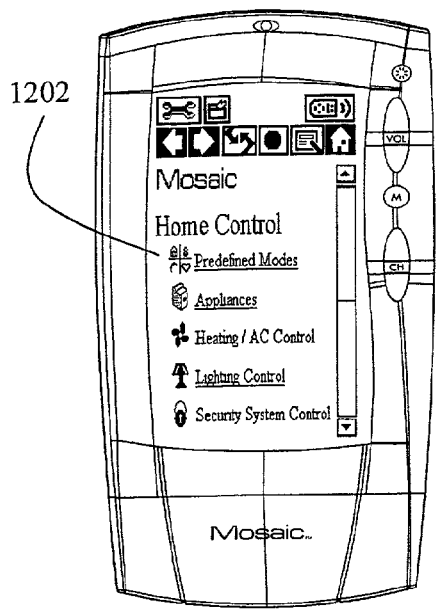

```
<!DOCTYPE HTML PUBLIC "-//W3C//DTD HTML 4.0 Transitional//EN">
<HTML><HEAD><TITLE>Home Manager</TITLE>
<META content="text/html; charset=windows-1252" http-equiv=Content-Type>
<META content="MSHTML 5.00.3207.2500" name=GENERATOR></HEAD>
<BODY leftMargin=0 link=#000000 text=#000000 topMargin=0 #000000?
marginheight="0" marginwidth="0"><A
href="index.htm"><IMG border=0 height=30
src="index_files/mosaic.gif" width=62></A> <BR><FONT
size=+2>Home Control</FONT>(tm)
<TABLE border=0 cellSpacing=1>
 <TBODY>
 <TR>
  <TD width=10>
  <TD><A href="modes.htm"><IMG border=0
    height=25 src="index_files/modesgif" width=25></A> </TD>
  <TD><A href="modes.htm">Predefined Modes</A>
  </TD></TR>
 <TR>
  <TD width=10>
  <TD><A href="appliances.htm"><IMG border=0
    height=25 src="index_files/Appliancesgif" width=25></A> </TD>
  <TD><A href="appliances.htm">Appliances</A>
  </TD></TR>
 <TR>
  <TD width=10>
  <TD><A href="hvac.htm"><IMG border=0
    height=25 src="index_files/hvacgif" width=25></A> </TD>
  <TD>Heating / AC
    Control</TD></TR>
 <TR>
  <TD width=10>
  <TD><A href="lighting.htm"><IMG border=0
    height=25 src="index_files/lighting.gif" width=25></A> </TD>
  <TD><A href="lighting.htm">Lighting
    Control</A> </TD></TR>
 <TR>
  <TD width=10>
  <TD><A href="security.htm"><IMG border=0
    height=25 src="index_files/Securitygif" width=25></A> </TD>
  <TD>Security System
    Control</TD></TR></TBODY></TABLE></BODY></HTML>
```

Figure 12

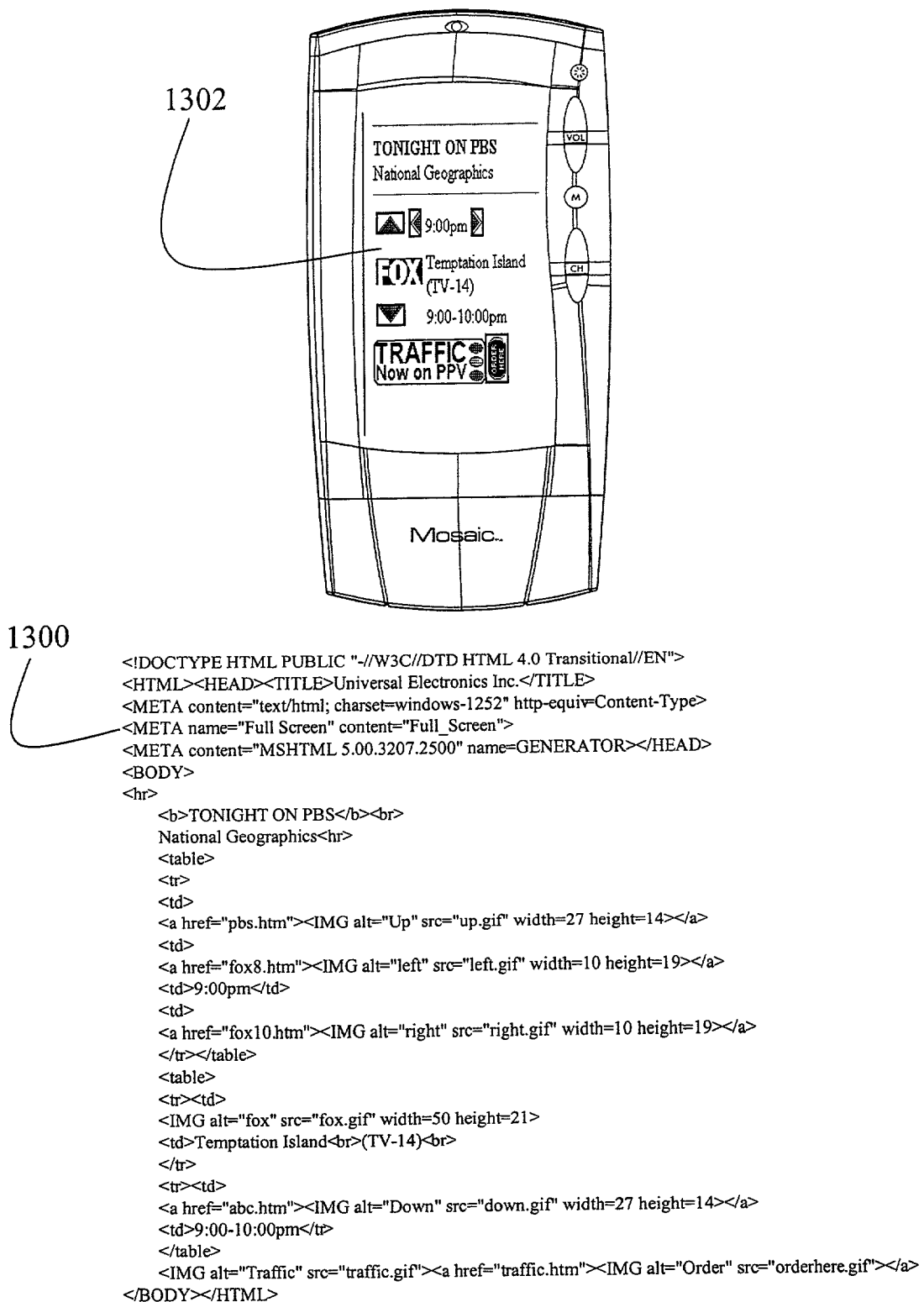

1302

1300

```
<!DOCTYPE HTML PUBLIC "-//W3C//DTD HTML 4.0 Transitional//EN">
<HTML><HEAD><TITLE>Universal Electronics Inc.</TITLE>
<META content="text/html; charset=windows-1252" http-equiv=Content-Type>
<META name="Full Screen" content="Full_Screen">
<META content="MSHTML 5.00.3207.2500" name=GENERATOR></HEAD>
<BODY>
<hr>
    <b>TONIGHT ON PBS</b><br>
    National Geographics<hr>
    <table>
    <tr>
    <td>
    <a href="pbs.htm"><IMG alt="Up" src="up.gif" width=27 height=14></a>
    <td>
    <a href="fox8.htm"><IMG alt="left" src="left.gif" width=10 height=19></a>
    <td>9:00pm</td>
    <td>
    <a href="fox10.htm"><IMG alt="right" src="right.gif" width=10 height=19></a>
    </tr></table>
    <table>
    <tr><td>
    <IMG alt="fox" src="fox.gif" width=50 height=21>
    <td>Temptation Island<br>(TV-14)<br>
    </tr>
    <tr><td>
    <a href="abc.htm"><IMG alt="Down" src="down.gif" width=27 height=14></a>
    <td>9:00-10:00pm</tr>
    </table>
    <IMG alt="Traffic" src="traffic.gif"><a href="traffic.htm"><IMG alt="Order" src="orderhere.gif"></a>
</BODY></HTML>
```

Figure 13

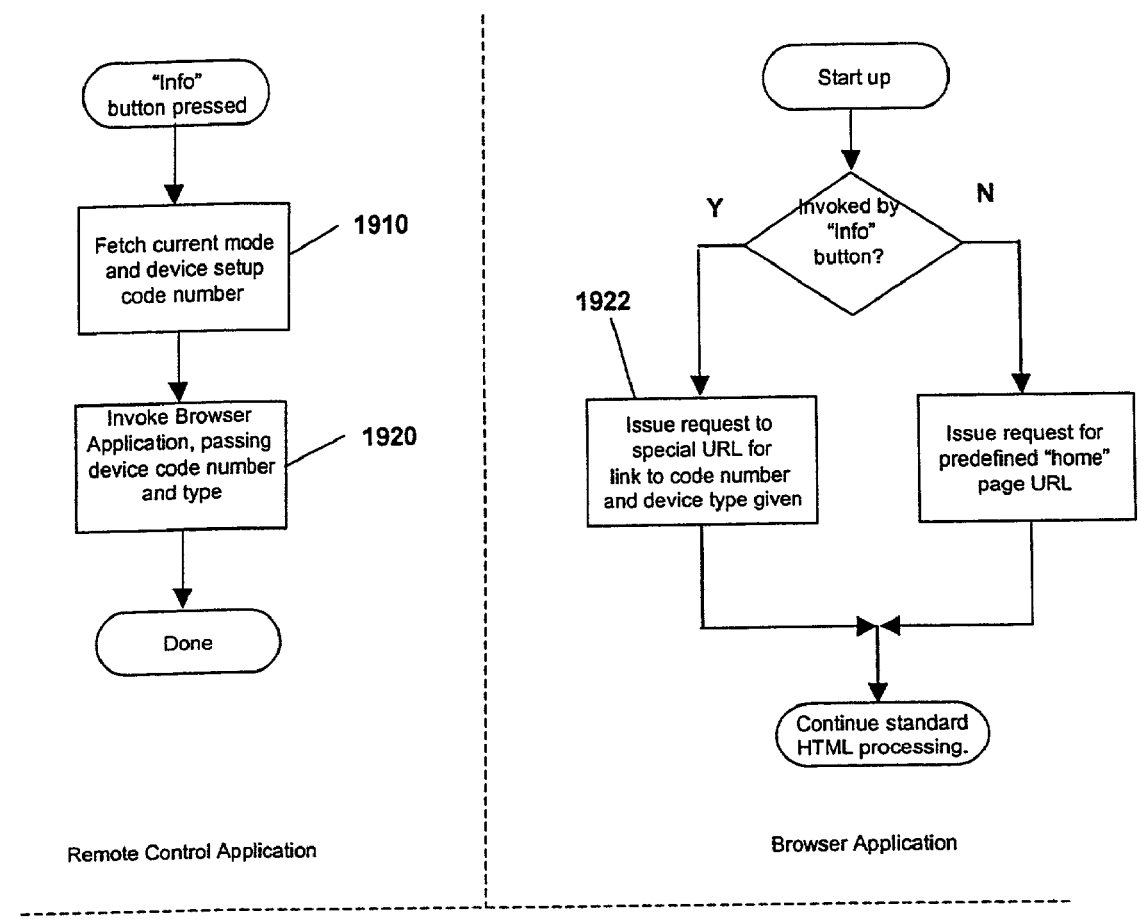
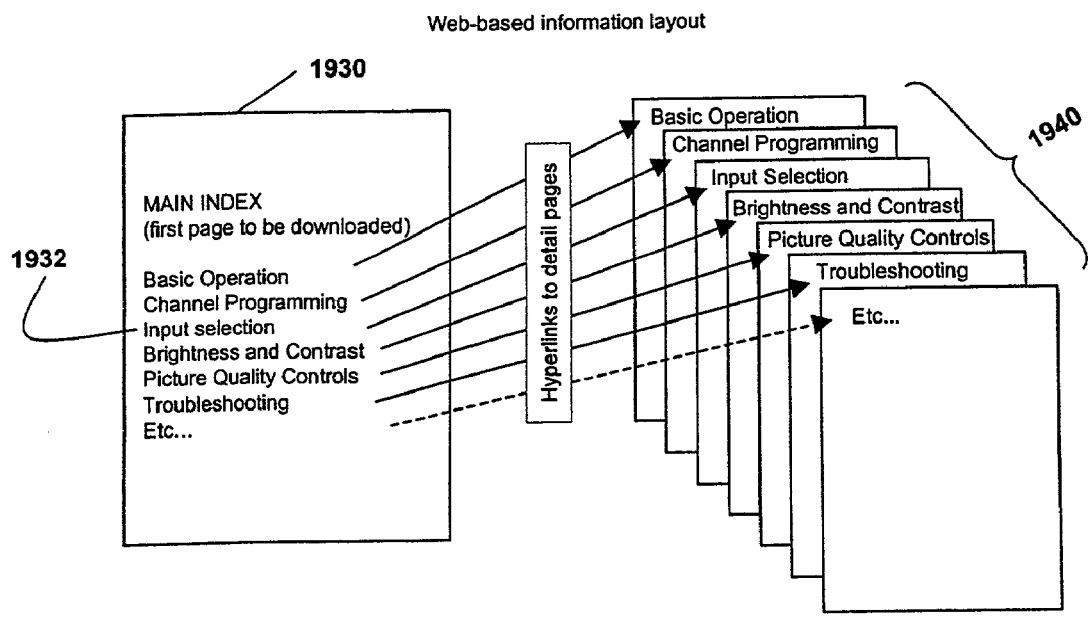
Figure 19(a)

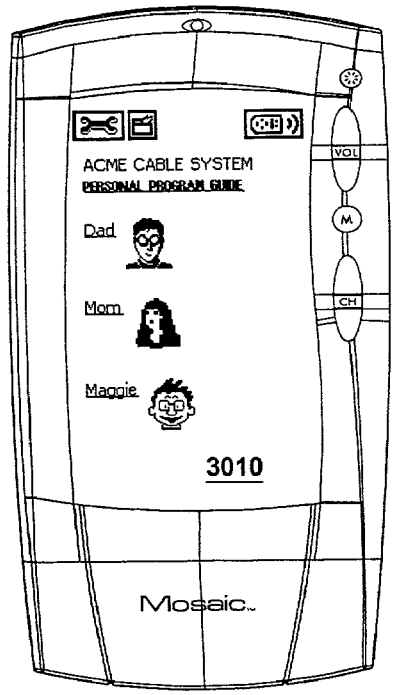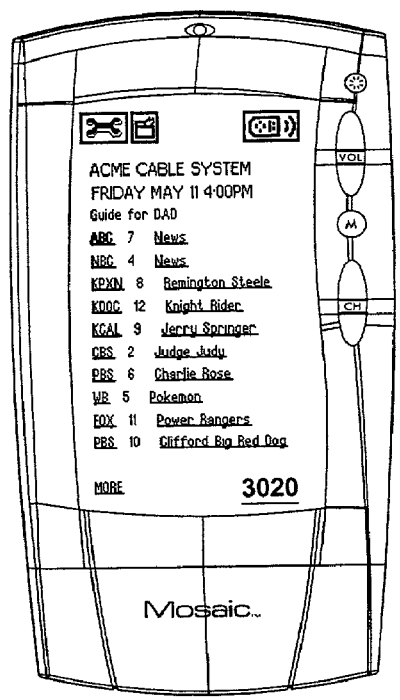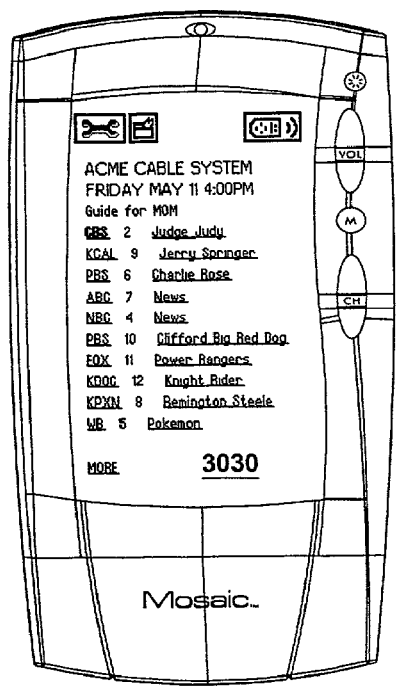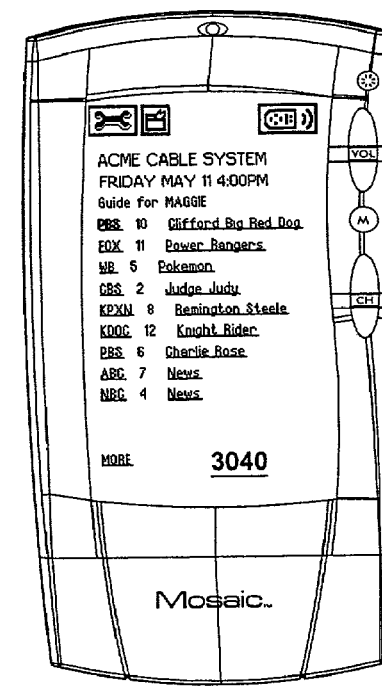
FIGURE 30

US 7,102,688 B2

SYSTEM AND METHOD FOR USING A HAND HELD DEVICE TO DISPLAY A READABLE REPRESENTATION OF AN AUDIO TRACK

RELATED APPLICATION

This application claims the benefit of U.S. Provisional Patent Application No. 60/264,767 filed on Jan. 29, 2001.

BACKGROUND OF THE INVENTION

This invention relates generally to hand held devices and, more particularly, relates to a hand held device on which a readable representation of an audio track can be displayed.

Home appliances continue to become more complex, and for many consumers, more difficult to fully understand and operate. The first consumer electronic devices, radios and, later, televisions, had no remote controls. The controls of these first consumer electronic devices were simple—a combination power switch and volume control and a tuning control. With the advent of the remote control, new capabilities to control were added to consumer electronic devices—one of the first being the volume "Mute" feature.

New, and eventually popular, consumer electronic devices were later introduced, including the VCR, CD player and more recently, the DVD player and PVR (personal video recorder). While the VCR was initially introduced without a remote control, remote controls were quickly added to the product offering. Early VCR remote controls simply controlled the power and the transport mechanism ("Play," "Stop," "Pause," "Rewind," "Fast Forward" and "Record"). Today, VCR remote controls have far more controls, for example, to control the adjustment of tape tracking, the selection of programs for future recording, direct channel access, frame-by-frame program viewing and the ability to set the VCR's clock. For use in controlling these features the VCR remote control has grown from seven or eight keys to twenty or more.

The CD player, when first introduced, came with a remote control. The first CD players held a single disk and were easy to control. Today, a consumer can buy a CD player that holds two hundred or more disks. This CD "jukebox" permits the consumer to painstakingly enter the title of each disk by remote control and control which disk and track of that disk will play next. This remote control has also grown from ten keys or so to over thirty with many keys performing two or more functions.

Not only have the consumer electronic devices and their remote controls become more complex, but there are now many more devices that consumers are adding to their home that can be controlled using a remote control. In addition to the TV, VCR, CD player, and DVD player, remote controls can be used in connection with personal computers, game consoles, etc. Remote controls can also be used to control the lighting, window fixtures, thermostats, home alarm system, etc. within the home.

Universal remote controls available today perform a valuable function, consolidating three, four, five, and more remote controls into one device. Typically, the universal remote control simplifies operation by reducing the number of keys and, therefore, the number of features available to the consumer. With the same number of keys as found on one remote control, the universal remote control can operate the basic functions of several home appliances.

For companies that provide remote controls, home appliances continue their march toward even greater complexity. As new and more complex home appliances emerge, a new form of easy-to-use remote control will be required to meet the needs of consumers. To appeal to the largest number of consumers, this new form of remote control must also be inexpensive. Furthermore, to accommodate the continuing growth in complexity of home appliances, this new form of remote control must possess new features and include the ability to stay flexible.

SUMMARY OF THE INVENTION

In accordance with these needs, the subject invention is directed to a system and method for using a hand held device having a display to display a readable representation of an audio track of a playing media such as, for example, a television program, a compact disc, or digital video disc. In one embodiment, the system generally includes a consumer appliance for playing the media wherein the consumer appliance is adapted to transmit a signal including data that is a representation of the audio track. In a further embodiment, the representation of the audio track can be downloaded to the hand-held device from an external source such as, for example, a Web site on the Internet.

A better understanding of the objects, advantages, features, properties and relationships of the invention will be obtained from the following detailed description and accompanying drawings which set forth an illustrative embodiment which is indicative of the various ways in which the principles of the invention may be employed.

BRIEF DESCRIPTION OF THE DRAWINGS

For a better understanding of the invention, reference may be had to a preferred embodiment shown in the following drawings in which:

FIG. 12 illustrates an exemplary browser-based home control screen displayed on the universal remote control of FIG. 1 and the HTML source for use in displaying the control screen;

FIG. 13 illustrates an exemplary browser-based TV guide screen displayed on the universal remote control of FIG. 1 and the HTML source for use in displaying the TV guide screen;

FIGS. 19a and 19b illustrate a further exemplary method by which the remote control illustrated in FIG. 1 can be used to retrieve information regarding an appliance and the resulting display of an exemplary retrieved user's manual;

FIG. 30 illustrates an exemplary display of screens used to display TV guide information ordered according to individual preference.

DETAILED DESCRIPTION

Figure 1:
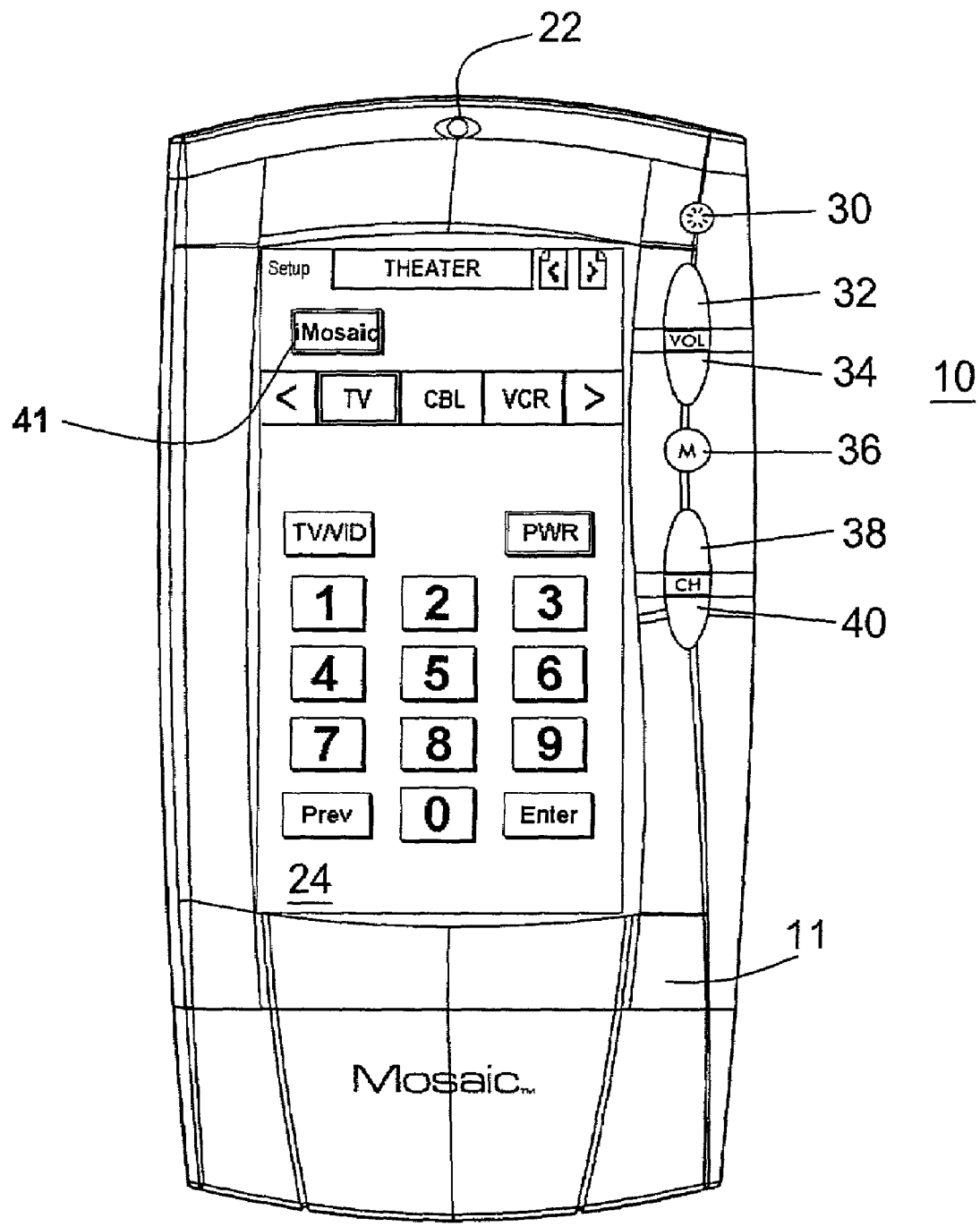
FIG. 1 illustrates a pictorial drawing of a universal remote control in which the principles of the subject invention may be embodied.
Figure 2:
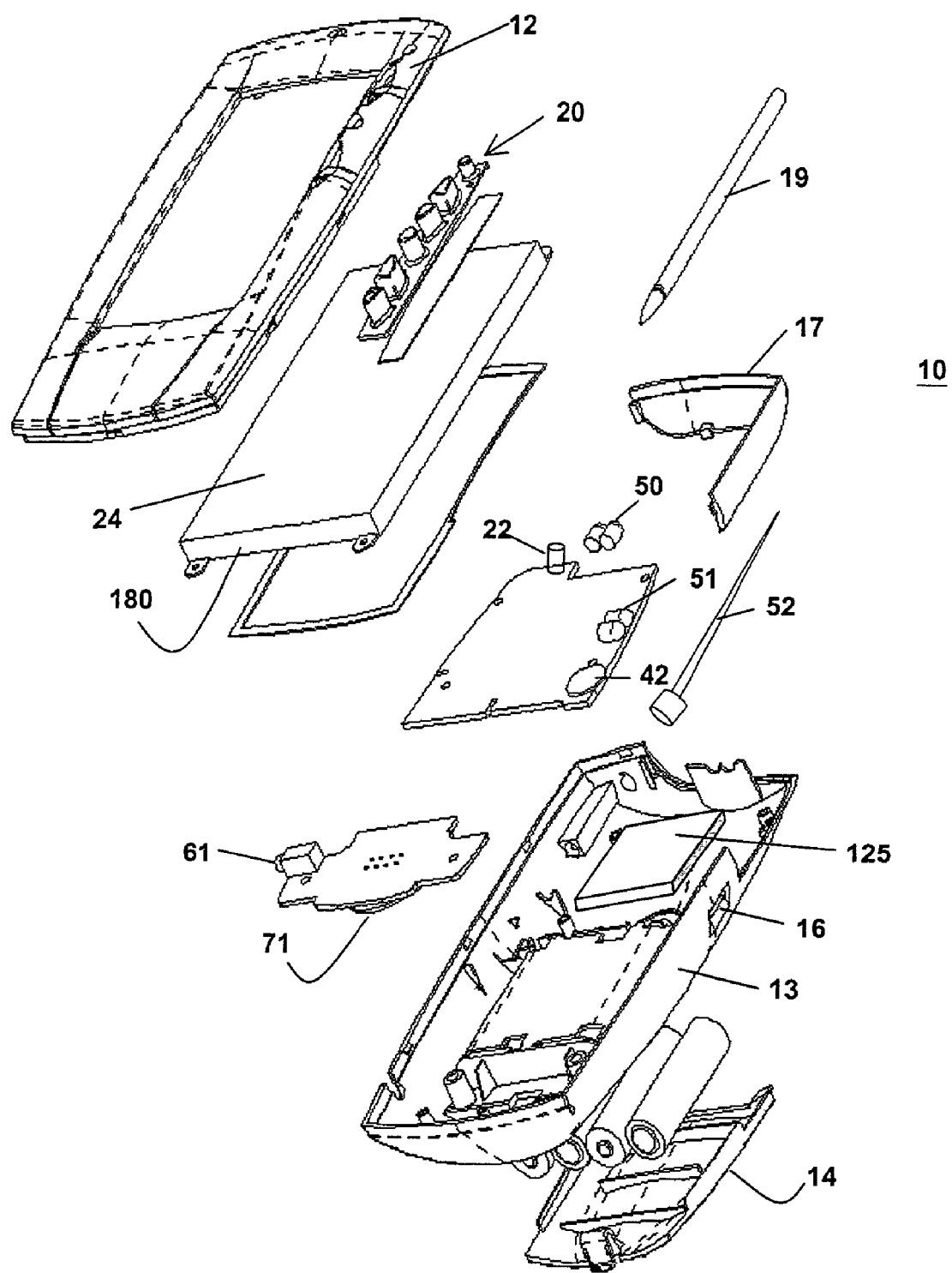
FIG. 2 illustrates an exploded assembly drawing of the universal remote control illustrated in FIG. 1.

Referring now to FIGS. 1 and 2, there is illustrated a universal remote control device 10, sometimes referred to as the "Mosaic" in the figures, in which the teachings of the present invention may be embodied. The remote control 10 comprises a housing 11 itself comprising two parts, namely, an upper housing 12 and a lower housing 13. Included in the lower housing 12 is a battery cover 14, a stylus repository, and a slot 16 through which a liquid crystal display (LCD) contrast control switch 42 may be accessed. Stylus 19 may be located in the stylus repository.

The upper housing 12 has openings through which keys 20, red light emitting diode (LED) 22 and a LCD 24 with a translucent touch sensitive overlay can be accessed. The keys 20 are illustrated as being arranged in a vertical line to the right of the LCD 24 and may comprise (from top to bottom) a "Backlight" key 30, "Volume Up" and "Volume Down" keys 32 and 34, "Mute" key 36, and "Channel Up" and "Channel Down" keys 38 and 40, respectively. The contrast control switch 42 can be located on the right side of the remote control 10 below the "Volume Up" and "Volume Down" keys, 38 and 40. The upper housing 12 may also include an opening for voice access to a microphone.

At the top or forward end of the remote control 10, there is illustrated an opening for two forward facing infrared LEDs 50 and two side facing LEDs 51. While the LEDs are provided for transmitting command signals to consumer devices, the forward facing LEDs 50 may also perform as an infrared light detector according to the teachings of co-pending U.S. patent application Ser. No. 09/080,125 which is incorporated herein by reference in its entirety. The opening in which the LEDs 50 and 51 are carried may be covered by an infrared-transparent lens 17. The forward end of the remote control 10 may also include an opening for an RF antenna 52. On the underneath portion of the remote control 10 are located openings for a battery compartment 58 and, optionally, a speaker, and/or battery charging contacts. On the left side of the remote control 10 can be placed a jack 61 reserved for serial data operations. In certain embodiments, a magnetic modem coupler 71, as described in U.S. Pat. No. 5,537,463 which is incorporated herein by reference in its entirety, can be included to permit transfer of data into the unit via a telephone handset or other source of magnetically encoded signal such as television or P.C. loudspeakers.

Figure 3:
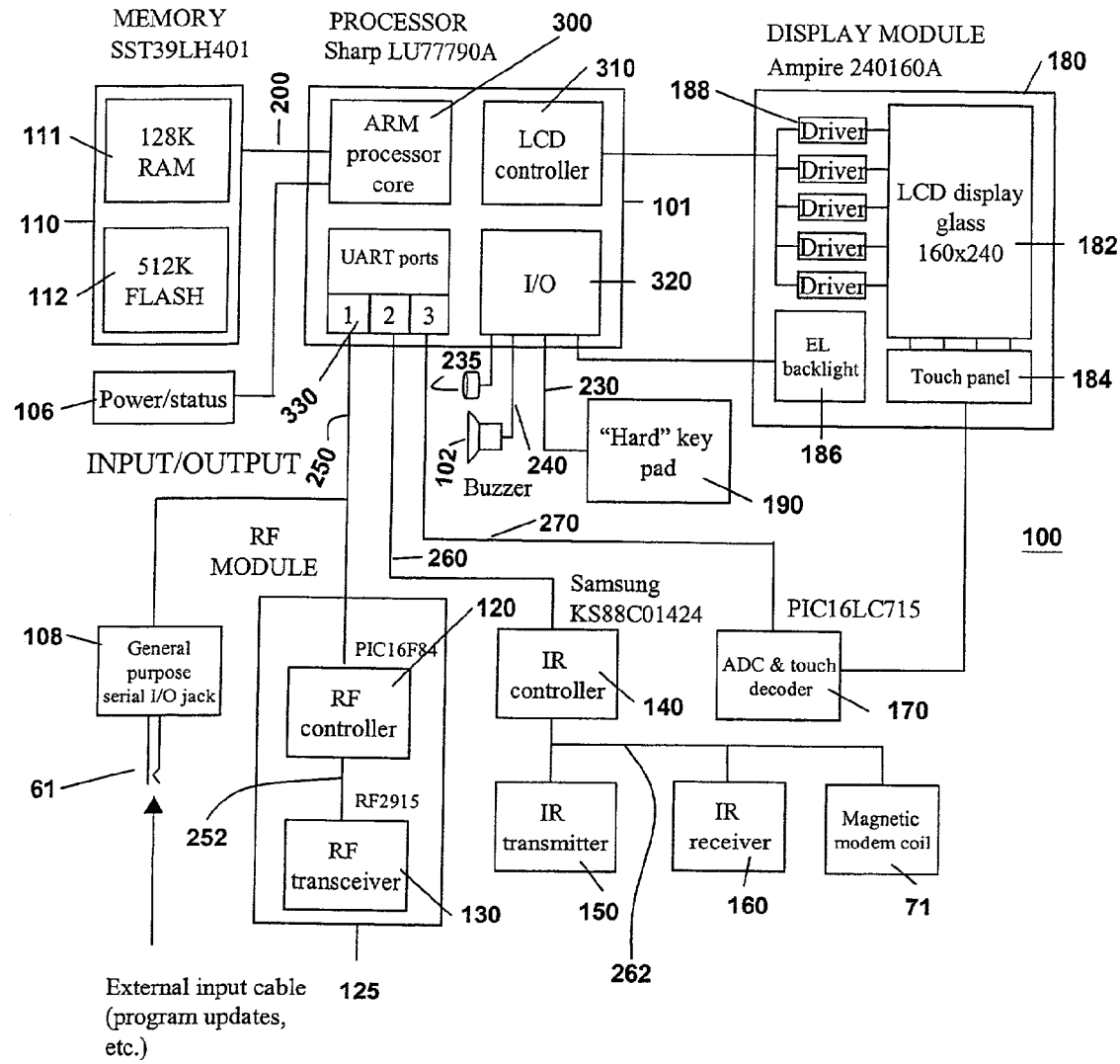
FIG. 3 illustrates a block diagram of exemplary hardware for use in connection with the universal remote control illustrated in FIG. 1.

Referring now to FIG. 3, there is illustrated a block diagram of exemplary operating circuitry 100 of the remote control 10. The operating circuitry 100 may be powered directly by a battery or indirectly from another electrical source (i.e., by way of the battery charging contacts or other dc power source). The power supply is regulated and monitored by a power conditioning and status circuit 106. The operating circuitry 100 preferably includes a memory bank 110 comprising RAM 111 and flash memory 112, main processor 101 (e.g., a Sharp LU77790A), a display module 180 comprising a liquid crystal display glass 182, touch panel overlay 184, electroluminescent backlight 186 and drivers 188.

Also included in the operating circuitry 100 are shown a general purpose serial I/O circuit 108, an infrared controller 140 (e.g., comprising a Samsung KS88C01424 Microcontroller), an infrared transmitter circuit 150, an infrared receiver circuit 160, a Analog-to-Digital converter (ADC) and touch decoder circuit 170 (e.g., comprising a PIC16LC715 Microcontroller or other touch screen controller/decoder chip), a speaker or buzzer 102, a key pad 190 (the electrical diagram equivalent of the elastomeric keyboard 20 shown in FIG. 2), a magnetic modem 71, and an RF module 152 comprising an RF controller 120 (e.g., a PIC16F84 Microcontroller) and an RF transceiver 130 (e.g.

an RF Microdevices RF2915 chip). In an alternative embodiment, the RF module 125 may comprise an "off-the-shelf" RF transceiver unit with an integral baseband processor such as the "900 MHz Microhopper" available from World Wireless Communications Inc. (part number 011-1882). It will be appreciated that RF modules of other manufacture and/or other technologies (Bluetooth, IEE802.11, etc.) are equally suitable. The RF circuitry is connected to the RF antenna 52 while the IR circuitry is connected to the IR LEDs 50 and 51.

The main processor (e.g., a Sharp "System on a Chip," the LU77790A) may be based on a 32-bit, ARM RISC (Reduced Instruction Set Computer) core. In this regard, the main processor would comprise the ARM processor core 300, LCD controller 310, general purpose I/O ports 320, and multiple serial UART ports 330. The main processor is provided to manage the entire process of interacting with the user through the backlit, graphical, touchscreen, LCD module 180, the speaker or buzzer 102, the key pad 190, the microphone and/or the red LED 235 (LED 22 of FIGS. 1 and 2) and to provide two-way infrared and RF communications through the infrared controller 140 and the RF controller 120.

FIG. 3 further illustrates the electrical connections between the various modules such as connection 200 interconnecting the memory module 110 with the main processor 101, connections 210 and 220 interconnecting the LCD 180 with the main processor 101, connections 230, 240, 250, 260, and 270 interconnecting the main processor 101 with the key pad 190, buzzer 102, the general purpose serial I/O circuit 108 and the RF controller 120, infrared controller 140, and ADC and touch decoder circuit 170, respectively. Other connections include the connection 252 between the RF controller 120 and the RF transceiver 130 and connection 262 interconnecting the infrared controller 140 with the infrared transmitter 150 and also connecting the infrared controller 140 with the infrared receiver 160.

The electronic configuration illustrated in block diagram 100 comprises a general purpose, multi-processor system. The operation of the multi-processor system is controlled by internal control software. The control software may include routines, programs, objects, components, and/or data structures that perform particular tasks that can be viewed as an operating system together with one or more applications. The operating system provides an underlying set of management and control functions which are utilized by the applications to offer user functions such as control of consumer appliances, access to Internet data, display of home automation controls, display of TV guide information, and the like. It should be understood that, while the term "remote control" is used herein to designate the physical unit, in terms of the internal software architecture the conventional "clicker" remote control user interface is but one of several possible applications which may co-exist within the unit.

Architecturally, the system is organized around the concept of Events and Resources. Events are occurrences which initiate an action. More specifically, an Event is an occurrence that requires a response from the remote control 10. Events include user-initiated activities such as pressing a physical key on the keypad 20, activating the touch screen LCD 24, speaking into a microphone, etc. Events can also be generated by the main processor 101, for example by an internal timer register. In addition, Events can be generated by external means such as, for example, a communication transmission.

In response to an Event, the remote control will typically access one or more of its Resources. A Resource is, in its broadest definition, a block of data. The data is often of a specific (i.e., defined) type. Within the memory 110, each memory data block is preferably identified by its "Resource ID" or by another indication where the Resource is located in the memory structure. Examples of Resources are bitmaps, strings, and control and display definitions. Generally, Resources are used to configure the remote control 10 to be responsive to the needs of the user. Many Resources are loaded into the memory 110 of the remote control 10 by the manufacturer when the remote control 10 is built. Other Resources may be created or modified by the user and still other Resources can be remotely loaded into the memory 110 by a service center, via the Internet, etc. Resources allow the behavior, look and feel of the remote control 10 to be altered, even after it has been sold and is in the hands of the user thus permitting the user to personalize the remote control 10 to his or her own tastes.

For ease of development, Resources may be instantiated within the remote control 10 by use of a Resource Compiler running on a PC or equivalent. The Resource Compiler accepts a text description of graphic and control elements and compiles them into memory data structures suitable for use within the remote control 10. Although other mechanisms, e.g. manual compilation, self generation by the remote control operating system under user control, etc., are possible, a PC based Resource Compiler may provide the most efficient method for rapid development of Resources needed for a particular remote control application. To assist in a better understanding of the Resources used to construct the remote control user interface software described herein, examples of commands which are available in an exemplary Resource Compiler for use in generating the memory data structures for the remote control include:

BITMAP (BitMapName, BitsPerPixel, Width, Height, Radix)

The BITMAP command generates a black and white bitmap Resource. "BitMapName" is the bitmap Resource ID while the "Width" and "Height" size the bitmap. "BitsPerPixel" is set to '1' and "Radix" is set to '2' in the first generation of the remote control product.

FONT (FontName, StartAsciiIndex, EndAsciiIndex)

FONT generates a Resource Table that associates numeric values with bitmaps. This approach permits the use of an unordered set of bitmaps to be used as alphabetic characters or font. "FontName" is a SYMBOL. Its assigned value is the Resoure ID of the font. "StartAsciiIndex" is the index value associated with the first bitmap ID. "EndAsciiIndex" is the index value associated with the last bitmap ID. A list of bitmap Ids follows this Command. The bitmap IDs are typically expressions in the form of SYMBOL names.

STRING (StringName, StringCharacters)

STRING generates a String Resource. "StringName" is a SYMBOL. Its assigned value is the String Resource ID. "StringCharacters" comprise the text in the string.

DATA (DataName, [DataSpecifier,[Expr]],DataEnd)

DATA generates a Data Resource. "DataName" is a SYMBOL. Its assigned value is the Data Resource ID. "DataSpecifier" indicates the size of the expressions ("Expr") that follow it. There can be multiple expressions following a DataSpecifier and there can be multiple DataSpecifiers in a Data Resource.

BITMAPBUTTONCONTROL (ControlName, ControlCode, UpBitMapID, DownBitMapID, InactiveBitMapID, SelectBitMapID)

BITMAPBUTTONCONTROL generates a bitmap push button control. "ControlName" is a SYMBOL. Its assigned value is the Resource ID for the control. "ControlCode" is the value generated when the control on the touchscreen display is pressed or released. "UpBitMapID" is the Resource ID of the bitmap that is drawn on the display when the control is active but not pressed. "DownBitMapID" is the Resource ID of the bitmap that is drawn on the display when the control is active and pressed by the user. "InactiveBitMapID" is the Resource ID of the bitmap that is drawn on the display when the control is inactive. "SelectedBitMapID" is the Resource ID of the bitmap that is drawn on the display when the control is active and visually highlighted.

STRINGBITMAPCONTROL (ControlName, ControlCode, StringID, FontID, UpBitMapID, DownBitMapID)

STRINGBITMAPCONTROL generates a bitmap push button control on the display with a string drawn over it. "ControlName" is a SYMBOL. Its assigned value is the Resource ID for the control. "ControlCode" is the value generated when the control on the touchscreen is pressed or released. "StringID" is the Resource ID of the string that is drawn when the control is pressed or unpressed. "FontID" is the Resource ID of the font with which the string is drawn. "UpBitMapID" is the ResourceID of the bitmap that is drawn on the display when the control is active but not pressed. "DownBitMapID" is the Resource ID of the bitmap that is drawn on the display when the control is active and pressed by the user.

COMPOSITECONTROL (ControlName, TopX, TopY, ControlCode, Parameters [below], End)

Rect: Xoffset, Yoffset, Width, Height, ForeGroundColor, BackGroundColor

BitMap: BitMapID, Xoffset, Yoffset, XferMethod

Line: X1offset, Y1offset, X2offset, Y2offset

RoundRect: Xoffset, Yoffset, Width, Height, Radius, ForeGroundColor, BackGroundColor Text: StringID, Xoffset, Yoffset, Spacing, ForeGroundColor, BackGroundColor, Direction, FontID ClipRect: Xoffset, Yoffset, Width, Height COMPOSITECONTROL generates a bitmap control for display from a collection of drawing primitives. The control may be used as a picture or as a pushbutton control. Unlike other controls just mentioned, this control does not change when pressed. "ControlName" is a SYMBOL. Its assigned value is the Resource ID for the control. "TopX" is the left coordinate of the control. "TopY" is the top coordinate of the control. "ControlCode" is the value generated when the control on the touchscreen display is pressed or released. The parameters are optional graphic commands. They are:

- 'Rect' defines an unfilled rectangle. Xoffset and Yoffset are the distance from TopX and TopY at which the top left coordinate of the rectangle is located. Width an Height are the dimensions of the rectangle. ForeGroundColor is the color of the rectangle and BackGroundColor is the color behind the text.
- 'BitMap' defines a bitmap and its location. BitMapID is the Resource ID of the bitmap. Xoffset and Yoffset are the distance from TopX and TopY at which the top left coordinate of the bitmap is located. The XferMethod determines how the bits in the bitmap will be applied.
- 'Line' draws a line from X1offset, Y1offset to X2offset, Y2offset. X1offset and Y1offset are the distance from TopX and TopY at which point the line begins. X2offset and Y2offset are the distance from TopX and TopY at which point the line ends.
- 'RoundRect' defines a rectangle with rounded corners. Xoffset and Yoffset are the distance from TopX and TopY at which the top left coordinate of the rectangle is located. Width an Height are the dimensions of the rectangle. Radius is the radius of the rounded corners. ForeGroundColor is the color of the rectangle and BackGroundColor is the color behind the text.
- 'Text' places a text string on the display. StringID is the Resource ID of the text to be drawn on the display. Xoffset and Yoffset are the distance from TopX and TopY at which the top left coordinate of the string is located. Spacing is the number of blank bits between letters. ForeGroundColor is the color of the text and BackGroundColor is the color behind the text. Direction specifies the direction at which the text will be drawn. The FontID is the Resource ID for the font to be used in representing the text.
- 'ClipRect' defines an allowable area within the display within which a drawing may appear. Xoffset and Yoffset are the distance from TopX and TopY at which the top left coordinate of the drawing area is located. Width an Height are the dimensions of the drawing area.

SCROLLCONTROL (ControlName, ControlCode, Left, Top, Right, Bottom, State, TopUpID, TopDownID, BottomUpID, BottomDownID)

SCROLLCONTROL generates a bitmap control which displays a vertical scroll bar with top and bottom arrows. "ControlName" is a SYMBOL. Its assigned value is the Resource ID for the control. "ControlCode" is the value generated when the control on the touchscreen is pressed or released. "Left" is the left most X coordinate of the displayed control. "Top" is the upper most Y coordinate of the displayed control. "Right" is the right most X coordinate of the displayed control. "Bottom" is the lower most Y coordinate of the displayed control. "State" is the default settings for the state flags. "TopUpID" is the Resource ID of the top arrow bitmap that is drawn on the display when the control is active but not pressed. "TopDownID" is the Resource ID of the top arrow bitmap that is drawn on the display when the control is active and pressed by the user. "BottomUpID" is the Resource ID of the bottom arrow bitmap that is drawn on the display when the control is active but not pressed. "BottomDownID" is the Resource ID of the bottom arrow bitmap that is drawn on the display when the control is active and pressed by the user.

TEXTBOXRESOURCE (ControlName, ControlCode, Width, Height, Left, Top, Right, Bottom, ScrollID, StringID, FontID, Box, Type, Radius)

TEXTBOXRESOURCE generates an allowable area on the display for text and an optional scrollbar and fills the area with scrollable text. "ControlName" is a SYMBOL. Its assigned value is the Resource ID for the control. "ControlCode" is the value generated when the control on the touchscreen is pressed or released. "Width" and "Height" are the dimensions of the text box, including the scroll bar. "Left" is the left most X coordinate of the displayed control. "Top" is the upper most Y coordinate of the displayed control. "Right" is the right most X coordinate of the displayed control. "Bottom" is the lower most Y coordinate of the displayed control. "ScrollID" is the Resource ID of the scroll control used in the text box. "StringID" is the Resource ID of the string that is drawn when the display is first shown. "FontID" is the Resource ID of the font with which the string is drawn. "BoxID" specifies that the box will not be drawn or will be drawn with square or rounded corners. If rounded corners are specified, "Radius" defines the radius of the rounded corners.

Figure 4:
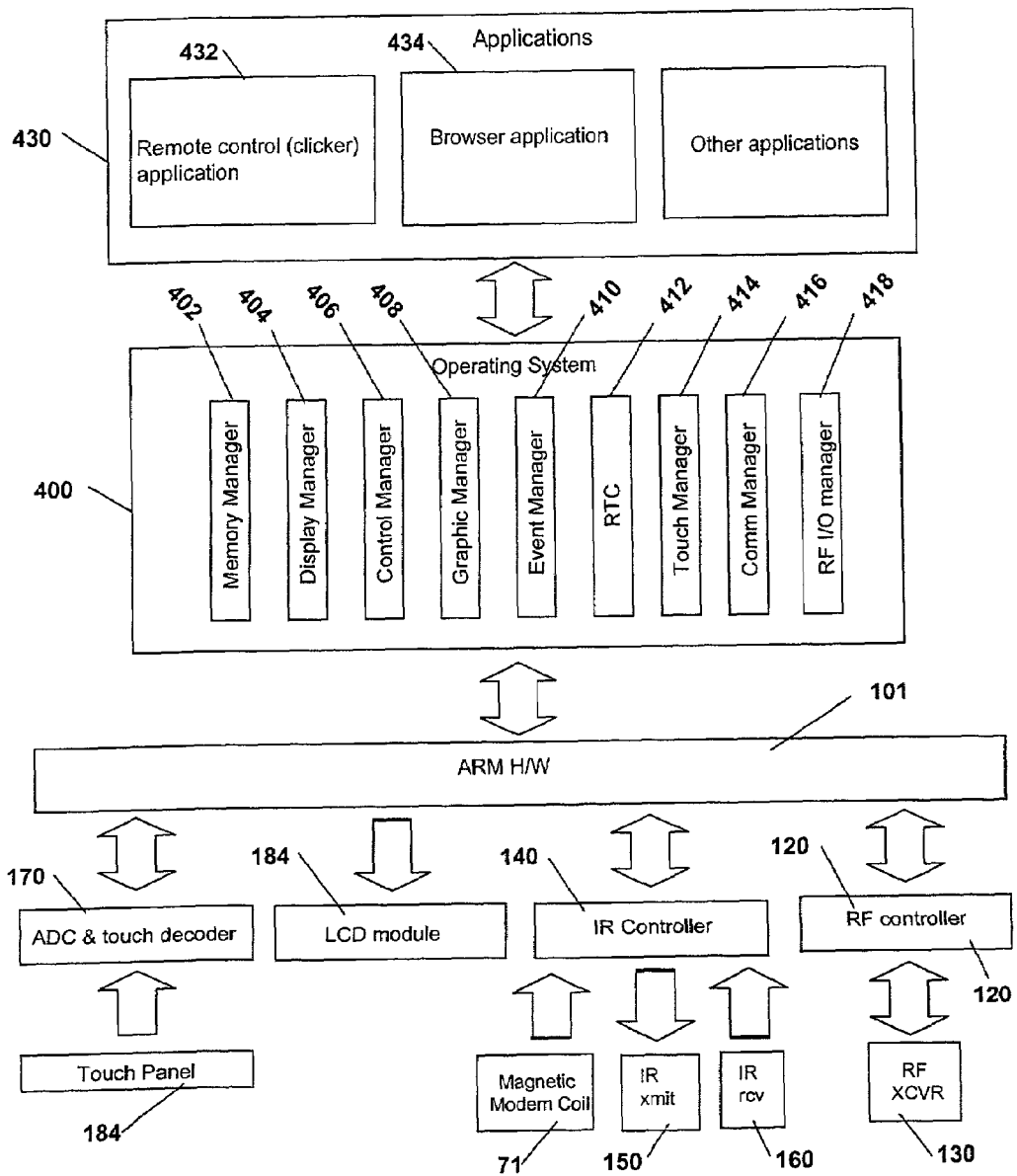
FIG. 4 illustrates an exemplary operating system and hardware hierarchy for use in the universal remote control illustrated in FIG. 1.

Turning to FIG. 4, the Operating System (OS) 400 software that the Main Processor 101 executes is organized into several units called Managers. Each Manager performs a specific task when called upon by the OS 400. The following are exemplary Managers:

The Memory Manager 402 allocates blocks of memory and resources for use by an application program 434.

The Display Manager 404 controls what is shown on the LCD (180 in FIG. 3). It can control what is shown over the entire LCD or just a portion of it. The Display Manager 404 generates a display based primarily on specified Resources held in memory. The display can, therefore, be modified by changing the content of the Resource rather than by changing the Display Manager code 404.

The Control Manager 406 creates and destroys controls as well as handles the user responses to the interactive graphical controls displayed on the LCD. When a user selects a graphical icon shown on the LCD, the Control Manager 406 responds to the Event and may alter the graphical display in response to the user action. All icons and graphical entities displayed by the Control Manager 406 originate as a Resource and may, therefore, be changed.

The Graphic Manager 408 is responsible for the actual drawing of the entities shown on the display. It also loads the alphabetic fonts used for text in the display.

The Event Manager 410 will queue or mask Events that arise during the operation of the remote control 10. These Events include user interaction with the touch screen 24 or key pad 20 and system Events generated by timers or by any of the communication ports. Events in the queue are accessed by Application Software 434.

The real-time clock (RTC) Manager 412 generates a periodic timing mark as an Event. It may also be adapted to keep the current time.

The Touch Manager 414 generates an Event each time the touch screen 24 is touched and sends the Event to the Event manager 410.

The Communication Manager 416 handles all serial messages between the Applications 430 or other Operating System software modules and those peripherals connected on the serial buses such as the infrared controller 140, and the ADC and touch decoder 170.

The RF I/O manager 418 handles all two-way data communication between Applications 430 and remote resources such as server applications running in other devices (PCs, set top boxes, TV sets, CD jukeboxes, etc.).

To communicate to systems beyond those devices conventionally found in a home entertainment system, the remote control 10 provides a two-way infrared or two-way RF system (or other communication technology). Using this communication technology, the remote control 10 can access, process, and/or display data from remote sources. The RF I/O manager 418 (or IR I/O manager in the event a two-way IR communications path is used instead) accepts data from Applications 430 running under the OS and prepares the data for communication by splitting the data into packets and adding packet header information. It also accepts received packets, ensures packet integrity and assembles the received packets into data to be sent to the Application(s) 430.

The RF I/O manager 418 interacts directly with the two-way RF hardware previously described (e.g., RF controller 120 and RF transceiver 130). Checksums are appended to outbound data and the packets are sent. Inbound data is received from the communications hardware. Error free packets are passed to the Application interface and a confirmation of successful reception is sent to the originator. Packets with errors are discarded and up to three retransmit requests can be sent to the originator.

In one preferred embodiment, the data communication protocol implemented by the RF I/O Manager 418 comprises communication packets which can carry data or commands. Each packet comprises a header and the attached command or data. Commands are transfers of non-data and are acted upon. A sequence is any number of packets that comprises an entire transfer of data, such as a complete text stream, a complete bitmap file, a Web page or any other complete data resource. A block is a series of data packets. A single block or multiple blocks may constitute a sequence. An exemplary Communication Packet format is illustrated in Table 1 below.

TABLE 1

| Field | Bytes | Description |
| --- | --- | --- |
| Byte Count | 1 | Total number of bytes supplied to the end of the data (7 + n) |
| To Address | 2 | The address of the receiving station (usually the server). |
| From Address | 2 | The address of the Remote Control platform |
| Packet Number | 1 | Bits 0–6 are used to be sure every packet is sequential. Most significant bit used to indicate a command packet (MSB set). |
| Port Number | 1 | Used to keep track of multiple data streams. |
| Data | n | Packet payload - data or command |

The Byte Count is the total number of bytes in the packet, including the header. The To Address is the address of the receiving station (usually a server or gateway). The From Address is the address of the remote control 10. The Packet Number is used to ensure every packet is sequential. The Most Significant Bit of the Packet Number indicates a command packet when set to a Logic 1. A unique Port Number can be assigned to each unique data sequence, so that packets of different sequences can be transmitted in an interleaved fashion. Each separate stream of data packets should have its own port number as well as its own packet number sequence.

In one embodiment, six commands are defined for use by the remote control 10. The payload data of each command comprises a one byte command code followed by a variable number of parameters, as:

STX (data=0x02h). The STX command indicates the start of the transmission of a series of packets comprising a data sequence. This command is accompanied by parameters which specify the total number of packets in the sequence and the Port Number assigned to the sequence. Once an STX command is answered by an ACK, any communication using the specified Port Number will be associated with that specific "sequence" of data.

ETX (data=0x03h). The ETX command follows after a complete sequence has been transmitted, and contains the checksum for the entire sequence (excluding the headers). If a NAK is sent as a reply to an ETX command it is meant to signal retransmission of the entire sequence.

ACK (data=0x06h). The ACK command signals a successful transfer of a data Block or Sequence.

NAK (data=0x15h). The NAK command signals an unsuccessful transfer of a data block or sequence. NAK also constitutes a request for retransmission of the data not correctly received.

ETB (data=0x17h). The ETB command indicates the end of a block of data. Also causes the packet sequence count to be reset to zero.

CAN (data=0x18h). The CAN command cancels the sequence on the Port Number included in the data portion of this command.

While the above describes one possible implementation of a communications protocol for transfer of data between the remote control 10 and another device, it will be appreciated that there are many other possible protocols that are equally suitable including, but not limited to, those corresponding to various standards, e.g. Bluetooth, IrDA Control, IEE802.11 and others.

To effect the transmission of IR codes, the IR controller 140 communicates with applications 430 resident in the remote control 10 using a pre-defined set of commands. Since the actual mechanisms and formats for transmitting such IR signals are well known in the art—see, for example, U.S. Pat. No. 4,959,810 which is incorporated herein by reference in its entirety—it will not be described further herein. In an exemplary embodiment, the SendIR command is issued to the IR Controller 140 to cause an IR code to be transmitted. The SendIR command may be a six byte packet including the fields RcdLength(1), 01h, DeviceTypeNum (2),KeyCode(1) and KeyFlag(1) where:

RcdLength is a one byte value indicating the total number of bytes in this packet.

01h is a command type which identifies this command as a "send IR" command.

DeviceTypeNum is a combination of DeviceType and DeviceNumber as follows:
  Bits 15..12: DeviceType—see Table 2 below.
  Bits 11..0: DeviceNumber represents a four (decimal) digit number which identifies a set of IR functions to control a specific device (e.g. "Sony TV set")

KeyCode identifies the function to be transmitted, according to Table 3 below.

KeyFlag indicates if any special processing is required. For example, if KeyFlag bit 7 is "on" this can indicate that this IR command is part of a macro sequence playback, requiring that the IR data frame be repeated a certain minimum number of times. If bit 5 is "on" this can indicate that the IR Controller should use learned IR code rather than its pre-programmed code.

TABLE 2

IR Controller device types

| Device Type | Device Name | Letter Representation |
| --- | --- | --- |
| 0 | TV | T |
| 1 | Cable | C |
| 2 | Video Accessory | N |
| 3 | Satellite/DSS | S |
| 4 | VCR | V |
| 5 | Cassette Tape | K |
| 6 | Laser Disk | L |
| 7 | Digital Audio Tape | J |
| 8 | Digital Video Disk | Y |
| 9 | Tuner/Amplifier | R |

TABLE 2-continued

IR Controller device types

| Device Type | Device Name | Letter Representation |
| --- | --- | --- |
| 10 | Amplifier/Misc. Audio | A/M |
| 11 | Compact Disk | D |
| 12 | Phonograph | P |
| 13 | Home Control | H |
| 15–31 | Reserved | |

TABLE 3

IR Controller KeyCodes

| KeyCode | Function Name |
| --- | --- |
| 1 | Digit 1 |
| 2 | Digit 2 |
| 3 | Digit 3 |
| 4 | Digit 4 |
| 5 | Digit 5 |
| 6 | Digit 6 |
| 7 | Digit 7 |
| 8 | Digit 8 |
| 9 | Digit 9 |
| 10 | Digit 0 |
| 11 | Volume Up |
| 12 | Volume Down |
| 13 | Mute |
| 14 | Channel Up |
| 15 | Channel Down |
| 16 | Power |
| 17 | Enter |
| 18 | Previous Channel |
| 19 | TV/VIDEO |
| 20 | TV/VCR |
| 21 | A/B |
| 22 | TV/DVD |
| 23 | TV/LD |
| 24 | Input |
| 25 | TV/DSS, TV/SAT |
| 26 | Play |
| 27 | Stop |
| 28 | (Search) Forward |
| 29 | (Search) Reverse |
| 30 | Pause |
| 31 | Record |
| 32 | Menu |
| 33 | Menu Up |
| 34 | Menu Down |
| 35 | Menu Left |
| 36 | Menu Right |
| 37 | Select |
| 38 | Exit |
| 39 . . . 255 | Other functions |

It will be appreciated that there are many other commands that go back and forth between the processors and that the above description with respect to the SendIR command is not intended to be limiting.

As noted previously, the exemplary remote control hardware and operating system are capable of supporting multiple application programs. In a preferred embodiment, two application programs coexist in the unit: one which provides conventional remote control ("clicker") functionality 432, and another associated with the two-way RF communication subsystem which provides general purpose text and graphics display capability in the form of a compact browser utility 434. The application which provides conventional consumer appliance remote control functionality is preferably the application that is launched by default upon power-up (i.e.

insertion of batteries into the unit) and is the mode of operation most commonly used by the user.

FIG. 1 illustrates a typical appearance of the LCD touch screen 24 when the remote control 10 is in the mode of operation for providing remote control functionality. It will be appreciated that many other displays are also available, depending on the type, model, and functionality of the device(s) to be controlled. In addition, the remote control application need not display key icons for functions not supported by a particular device, so the actual display may vary according to the specific device brand or even model currently set up. For example, even though the IR controller and the remote control screen layout may in general support menu operations (see KeyCodes 32 through 38 in Table 1), if the specific device currently set (e.g. a Goldstar TV) does not offer this feature, those keys need not be displayed.

Figure 5:
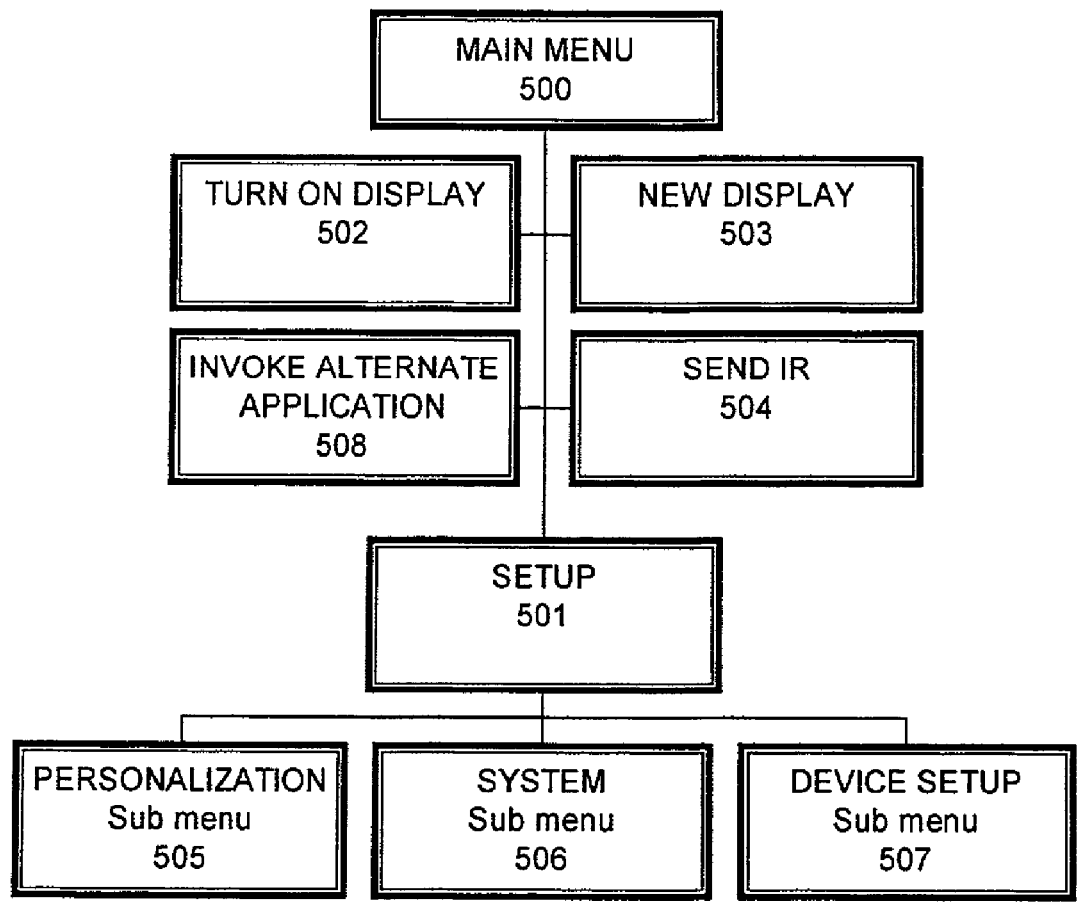
FIG. 5 illustrates an exemplary remote control application program hierarchy for use in the universal remote control illustrated in FIG. 1.

Turning now to FIG. 5, FIG. 5 illustrates the top level program hierarchy within the remote control application 432. The remote control application 432 (and it's sub-applications) acquire Events from an event queue (placed there by the Event Manager 410) and use other Managers and Resources to perform their intended function. The main menu sub-application 500 is called at the time the remote control 10 receives power, for example, the time at which the batteries are installed. It initializes all the Managers 400, places a welcome message on the LCD display 24, initializes and loads all Applications and Resources that may be used. After a set period of time (a few seconds), the welcome message should be replaced by the default device screen. A typical default device screen is shown in FIG. 1.

Once all Applications and Resources have been initialized, the main menu sub-application 500 waits for an Event. One such Event is an internal main processor timeout which, in this specific case, turns off the display and system CPU to save battery power. Another such Event is a user key press. In this latter case, the user may press one of several types of keys, creating Events to which the main menu sub-Application 500 responds. One or more of the control keys shown on the display 24 generates an Event invoking a sub-application 503 that produces a new display. Typically this might be a second "page" (i.e. alternative device screen) of command keys for the current device under control (e.g. a TV) or for a different device (e.g. from TV to VCR) with a new page of keys. Activation of another group of keys (both the soft keys shown on the display and the hard keys in the keypad 20) will invoke a sub-application 504 that transmits an infrared code. The send IR sub-application 504 communicates with the IR controller 140 via the operating system's communication manager using the IR controller command structure described earlier to cause the appropriate device IR command signal to be transmitted.

Activation of other keys can invoke a sub-application 502 that will turn on the display backlighting. It will be appreciated that a motion sensor could also be used to turn on the display backlighting, for example, when the remote control 10 is picked up. Yet another key activation can invoke the setup sub-application 501 that permits the user to customize the remote control 10. Activation of still other keys can invoke a different application 508 and pass control of the unit to that application. By way of example, activation of a key 41 labeled "iMosiac" may invoke the Browser application 434 which is described in greater detail below.

Figure 6:
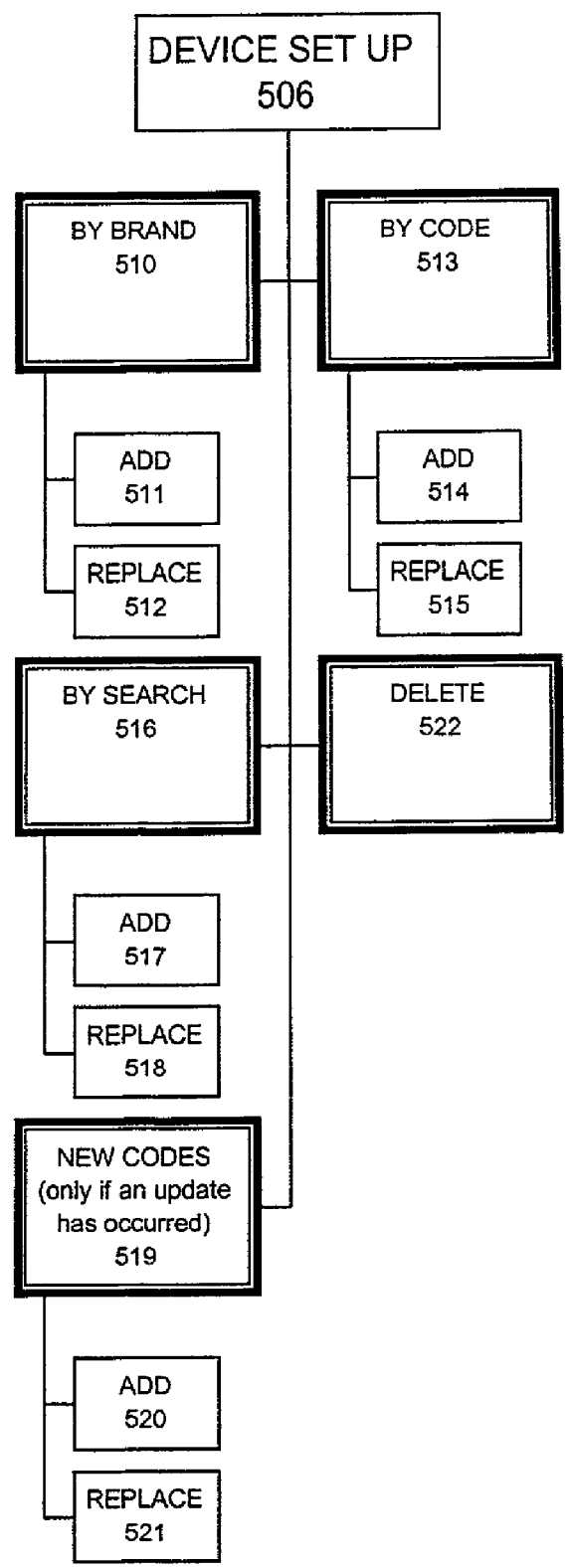
FIG. 6 illustrates an exemplary sub-application program hierarchy for use in setting up the universal remote control illustrated in FIG. 1.

For customizing the universal remote control 10, the setup Application 501 is invoked. Customization, as is shown in FIG. 5, can be provided by three menu-driven, sub-applications, namely, the device personalization sub menu 505, the device setup sub menu 506 and the system sub menu 507. The device setup sub menu 506, shown in FIG. 6, comprises five sub-applications that afford the user the opportunity to access all of the infrared control codes required for operation of an entire home electronics system. Control codes may be pre-stored in the main memory 110 or the IR Controller 140 of the remote control 10, learned into the main memory 110 by using the remote control that was supplied with a device, or downloaded from a remote source, e.g., from a source via the Internet.

To select control codes to be available for access to control consumer electronic devices by device type and manufacturer, the setup by brand sub-application 510 is utilized. This sub-application is based in part on technology disclosed in U.S. Pat. No. 5,614,906 entitled "Method for selecting a remote control command set" that is incorporated herein by reference in its entirety. The setup by search sub-application 516 permits the user to select control codes by linearly stepping through the data base of codes by device type, trying each one in turn. The setup by code sub-application 513 permits the user to simply enter a known code number to configure the remote control 10 to make accessible the control codes to control the device(s) corresponding to the known code number. The new code sub-application 519 allows the user to try new codes received during a prior download over the Internet or through customer service via the telephone. Selected/downloaded control codes may be made available for user access by using the add function 511 or used to replace currently accessible control codes using the replace function 512. The delete sub-application 522 can be used to erase all selected control codes, allowing the user to start over with a clean slate.

Figure 7:
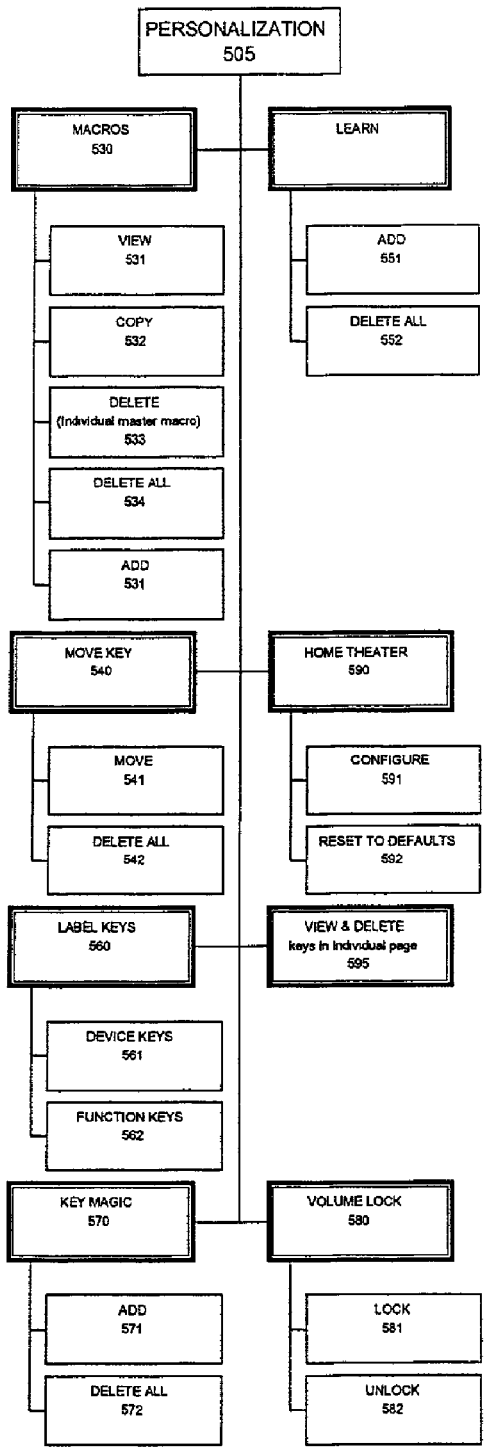
FIG. 7 illustrates an exemplary sub-application program hierarchy for use in personalizing the universal remote control illustrated in FIG. 1.

The personalization sub menu 505 of sub-applications shown in FIG. 7 offers some very powerful sub-applications to the user that permit the remote control 10 to be fully personalized to meet specific needs of a user. For example, the macros sub-application 530 comprises five different functions. The macros sub-application 530 is based on technology disclosed in U.S. Pat. No. 5,959,751 entitled "Universal Remote Control Device" which is incorporated herein by reference in its entirety. The macros sub-application permits the user to add 531, view 532, delete 534, copy 533 (e.g., onto another screen) or delete all 535 macro functions.

To select a key from one device representing a specific infrared function and create a copy of it for use with another device, the move key sub-application 540 is utilized. For example, the move key sub-application 540 can be used to move the channel up function for the TV device such that it is accessible from the VCR device screen. This Sub-Application is based on technology disclosed in U.S. Pat. No. 6,014,092 entitled "Key mover" that is incorporated herein by reference in its entirety. In addition to moving a key 541 a user may delete all 542 keys that have been moved.

To teach the remote control a new function from another remote control, the learn sub-application 550 is utilized. The learn sub-application is based on technology disclosed in U.S. Pat. No. 6,097,309 entitled "Remote control learning system and method using signal envelope pattern recognition" that is incorporated herein by reference in its entirety. A new function can be learned 551 by the remote control and assigned to a pre-defined function key or to a blank key. All learned functions can be deleted 552.

To label new device keys 561, new function keys 562 or to edit existing key labels, the label keys sub-application 560 is utilized. The label key sub-application 562 makes available symbols and lower and upper case characters as well as the backspace, space, and shift for use in creating alphanumeric key labels. A caps lock function can also be provided.

To teach the remote control a new function by entering a code, the key magic sub-application 570 is utilized. The key magic sub-application 570 is based on technology disclosed in U.S. Pat. No. 5,515,052 entitled "Universal remote control with function synthesis" that is incorporated herein by reference in its entirety. A new function can be added 571 and assigned to a pre-defined function key or to a blank key. All added functions can be deleted 572.

Any key on any device page may be viewed and deleted by the view & delete function 595.

The volume lock sub-application 580 affords the user a means for controlling the volume for one device (the amplifier, for example) from another screen dedicated to controlling another device like the TV, for example. The user may institute the locking feature using the lock function 581 or may remove the feature using the unlock function 582.

The home theater sub-application 590 offers the user a means for creating on one or several screens a set of keys that are those most often used keys in a home theater system. The user may configure the feature using the configure function 591 or may remove the feature using the reset to default function 592.

Figure 8:
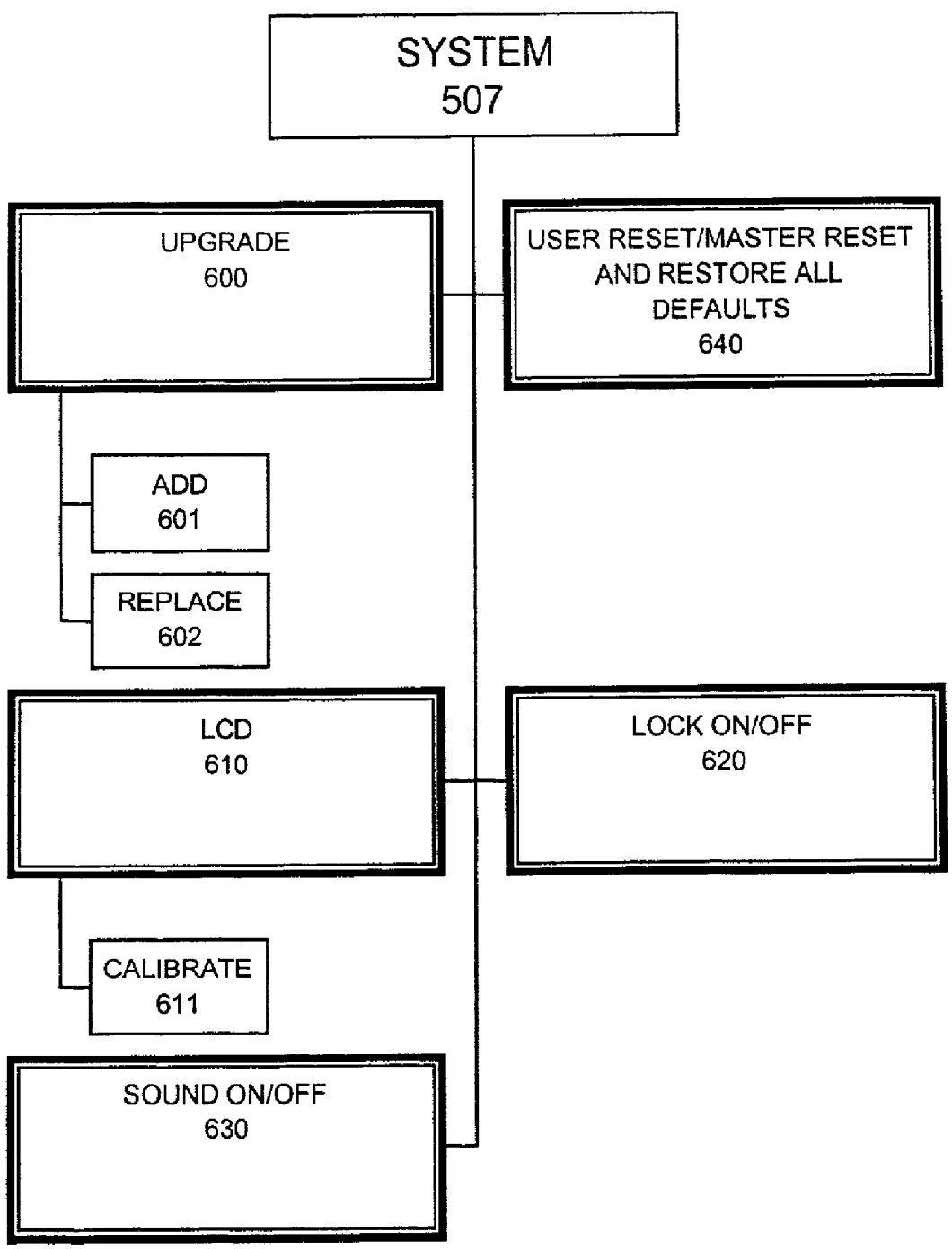
FIG. 8 illustrates an exemplary sub-application program hierarchy for use in establishing the overall system behavior of the universal remote control illustrated in FIG. 1.

The system sub menu 507 of sub-applications, illustrated in FIG. 8, offers the user the ability to affect the overall operation of the remote control. For example, the upgrade sub-application 600 permits the user to add 601 codes from a remote source such as a server on the Internet, via a cable set top box, etc. This application makes it easy for the user to always have the most current and/or correct codes in the subject remote control, even after the purchase or upgrade of new devices for the family home entertainment system. This sub-application may be based on technology disclosed in U.S. Pat. No. 5,537,463 entitled "Magnetic modem in a remote control," U.S. Pat. No. 5,228,077 entitled "Remotely upgradable universal remote control" and in U.S. Pat. No. 5,689,353 entitled "Remote control with two-way data coupling" that are incorporated herein by reference in their entirety. The add function 601 and the replace function 602 make it possible for the user to add or replace codes after the upgrade process is complete.

The LCD sub-application 610 provides a means for the user to compensate for any drift in the calibration of the LCD 24 during long-term use. The user may invoke the calibrate function 611 to return the LCD 24 to factory-level settings.

While using the touchscreen 24, the user can receive audible feedback that a key has been selected. To this end, a soft clicking sound is issued by the speaker or by the buzzer 102. This sound may be turned on or off using the sound on/off sub-application 630.

After the user has fully personalized the subject remote control, those settings may be locked into place to avoid inadvertent changes. This feature is performed by the lock on/off sub-application 620. The user may return the remote control 10 to its original, factory settings by invoking the user reset/master reset sub-application 640.

To navigate and browse HTML-formatted data supplied from an external source (e.g., via a two-way RF or IR communications link) the remote control 10 includes a browser application 434 that supports a sub set of XHTML-Basic and Compact HTML as proposed and defined by the World Wide Web Consortium. In this manner, the remote control 10 provides for customized user interface and data display since, within the constraints of the remote control hardware (screen size, color, memory availability, etc.), any screen layout of text, images, and/or hyperlink buttons is possible. Thus, any external device equipped with a compatible RF or IR transceiver, such as a personal computer, cable or satellite set top box, home automation controller or security system, CD jukebox, TV set, and the like, can avail itself of the remote control 10 as a data display and interface device via a well-understood standardized set of HTML commands.

In addition to the subset of XHTML-Basic commands supported, the remote control browser can also offer extra META statements as special extensions of the standard to facilitate use in situations which are not classically Web-based. For example, the browser can support a "Full screen" META statement, <META NAME="Any Names" CONTENT="Full_Screen">, that will cause the browser to go to full screen display mode (e.g., no navigation buttons or scroll bars are displayed). Similarly, the browser can support a "Refresh" META statement, <META HTTP-EQUIV="Refresh" CONTENT="xx; URL=http://www.n-ame.com/anything.html">, that will cause the Browser to count a given number of seconds, as specified in the "content field," and then display the next html page specified, or if the "URL=" is not present, refresh the current page. Both of these extensions are useful for authoring displays in which the user is not necessarily aware that the interface presented to him is HTML based via a browser—for example, simple TV guide applications and the like. Additionally, the "Refresh" feature is useful in applications where the data content to be displayed on the remote control 10 needs to be synchronized with a TV or audio program, for example enhanced TV services or karaoke lyrics.

The browser application can also be adapted to support a special extended HTML tag type, "IROP." With this ability, the remote control 10 can be used in connection with HTML pages that are authored to support "buttons" for use in sending IR commands. The general format of the IROP tag is <IROP KEY="1–18, . . . ", LABEL="function name" IMG="file path"> where the "KEY=xx,yy . . . " field contains data indicative of an IR code to be transmitted. In this regard, the data could specify the IR code(s) to be transmitted upon activation of the button using the IR KeyCodes defined for the IR controller defined in Table 3 above. Alternatively, the field could contain data representative of the actual IR code to be transmitted using a formatting technology such as described in U.S. Pat. No. 5,515,052 which is incorporated herein by reference in its entirety. The "LABEL=" and "IMG=" fields respectively define a label and graphic (i.e. icon) associated with the button or link. For example <IROP KEY "10, 7", LABEL="ABC"> would result in the display of "ABC" as a selectable area on the screen. User activation by pressing the "ABC" area on the touch screen would cause the browser to send to the IR Controller 140 a SendIR command containing KeyCode number 10 followed by a SendIR command containing KeyCode number 7, thus causing the IR Controller to transmit the IR codes for the digits "zero" and "seven," i.e., selecting channel 7 on the current consumer electronic device used for channel changing (TV, Cable box, Satellite receiver, etc.).

As will be appreciated, this extended IROP tag is useful in situations where it is desired that a user be provided with the ability to interact with an HTML page to initiate the transmission of IR command codes to consumer appliances. Examples of such HTML pages include TV guides, CD jukebox managers, and the like. Furthermore, it is contemplated that the IROP tag could be used to present to a user a virtual remote control that has the key layout and appearance of a prepackaged remote control (e.g., a display presenting a key layout and appearance of a Sony remote that is prepackaged with a Sony TV). In this manner, activation of a link having an IROP tag on the virtually displayed remote control (i.e., selection of a virtually displayed control key) can cause the remote control 10 to transmit the same control code as if the user where actually activating the corresponding key on the prepackaged remote control.

The remote control can be further adapted to support another special extended HTML tag type "MREM." With this ability, the remote control 10, if equipped with a date/time clock capability, can support a reminder/calendar feature used in connection with HTML pages that are authored to supply data regarding upcoming events. The general format of the MREM tag is <MREM TTR="Time to Remind" LABEL="Note/Memo" IMG="file path" LINK="URL">. This tag will cause a calendar event to be registered with the Remote Control application where TTR represents the time at or after which a reminder message is to be displayed during normal operation of the remote, LABEL represents the message to be displayed at reminder time, IMG (optional) represents an image to be displayed at reminder time, and LINK (optional) specifies the URL of an HTML page to be automatically loaded at reminder time. Note that if the LINK option is specified, this will also cause the Remote Control application to automatically invoke the Browser application to load and process the specified URL. With the exception of TTR, any of the fields specified above for the MREM tag may be omitted, i.e. "null," as required. For example <MREM TTR="5-15-2001-14:45" LABEL="Watch 'Who wants to be a Millionaire'">would result in the reminder text message "Watch 'Who wants to be a Millionaire'" being displayed at or after 2:45 pm on May 15, 2001. Further examples of the application of this HTML tag are discussed later.

Figure 9:
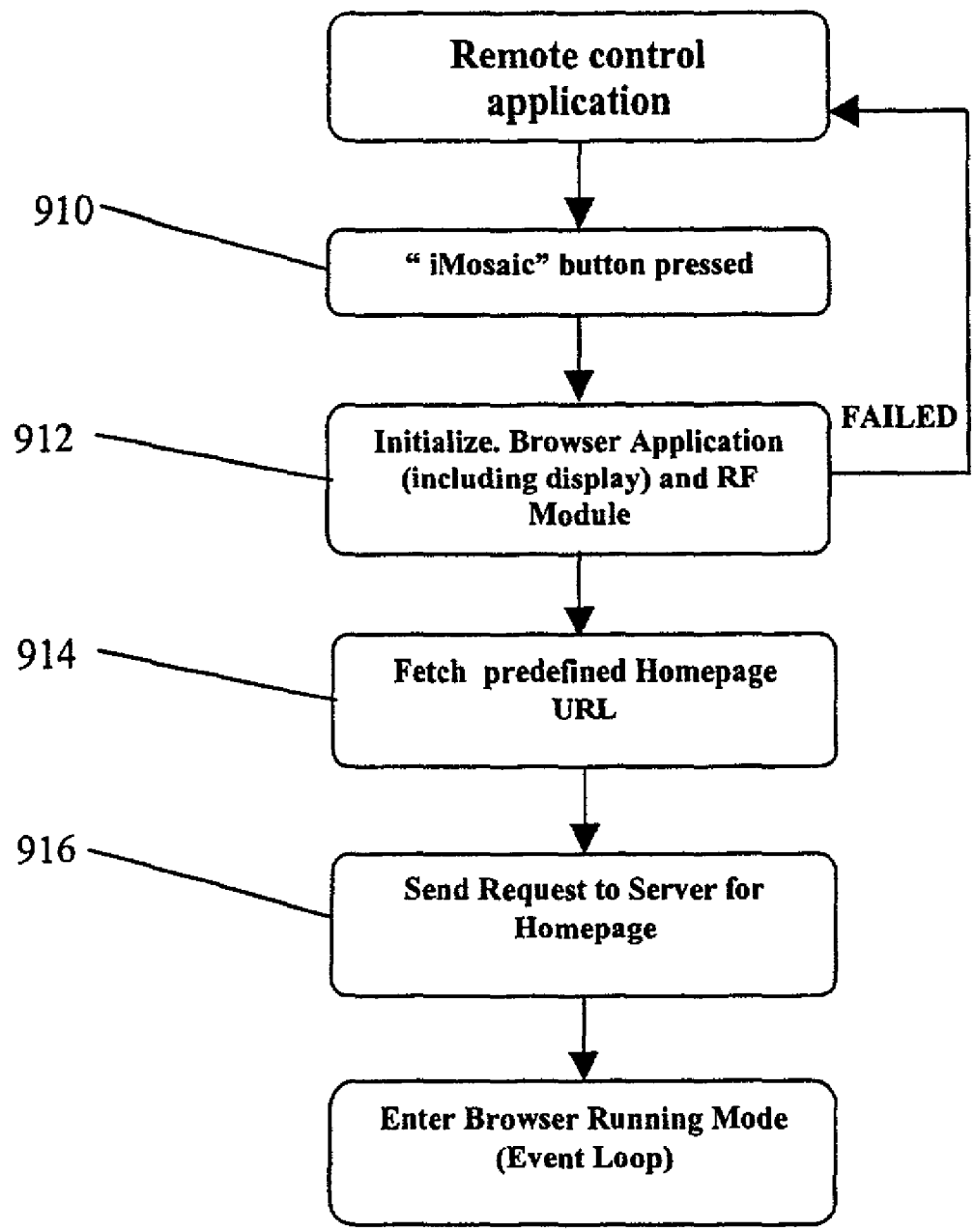
FIG. 9 illustrates an exemplary process for initializing a browser application resident on the universal remote control illustrated in FIG. 1.

Turning to FIG. 9, to invoke the browser application, the user may, for example, press a soft button 910 (such as "iMosaic" 41 on the regular remote control application display screen 24). When invoked, the browser application starts by initializing itself and the two-way communication interface 912 (via the RF I/O Manager in the illustrative embodiment). If the browser application and two-way communication interface are successfully initialized, the remote control 10 displays the basic Browser screen layout, an example of which is shown in FIG. 11, and issues a request to load a preset home page 914, 916. FIGS. 10a through 10g provide flowcharts depicting an overall operation of the exemplary Browser Application, showing how subsequent processing of the downloaded HTML data can be performed.

Figure 10A:
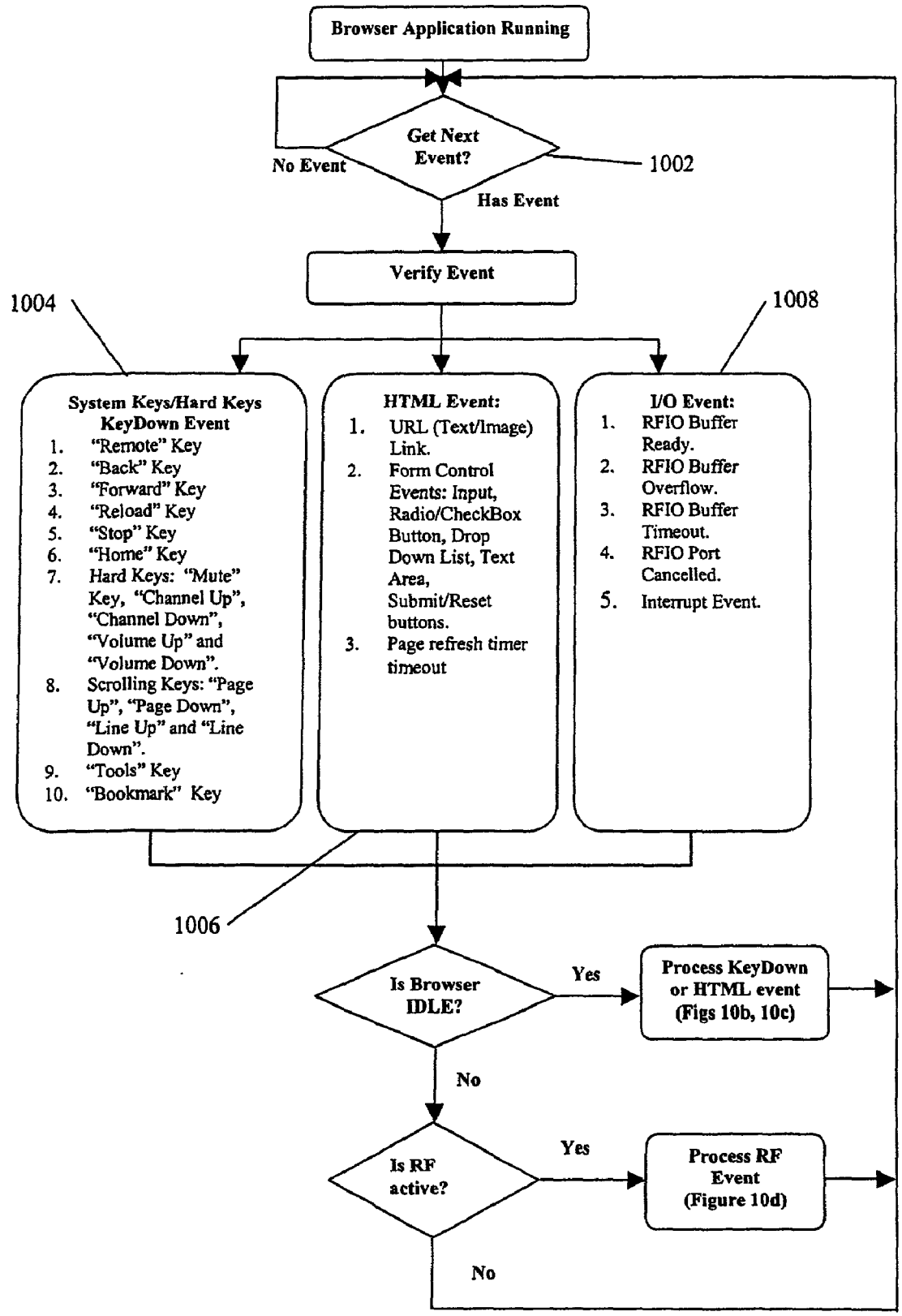
FIG. 10 illustrates an exemplary operational sequence of the browser application resident on the universal remote control illustrated in FIG. 1.
Figure 11:
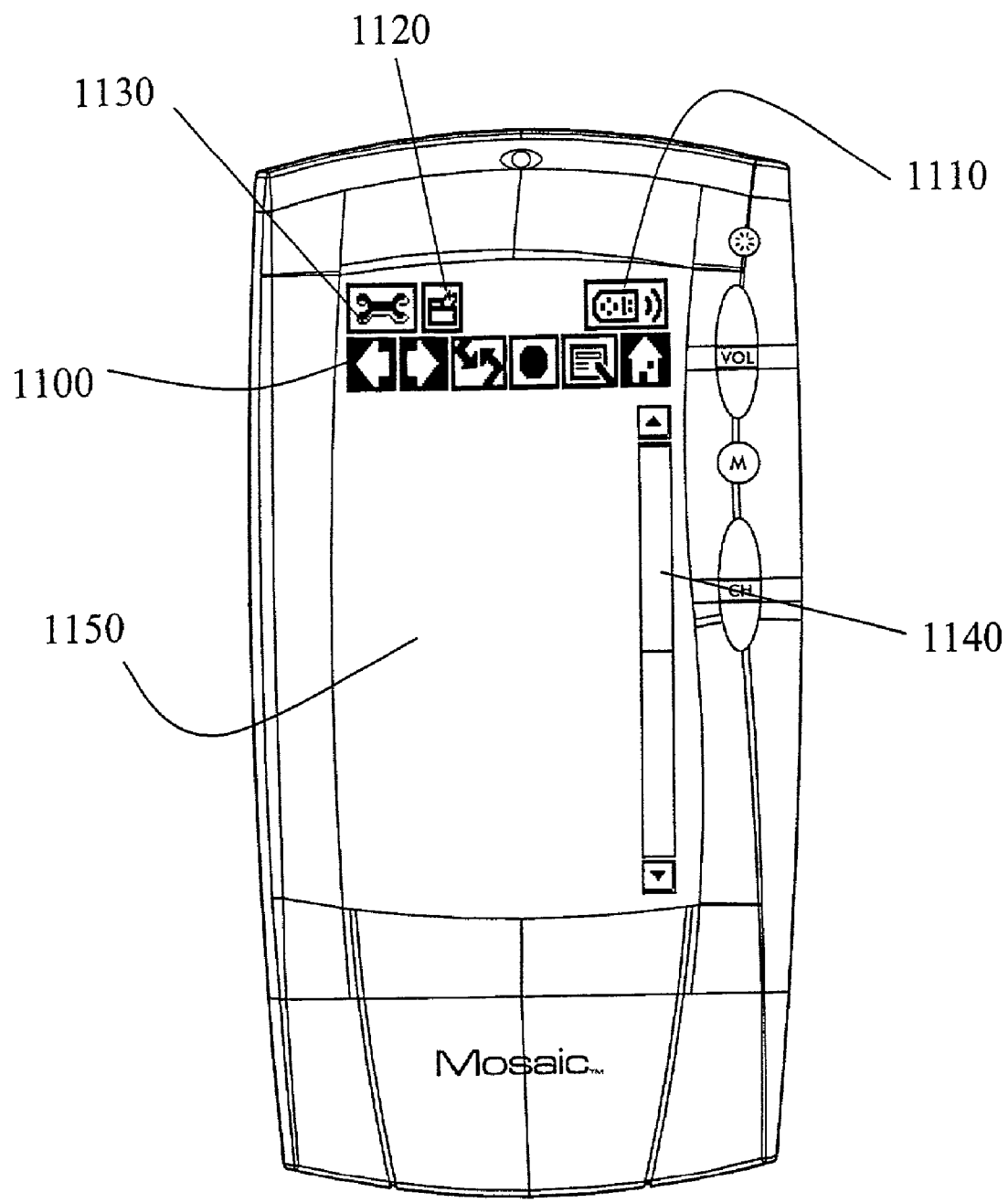
FIG. 11 illustrates an exemplary browser screen layout capable of being displayed on the universal remote control of FIG. 1.

Turning to FIG. 10a, there is shown the overall flow of the exemplary Browser application. As described earlier, the remote control 10 is an event-driven system, so once initialized, the Browser Application simply waits for an Event to occur 1002. Browser-related Events can be classified into one of three general categories: KeyDown Events 1004 which result from user activation of any of the keys shown in FIG. 11 (hard or soft); HTML Events 1006 which result from user activation of an HTML generated item in the current display area (for example a hyperlink, check box, text input area, etc.); and I/O Events 1008 resulting from activity on the two way communication link, timers, or other system-generated interrupts (a low battery indication, for example). The individual processing of each of these categories of Event will be described in further detail below in conjunction with the figures that follow.

In one exemplary embodiment, internal priorities within the Browser Application are arranged such that, while in the process of loading and displaying a page of data via the RF link, it will ignore other inputs such as HTML Events. In other words, it is designed such that a user is required to wait until the current page is completely displayed before initiating any action such as a hyperlink selection. This is evident in FIG. 10a where the "IDLE" status of the Browser application (i.e., not currently loading data via the RF link) is used to determine whether KeyDown and HTML events are processed or not. It will be appreciated that other implementations are also possible, in particular, providing the ability to abort an HTML download in progress and initiate a new one by pressing a key or hyperlink in a partially loaded and displayed page.

Figure 10B:
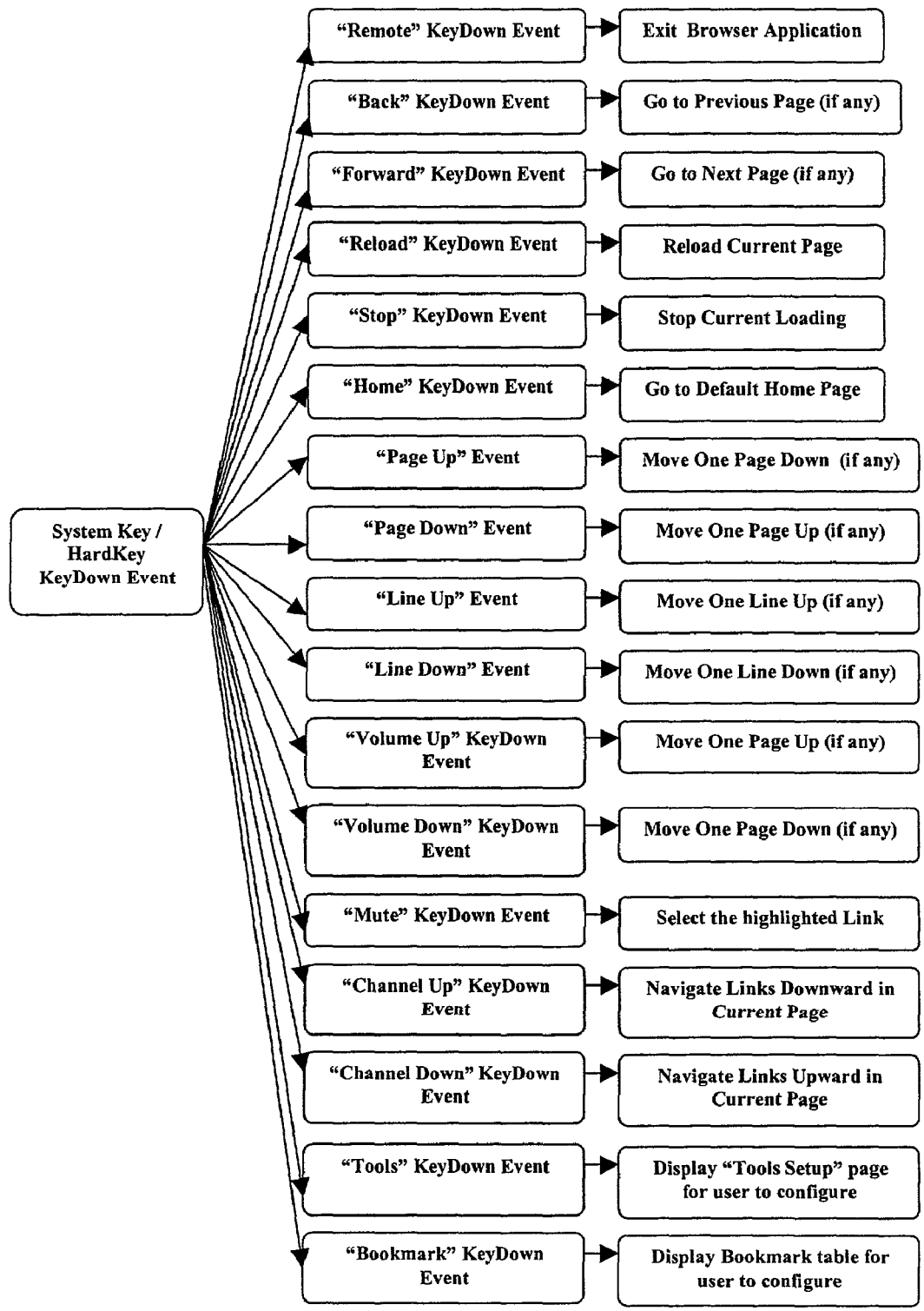

FIG. 10b depicts the processing of a KeyDown Event, specifically the action taken in response to each of the possible key press user inputs. As can be seen, these actions are used to effect page navigation and browser control in addition to providing a means to configure the Browser Application and to return the unit to the (default) Remote Control Application.

Figure 10C:
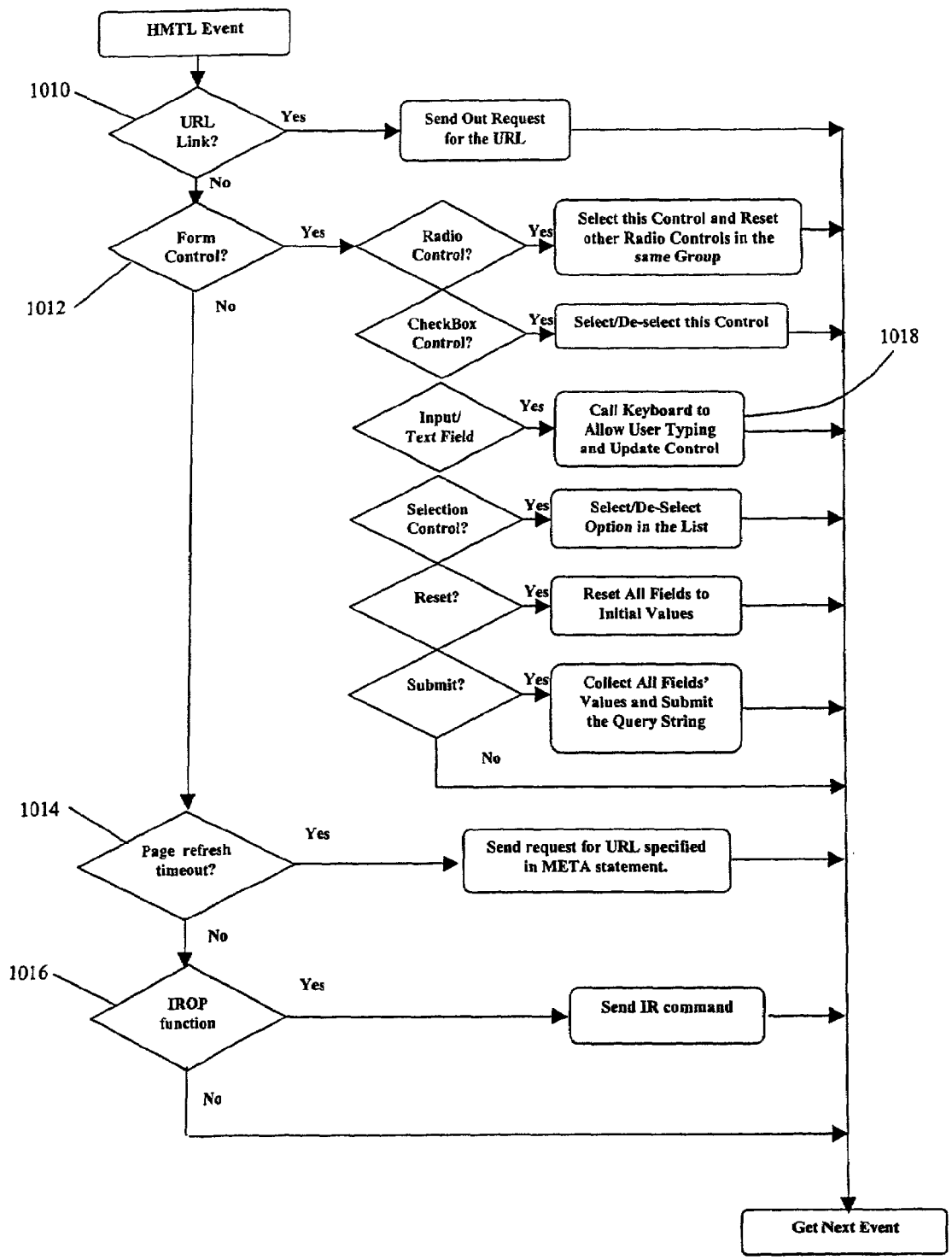

FIG. 10c depicts the processing of an HTML Event. In the HTML subset supported by the exemplary Browser Application, only four classes of HTML Events can occur: Activation of a hyperlink 1010; activation of a form control field 1012; expiration of a "refresh" META statement timer 1014 (a special extension to standard HTML which allows periodic reloading of a page); or activation of a IROP field 1016 (a special extension to standard HTML which allows IR commands to be transmitted to consumer appliances). Activation of a hyperlink results in a request for the contents of the specified URL to be issued via the communications link, after which the Browser Application returns to the "Get Next Event" waiting state shown at the top of FIG. 10a pending receipt of the requested data. Activation of a forms control function results in the appropriate action as shown in FIG. 10b (note that not all possible HTML forms functions are supported by the subset and, therefore, unrecognized control requests may be ignored), again followed by a return to the "Get Next Event" waiting state. Expiration of a "refresh" timer causes a request to be issued via the communications link for the URL specified in the META statement (or, if no URL is specified, the current page to be automatically reloaded) and a return to the "Get Next Event" waiting state pending receipt of the requested data. Activation of an IROP control causes the Browser to issue SendIR commands to the IR Controller, as described earlier, also followed by a return to the "Get Next Event" waiting state.

Figure 10D:
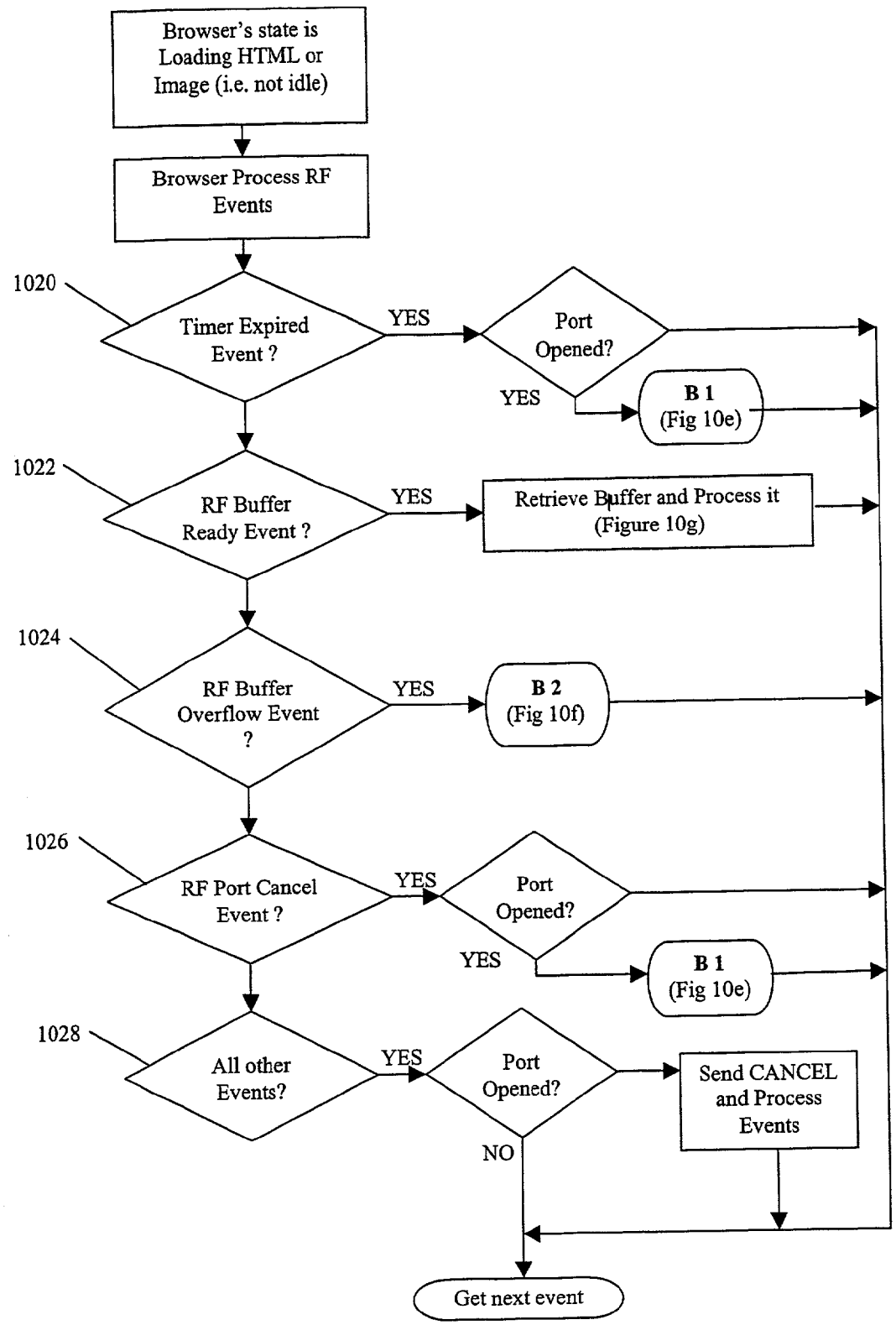
Figure 10E:
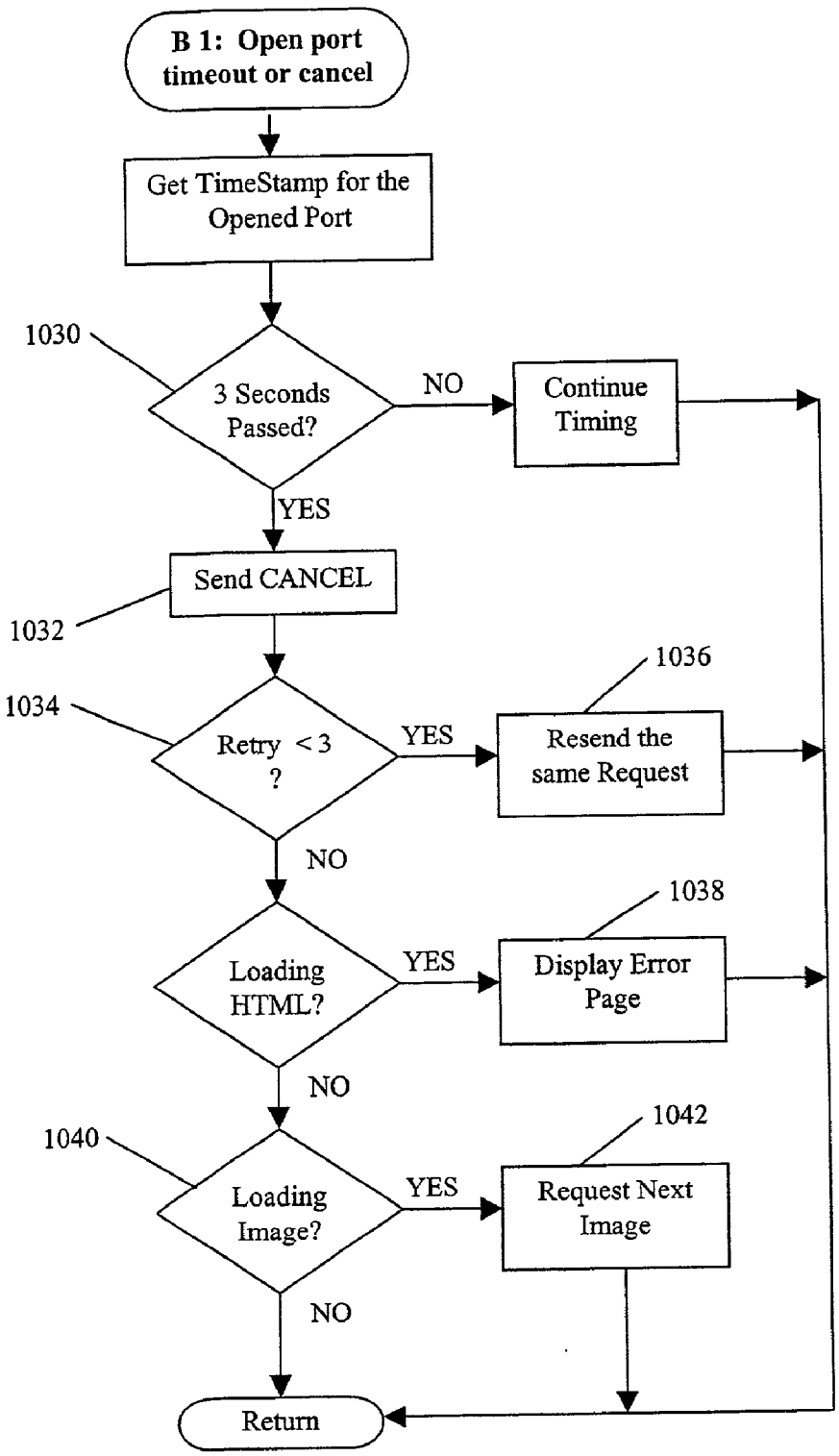
Figure 10F:
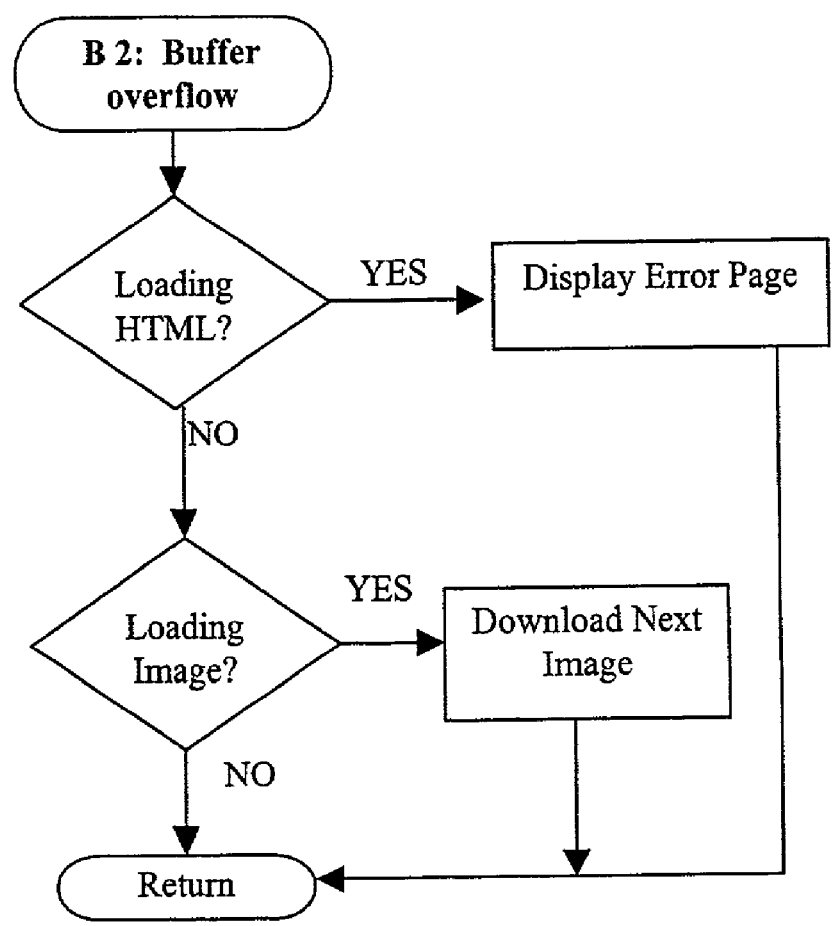
Figure 10G:
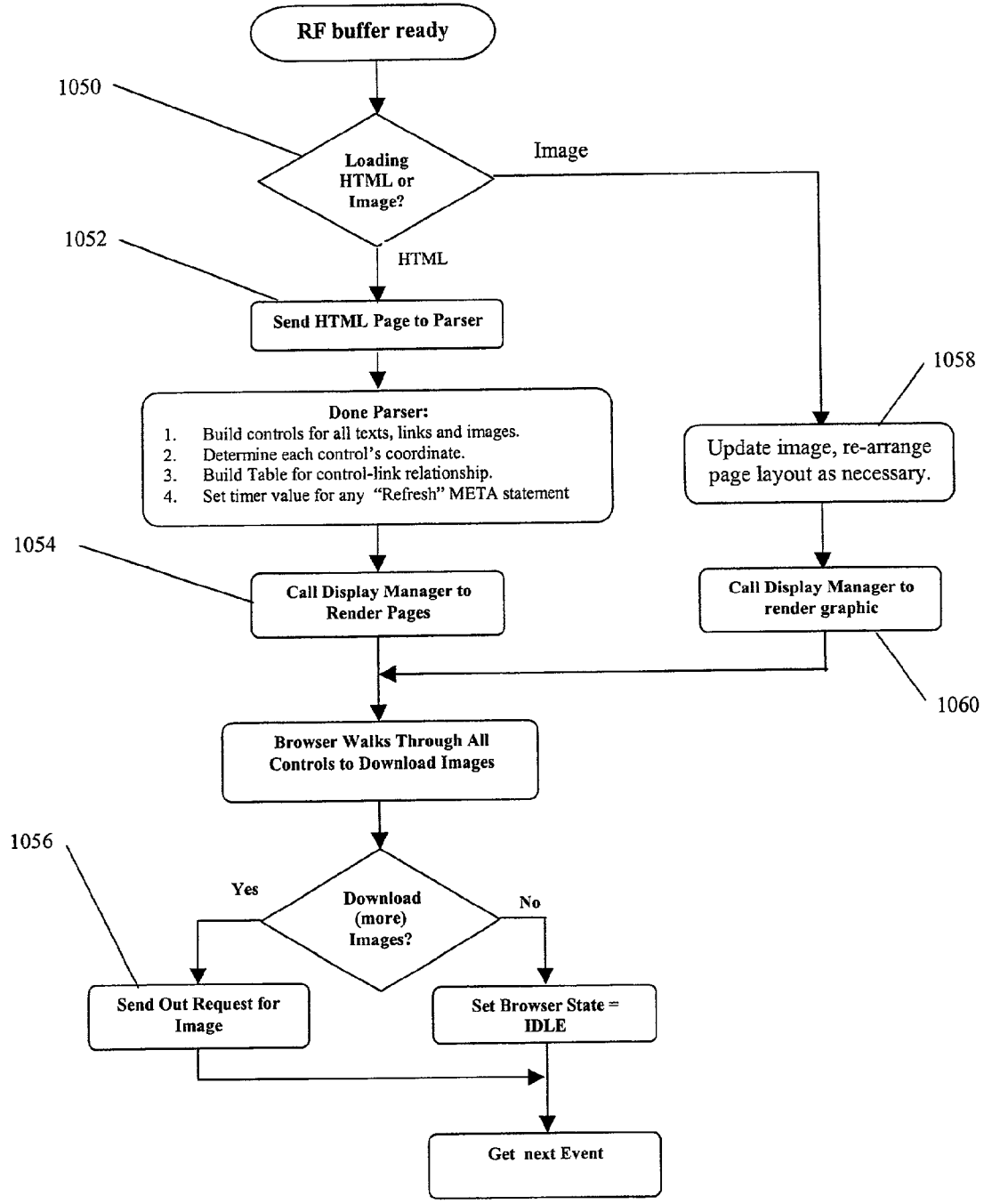

FIG. 10d depicts the processing of an RF I/O Event. All communications transactions are preferably timed in order to allow appropriate action to be taken by the Browser in the event the communications link is interrupted, for example by the user wandering out of RF range. Thus, the first I/O Event that is checked for is a timer expired status 1020. If there is a Port currently open (i.e. activity in progress) the timer expired event is handled as shown in FIG. 10e, described in more detail below. If the Event is an "RF Buffer Ready" event 1022, indicating that there is received data ready for processing, the event is handled as shown in FIG. 10g, described in more detail below. An RF buffer overflow event 1024 signifies an error condition, handled as shown in FIG. 10f, described in more detail below. If the sending (server) side issues a "Cancel" command (a request to abort transmission), this event 1026 is handled in a similar manner to a timeout event. All other types of events 1028 represent conditions which should abort any page download currently in progress (e.g. a low battery condition), and thus result in the Browser issuing a "CANCEL" request to the server (the inverse of the server "CANCEL" described previously) provided a Port is currently open.

Figure 21:
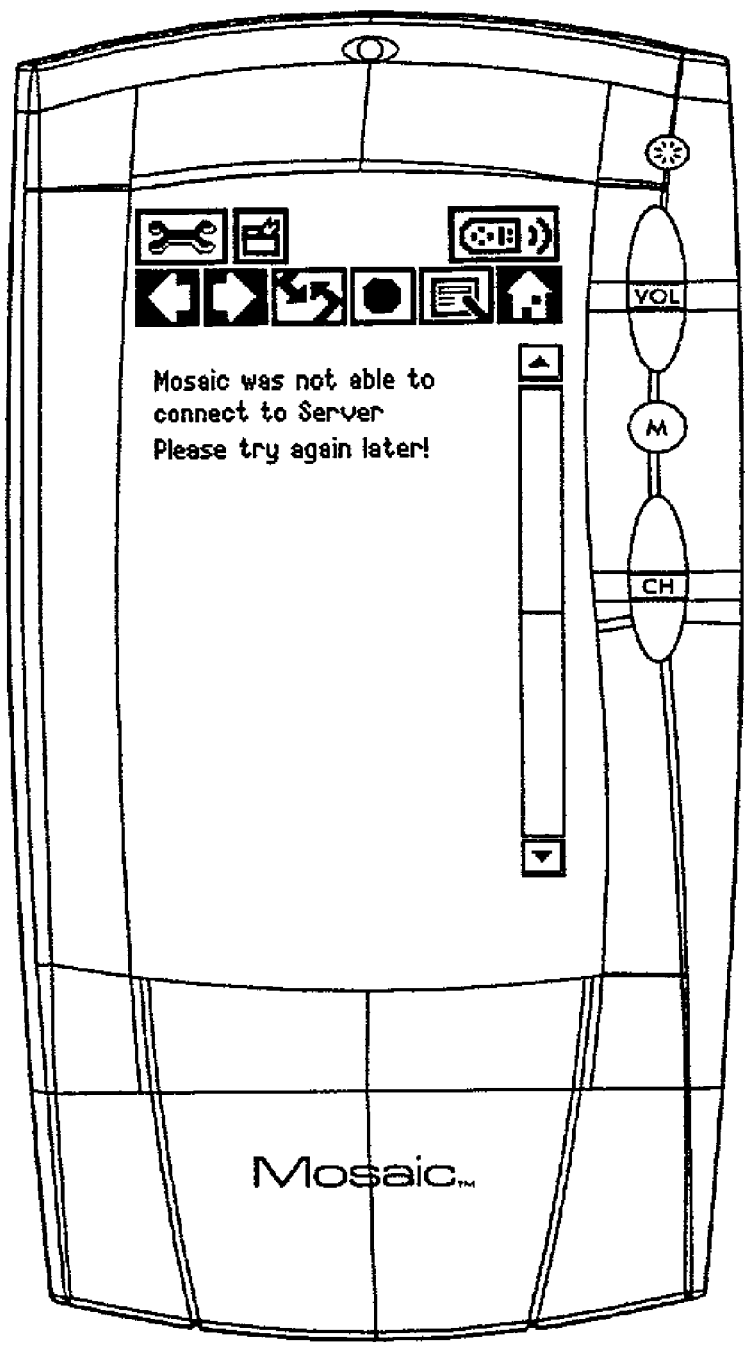
FIG. 21 illustrates an exemplary error message displayed on the remote control illustrated in FIG. 1 displayed due to an error in communication.

FIG. 10e shows the error processing invoked in the case of a timeout or a server initiated "CANCEL" request when the Browser application is not "idle," i.e. it is loading HTML or image data via the RF link. If a given time, e.g., three seconds, has not elapsed since the last activity on this port 1030, timing continues without any action. If the given time has been reached or exceeded, the Browser issues a "CANCEL" request to the server 1032. It then determines if a given number of retries, e.g., three, have already occurred for this particular request 1034. If the number or retries has not been exceeded, the Browser reissues the request 1036. If all of the retries have been exhausted, the Browser takes error action as appropriate: in the case of a failed HTML page download it may display an error message to the user 1038 (FIG. 21 is a example of such a message); if the failure occurred during the download of an image 1040, the Browser may simply skip display of that image and proceeds to request the next image 1042, if any exists. (The processing of HTML and requests for image data is described in more detail later in conjunction with FIG. 10g.)

FIG. 10f shows the error processing that occurs in the event of a buffer overflow. As can be seen, the actions taken by the remote control 10 are similar to those described above in conjunction with an exhausted retry count.

FIG. 10g shows the processing steps that occur upon receipt of a buffer full of data Events from the RF I/O Manager. In this case, the Browser first checks its internal status to determine if it is currently expecting HTML or image data 1050. If expecting HTML data, the HTML page is sent to the HTML parser 1052, which processes the HTML data and breaks it down into individual elements for display (text strings and images), position coordinates for each hyperlink or control within the display, and a table of control-link relationships. The HTML parser also sets the appropriate timer if a "refresh" META statement is encountered. When the HTML parser has completed its analysis, the display information is passed to the Display Manager 1054 for rendering on the LCD screen. Once the basic HTML page is displayed (i.e., text, links, controls, etc. together with "place holder" icons for the locations of graphic images) the Browser may then issue requests for any graphic images called out in the HTML source, loading and displaying the graphic images one by one until all specified graphics have been displayed. This is achieved by issuing a request for the next graphic file 1056 via the RF communications link and then returning to the "Get Next Event" state (FIG. 10a).

When a response is received, the next RF buffer ready Event will find the Browser in an "expecting image data" state. This will cause the opposite branch to be taken at the top of FIG. 10g. Here, the Browser, after making any necessary adjustments to page layout resulting from the insertion of the new graphic 1058, displays the graphic data just received 1060 and issues a request for the next graphic. In some instances the graphic size may have been predefined in the HTML, in which case no adjustment is necessary since the appropriate area is already allocated, but in others the final graphic may differ in size from the "place holder" icon and require adjustment to the balance of the page layout to accommodate it. After the last graphic has been downloaded and displayed, the Browser sets its internal status to "IDLE" (thereby enabling recognition of HTML and Key-Down Events) and returns to the "Get Next Event" state (FIG. 10a.)

FIG. 11 shows an exemplary, basic touch screen display layout for the remote control Browser. In the illustration, the layout comprises a toolbar 1100 containing the usual Browser control items (e.g., "back," "forward," "reload," "stop," "go to," and "home" illustrated from left to right), a key 1120 to access previously entered bookmarks, a general display area 1150 in which HTML formatted data is displayed, and a scroll bar 1140 used to navigate pages of data which are longer than the display space. In addition, the screen may include two control elements specific to the browser application, namely, a key 1130 to access set up routines used to adjust items such as RF link addresses, home page URL, etc., and a key 1110 used to return the unit to the basic remote control application 432 when use of the Browser is complete.

The "home page" URL first loaded by the Browser application need not be Web based in the classical sense. Rather, the "home page" may be an address pointing to a locally stored, HTML formatted interface to a home control system as illustrated in FIG. 12. The "home page" illustrated in FIG. 12 shows an example of how the universal remote control 10 can display simple icons and messages 1202 useful in receiving information from appliances around the home and, in turn, controlling them. In yet another example, the "home page" initially loaded might take the form of a TV guide display loaded from a cable or satellite set top box including program viewing information 1302, as illustrated in FIG. 13. Note that this particular example makes use of the "full screen" META statement 1300 as described above to hide the generic browser controls (e.g., "back," "forward," "reload," etc.) from the user.

Figure 14:
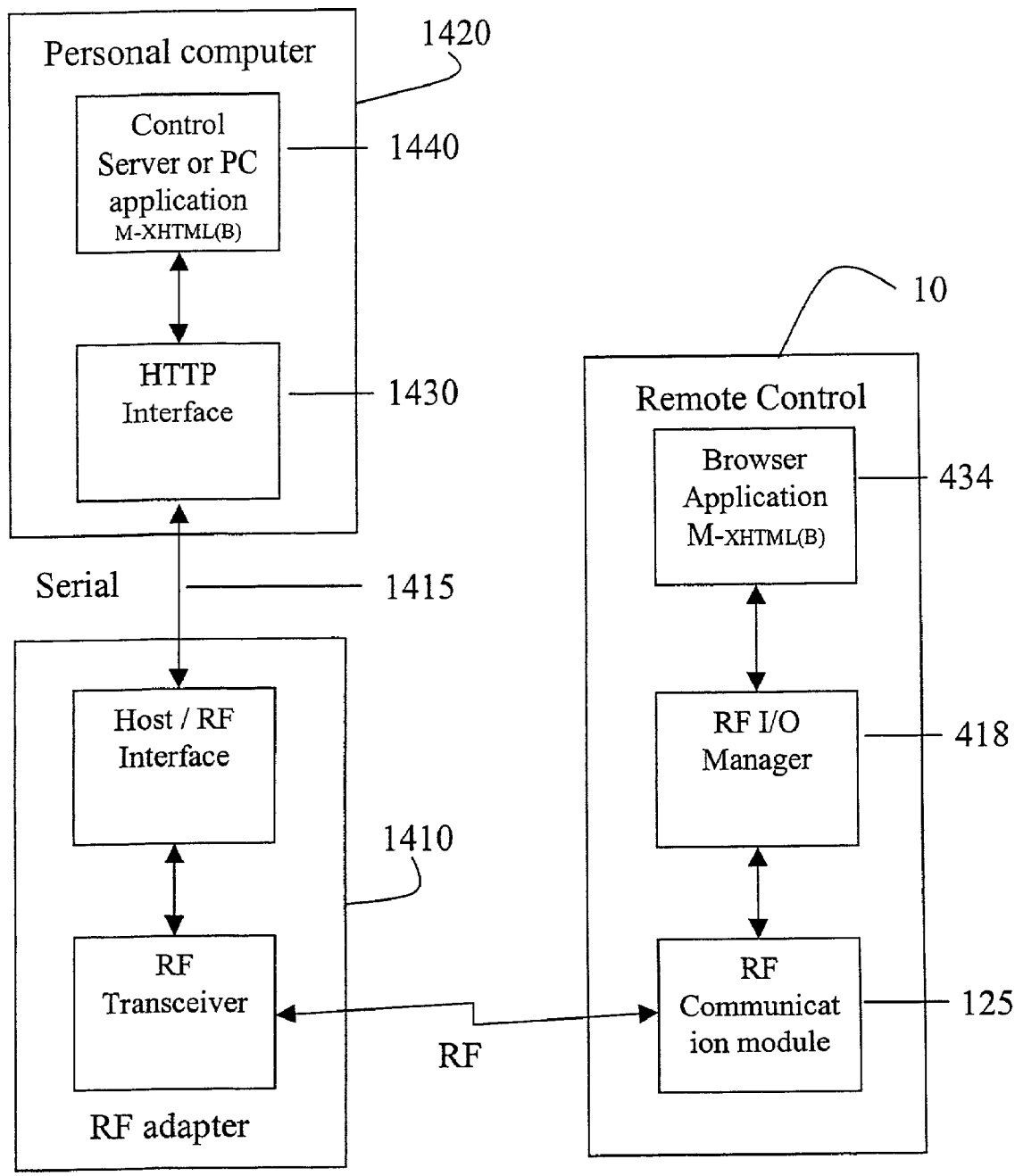
FIG. 14 illustrates a two-way communication system including a computer, a computer network, and the universal remote control illustrated in FIG. 1.

By way of further example, FIG. 14 illustrates the use of the universal remote control 10 as part of a two-way communication system. In this illustrated example, the remote control 10 is used as a platform to browse the Internet, using a personal computer 1420 as a gateway or proxy server. Requests by the user of the universal remote control 10 for access to certain information located on Web pages on the Internet are sent through the RF I/O manager 418 and RF module 125 to a matching RF transceiver unit 1410 which is attached to the personal computer 1420 via one of its serial ports 1415. Software resident in the personal computer 1420, including an HTTP interface and server application 1440, formats the request appropriately and forwards it to the specified Web URL. When a response to a request is received at the personal computer 1420, the personal computer 1420 performs any format conversion required for compatibility with the subset of HTML supported by the remote control 10, and then forwards it to the remote control 10 via the reverse of the path described above. In this manner, Web content may be ultimately displayed on the universal remote control 10.

Figure 15:
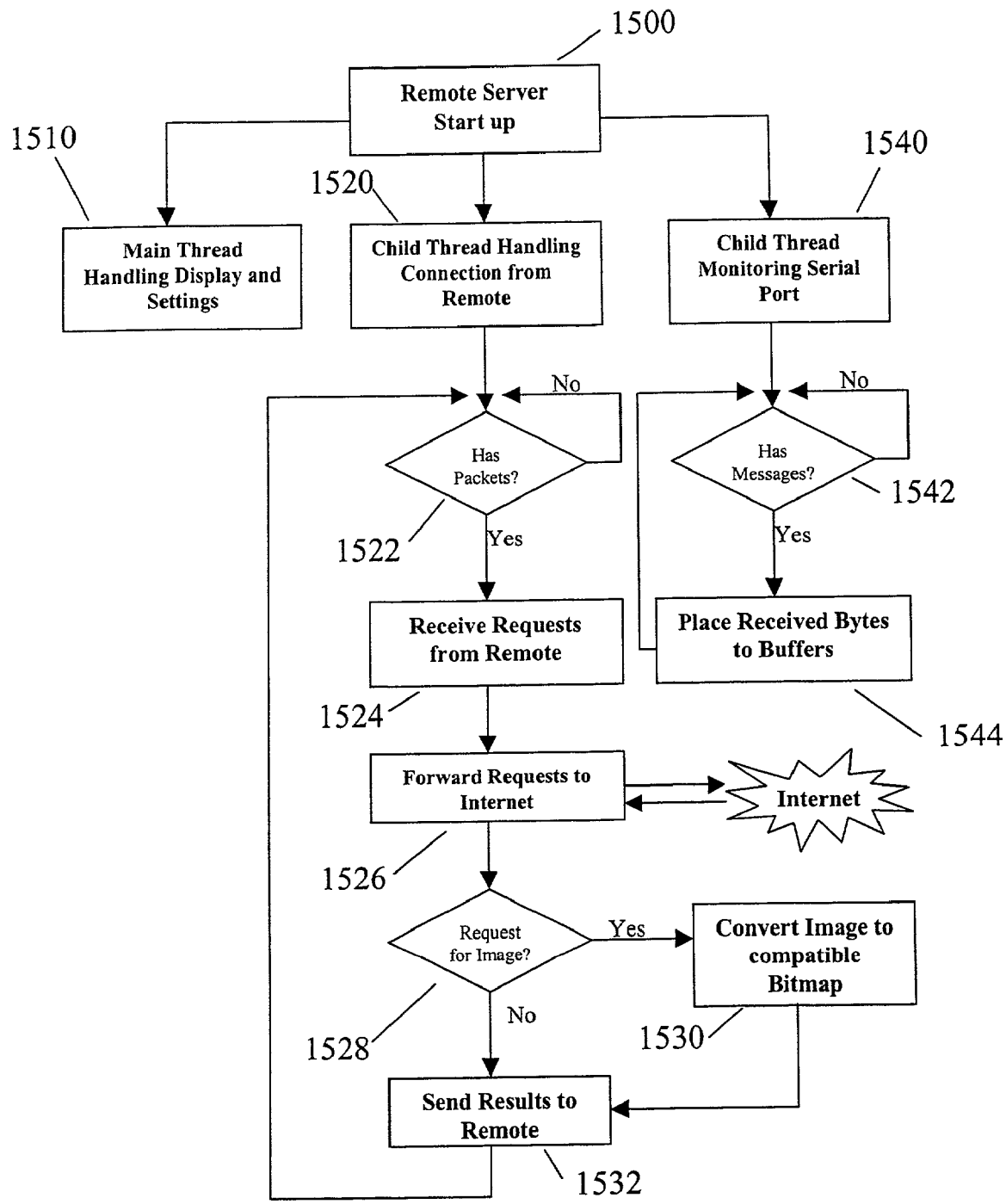
FIG. 15 illustrates an exemplary Server Application Flow Chart for use in connection with the two-way communication system illustrated in FIG. 14.

In the illustrative example, the PC application that provides the Internet access for the remote control 10 is called the server application. As illustrated in FIG. 15, the server start up module 1500 is invoked when the server application is started on the personal computer 1420. The server application manages the display (to the PC screen) and internal settings 1510, the transfer of data 1520 between the Internet and the remote control 10, and the external serial port 1540 to which the PC-side RF transceiver unit 1410 is attached. As serial messages are received 1542 they are placed in an internal data buffer 1544 from which they are subsequently processed and delivered to the Internet 1522,1524,1526. If Internet data is received 1526, then it is converted to a compatible format if necessary 1528, 1530 and then sent to the remote control 10 for display 1532. It will be appreciated that while this example uses a personal computer based Web gateway, similar systems can readily be implemented using various other devices to implement the gateway, for example a cable or satellite set top box, a Web-enabled TV set, a residential home gateway controller, a Web-enabled game console, a personal video recorder, etc.

Figure 22:
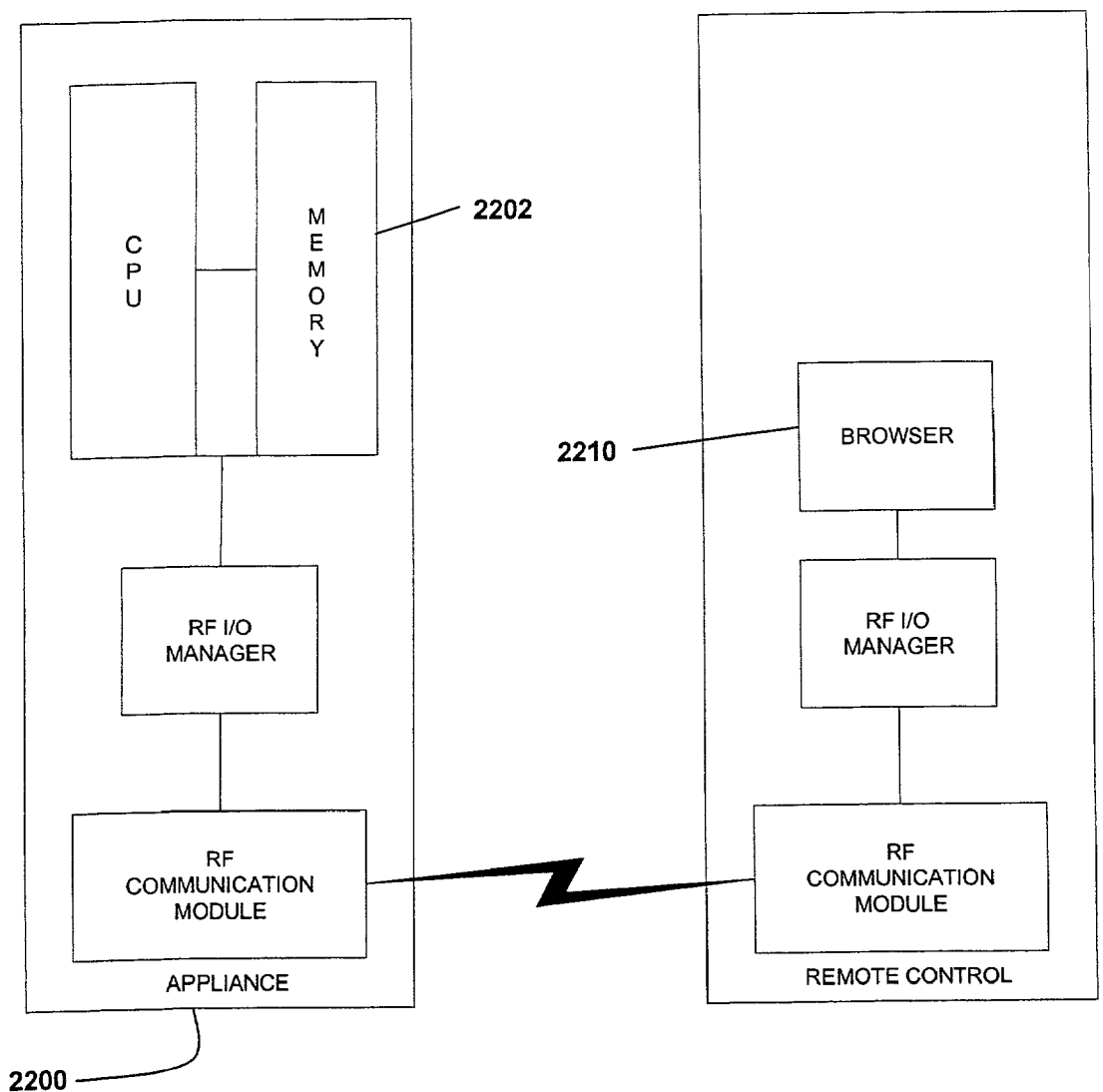
FIG. 22 illustrates a two-way communication system including an appliance and the universal remote control illustrated in FIG. 1.
Figure 23:
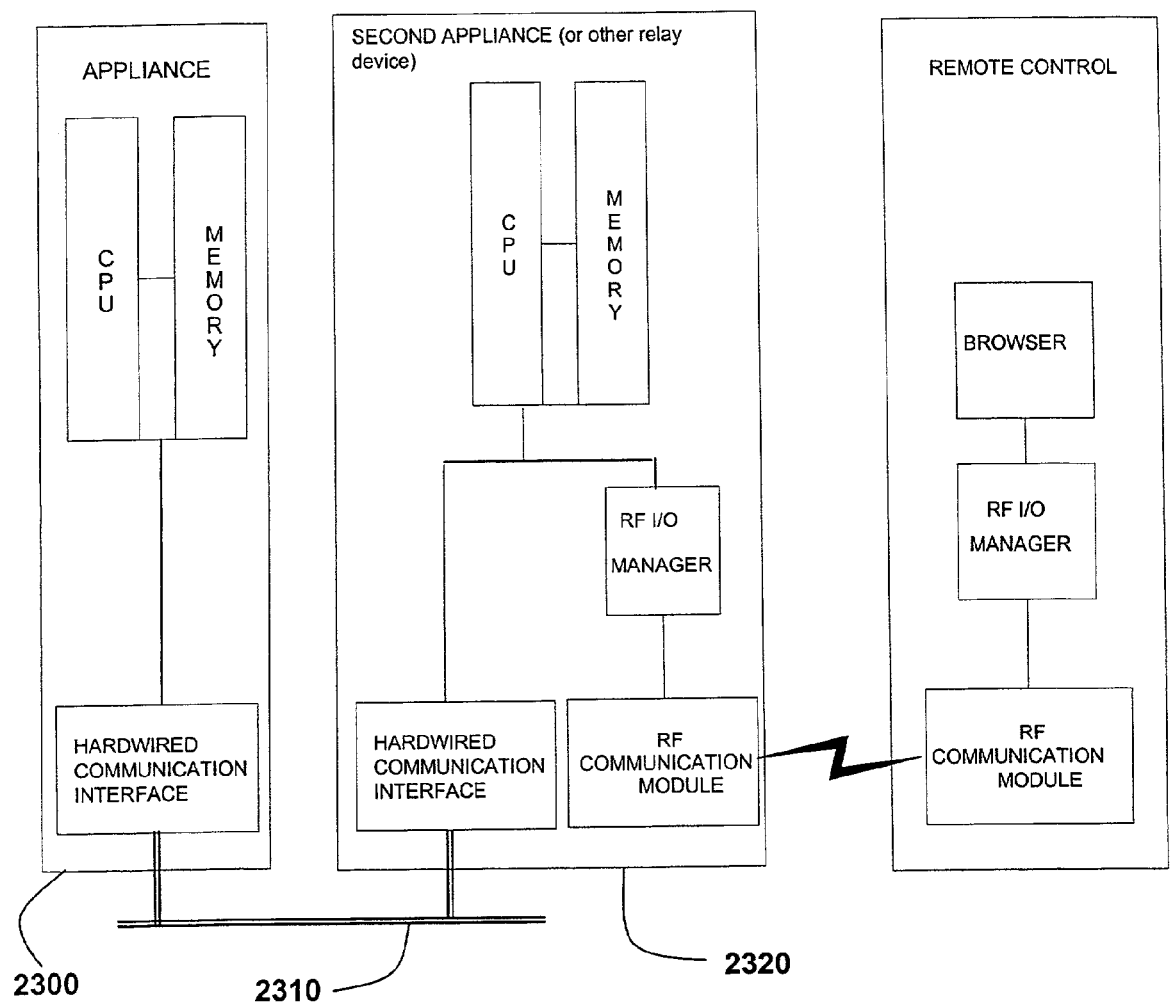
FIG. 23 illustrates an alternative two-way communication system including an appliance and the universal remote control illustrated in FIG. 1.

Once the universal remote control 10 with two-way communication is suitably installed, many new and heretofore unavailable applications can be provided. For example, of particular advantage, the remote control 10 may be equipped to communicate with an electronic device to retrieve operating instructions for display on the LCD screen 24 of the remote control 10 as illustrated in FIG. 22. In this manner, instead of a printed user manual which may be lost, a device 2200 which is already equipped to communicate bi-directionally with the remote control 10 (e.g. a cable set top box, a thermostat, a security system, a household appliance, etc.) has user manual information stored in low cost ROM memory 2202. To this end, the remote control 10 can be equipped with an application 2210 that allows its display 24 to display information that is encoded using a mark-up language, such as HTML or XML as described earlier. Thus, the user manual can be formatted using at least a subset of the mark-up language where it can be retrieved by the user from the device (e.g., in response to a keystroke on the remote) and displayed on the screen 24 of the remote control 10 as needed. In an alternative embodiment shown in FIG. 23, an appliance 2300, which is not itself equipped with wireless communication capability can use a wireless capable device 2320 as a relay to communicate with the remote control in a similar manner to that described above. In this case, the appliance 2300 would have a hardwired (e.g. dedicated wiring, powerline, telephone, video or audio cable, etc.) communication connection 2310 to the device 2320 which does have wireless capability.

Figure 18A:
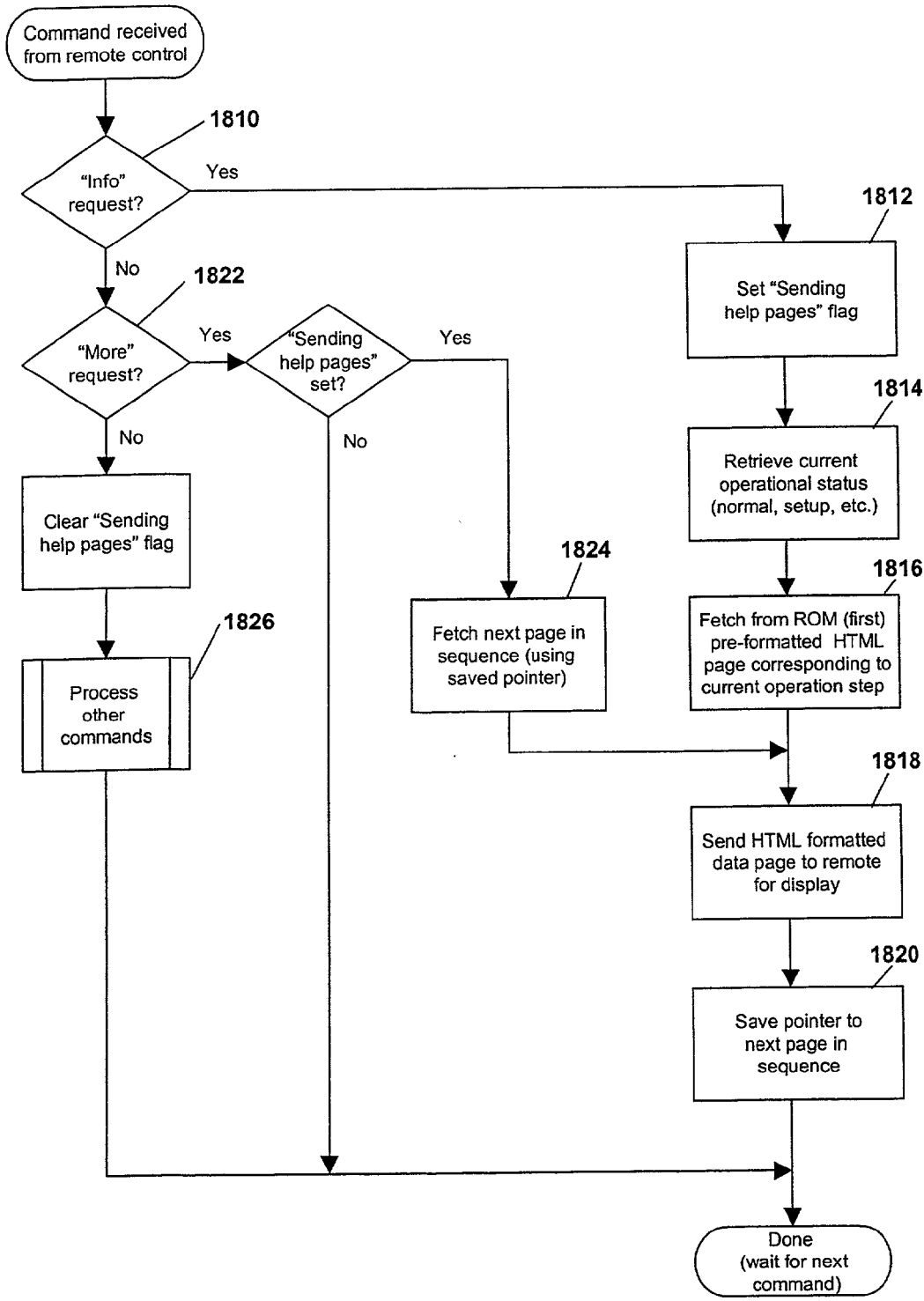
FIGS. 18a and 18b illustrate an exemplary method by which the remote control illustrated in FIG. 1 can be used to retrieve information regarding an appliance and the resulting display of an exemplary retrieved user's manual.
Figure 18B:
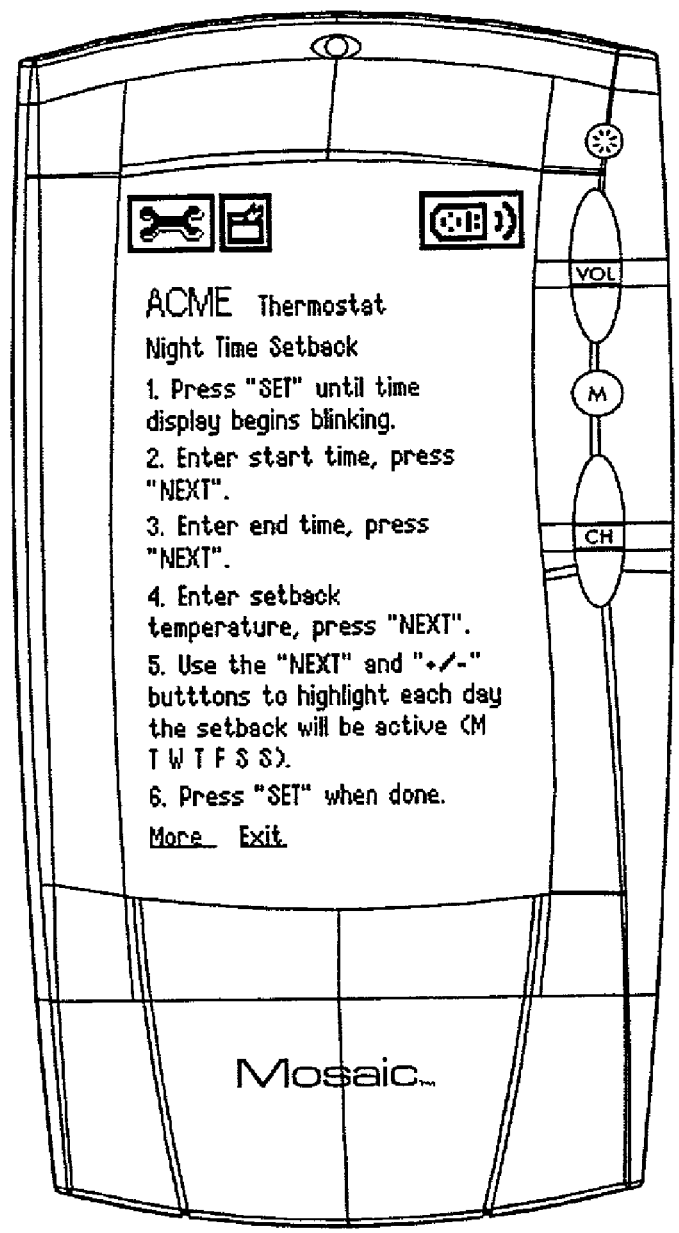

By way of illustration, FIGS. 18a and 18b set forth an exemplary method by which a thermostat unit might support the above-described information retrieval feature. To initiate the information retrieval, the remote control 10 can transmit a command to the appliance that signifies a request for the information. The transmission of the information request command by the remote control 10 would normally be in response to the occurrence of an Event at the remote control 10, e.g., the activation of a soft key. Upon receipt of a command at the appliance, the appliance determines if the command is a request for information 1810. If the command is a request for information, the appliance can set a flag to indicate that the appliance is in a state of servicing the request 1812, can retrieve its current operational status 1814, and fetch from memory a pre-formatted page that has user instructions corresponding to the current operational status 1816. The retrieved information would be transmitted 1818 back to the remote control 10 for display on the LCD 24 as illustrated in FIG. 18b.

If multiple user instruction pages are stored in memory, the appliance may further set a pointer to indicate the next page in a sequence 1820. The availability of more information would be indicated to the user in the displayed user's manual by, for example, a "more" hyper-link or button as illustrated in FIG. 18b. It will be appreciated that in the HTML, this "more" function could be associated with either a hyper-link in the conventional HTML sense, or with an IROP tag to cause an IR command to be transmitted, depending on the requirements of the particular appliance. In either case, if the user causes the remote control 10 to issue a command requesting the next page of information 1822 by activating the "more" key, the appliance will retrieve the next page of information from memory 1824, transmit 1818 the page information to the remote control 10, and update the page pointer 1820, if necessary. If the command received by the appliance from the remote control 10 is not related to the retrieval of the user's manual from the memory of the appliance, the command will be processed by the appliance in accordance with its operating instructions 1826.

In an alternative embodiment, once the make (and also possibly the model) of the device has been entered into the remote control 10 (either by direct interaction with the device or by a process of deduction based on the setup number input by the user to control the device) the user manual could be obtained via an Internet connection (using a Web site specific to the manufacturer or a generic compilation maintained by a third party). For this purpose, the remote control 10 would use the browser functionality, in conjunction with Web access via a personal computer, set top box, or the like, as previously described. In this case, if the model of the consumer appliance were important to which user manual were to be displayed (i.e., multiple user manuals for multiple models of appliances), and only the make of the consumer appliance were provided, the Web site could offer a list of selectable model numbers and/or pose one or more questions to the user by which questions it could be deduced which user manual the Web site should provide to the user (e.g., does your TV support PIP, etc.).

Figure 19B:
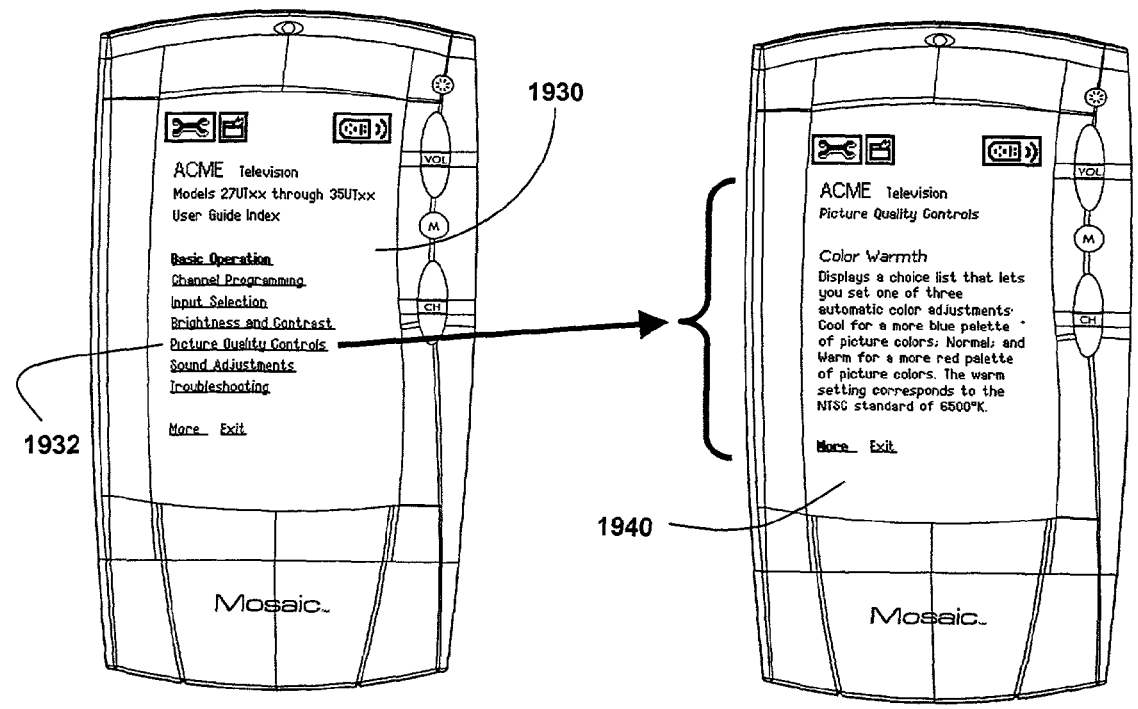

By way of further example, FIGS. 19a and 19b illustrate one method by which the remote control 10 might support Web based retrieval of a user's guide. In the illustrated embodiment, the Remote Control Application is provided with a soft key (labeled, for example, "Info") which causes the Application to retrieve 1910 the current device set up information, i.e., the code number provided by the user via one of the methods described earlier in conjunction with the setup sub-application 501, and invoke the Browser Application using this information as a parameter 1920. Once the Browser Application is invoked, the Browser can issue a request via the Internet to retrieve the Web pages corresponding to the user's manual for the device indicated by the device set-up code number 1922. To this end, the Browser application might consult a URL look-up table stored in memory that functions to map URLs of Web pages with the devices cross-referenced by the device set-up code numbers. As an alternative to storing a URL look-up table in local memory the Browser application might first access a separate URL that itself contains such a table. In either case, once the URL corresponding to the specific device user's manual has been located, the initial Web page retrieved from that Internet site would generally comprise a Main Index page 1930 having hyper-links 1932 to Web pages 1940 that contain further detailed information, an example of which is illustrated in FIG. 19b.

Figure 20:
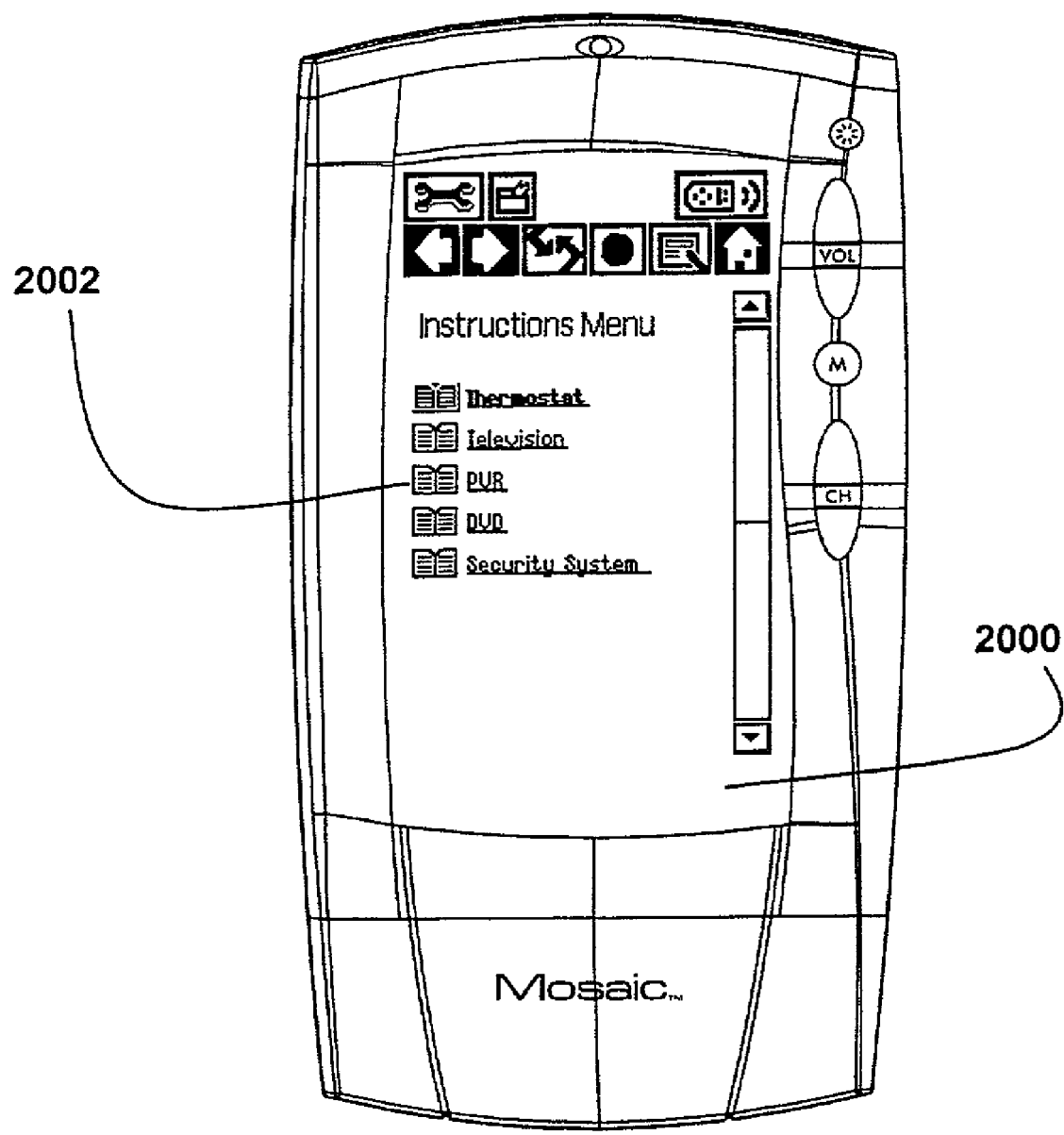
FIG. 20 illustrates an exemplary menu page for use in retrieving information regarding an appliance displayed on the remote control illustrated in FIG. 1.

In yet another alternative embodiment, the Browser Application, starting with an internally stored HTML page, could present the user with a menu of devices 2000 for which instructions are available as illustrated in FIG. 20. Depending on the item selected by the user, HTML links 2002 associated with the menu of devices 2000 could point to further internal pages which initiate a download from a local device using for example an IROP tag (or it's RF equivalent) in the manner described in conjunction with FIG. 18 above. Alternatively, links can be provided that point to external, Web-based sources for the user information in the manner described in conjunction with FIG. 19 above.

Figure 16:
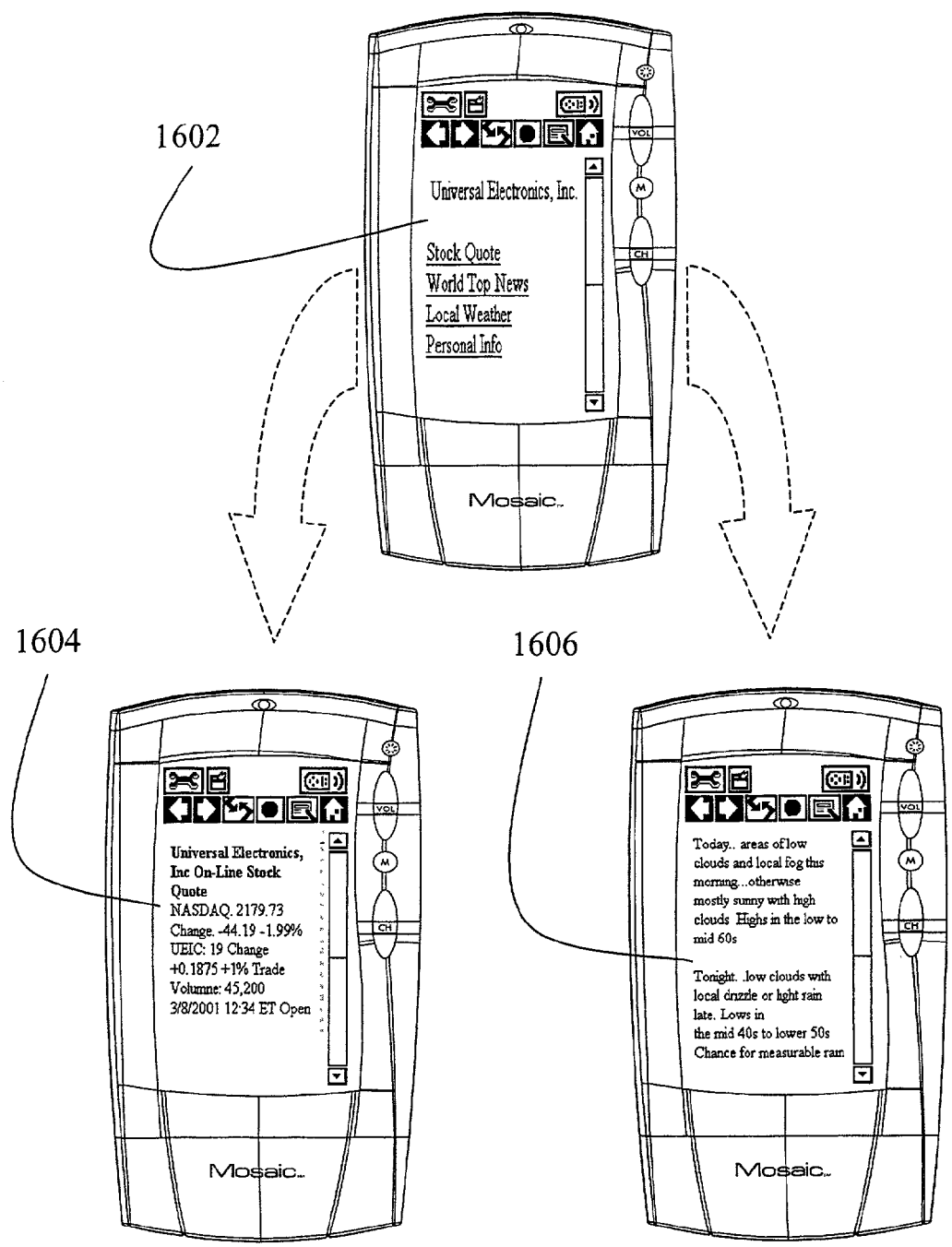
FIG. 16 illustrates an exemplary display of Web-based data using the browser of the universal remote control illustrated in FIG. 1.

Providing the remote control 10 with browser capabilities has further advantages. For example, the remote control 10 could access Web sites, via a set top box, an adapter connected to a PC (especially in homes where the PC is always connected to a network, for example, by way of a cable modem or DSL-based Internet connection), directly to an ISP (provided the remote is equipped with a modem) or other gateway device to gather information, such as, weather, stock quotes, movie reviews, etc., as illustrated in FIG. 16, in the manner previously described in conjunction with FIGS. 14 and 15.

Figure 27:
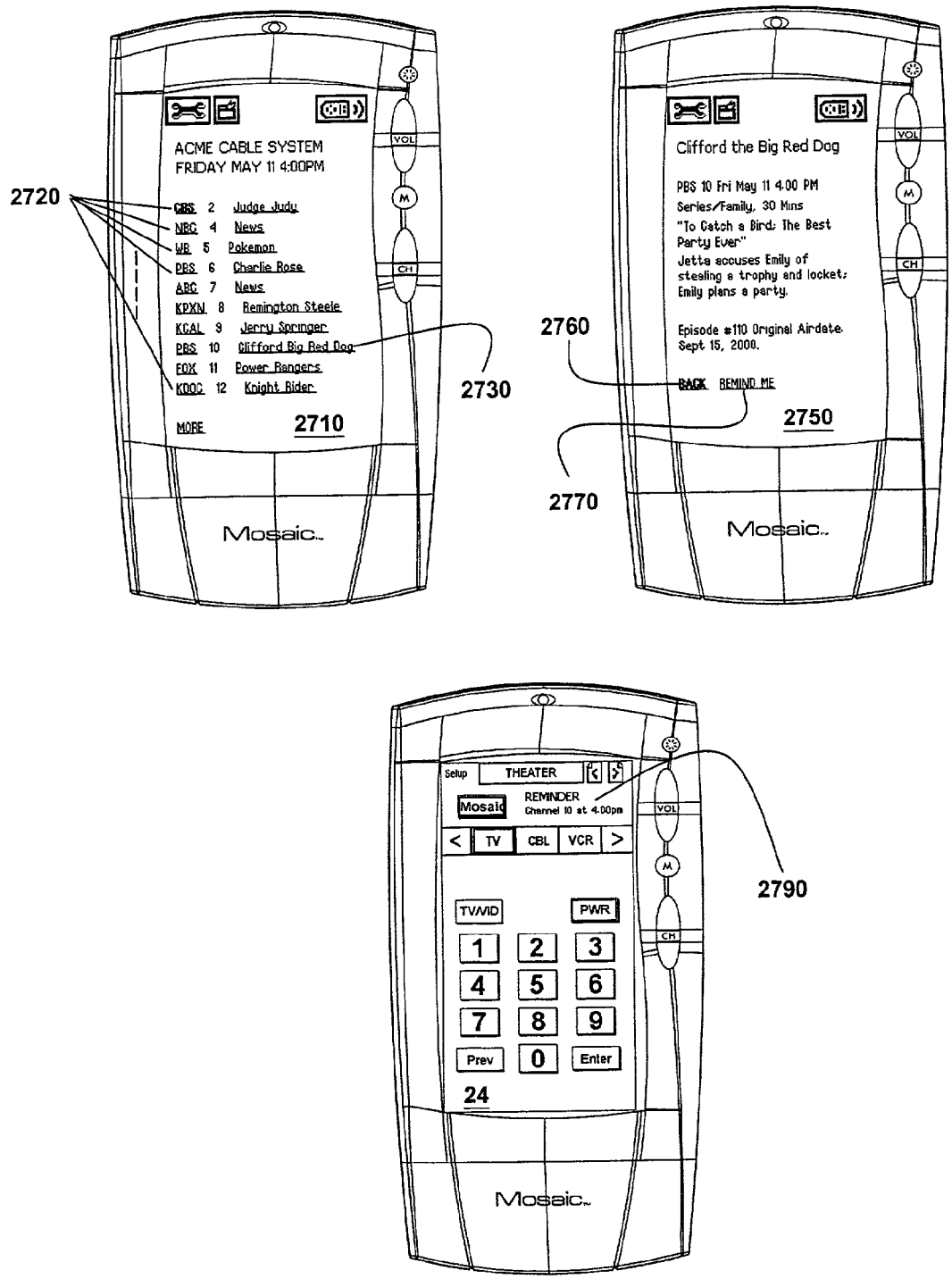
FIG. 27 illustrates an exemplary display of screens used to display TV guide information and to set and display reminders to watch certain shows using the remote control illustrated in FIG. 1.

In a further embodiment, the display 24 of the remote control 10 could be used to display television viewing guide information, with personalization and/or reminder capabilities. Such guide data may be obtained directly from an Internet server, using a local PC, set top box, home gateway or the like as a proxy server as described in conjunction with FIGS. 14,15 and 16. The guide data may also be retrieved from data locally resident in a PC or set top box that periodically obtains and stores guide information by, for example, dialing a predetermined number or accessing a particular Web site every night. In either case, the TV guide data, formatted into a compatible subset of HTML, is transmitted to the remote control for display at the request of the user. One such form of display is shown, together with the HTML that generated it, in FIG. 13. An alternative form for displaying guide information is shown in FIG. 27. While additional capabilities will be described in conjunction with FIG. 27, it will be appreciated that, since these displays are created by HTML source pages, many other layouts offering equivalent functionality are also possible.

Turning to FIG. 27, FIG. 27 shows a "list" guide 2710 in which the programs available at a selected time and date are listed, in channel number sequence, for multiple TV channels. Alternative arrangements of this list are possible, for example, displaying listings for a channel rather than for a time (i.e., all programs to be broadcast by a selected channel are listed in a time sequence) or displaying a list that is not sequential by channel number but instead arranged to match a user's preferences by broadcast channel and/or content type as will be described in more detail later in conjunction with FIG. 30.

To effect rapid selection of a program of interest, the remote control 10 can be adapted such that selecting (touching) any of the broadcast station identifiers 2720 listed on the display 2710 will activate an IROP HTML tag, as described earlier, to cause the remote control to issue the command to switch the TV (or set top box in the case of cable or satellite subscribers) to the corresponding channel. For example, as illustrated in the exemplary embodiment shown in FIG. 27, selecting "PBS" will cause the remote control to issue the commands to cause the corresponding appliance to switch to channel 10.

The remote control 10 can be further adapted such that selection of the title of the program, for example "Clifford Big Red Dog" 2730, will result in the display of additional information regarding that particular program. In this illustrative embodiment, touching one of the program names activates an HTML tag which points to other HTML page(s) containing additional information regarding that program. Once again, such additional information page(s) may be resident locally or may be accessed via the Web. In the example shown, screen display 2750 is the result of selecting "Clifford Big Red Dog" 2730 on the initial display 2710. In this manner television viewing guide information can offer Web links to additional information about shows, for example movie reviews, that are accessible by an individual user using the Web browser without disturbing the TV screen display of the program currently being viewed by others.

The TV guide information displayed on the remote control can also be presented in differing forms to suit the preferences of individual users. By way of example, FIG. 30 illustrates a system in which the order of the show listings is arranged according to individual preferences. In this example, upon initiation of the guide function, users are presented with a screen 3010 which prompts the user for identifying information, such as a password. Based on the input received, the same TV guide entries may be presented in different orders 3020, 3030, 3040 to match the user's individual preferences. While only a single page of guide information is illustrated in FIG. 30 for the sake of simplicity, it will be appreciated that that this feature is of particular utility when the guide information spans multiple pages and the users are spared excessive paging back and forth by virtue of their favorite shows appearing in the first pages(s) of the display.

Another feature also illustrated in FIG. 30 is the possibility of "filtering" listings. For example, a closer examination of the listing display 3040 corresponding to the child "Maggie" will reveal that KCAL Channel 9's "Jerry Springer Show" is not listed as a viewing choice for Maggie. Importantly, it should also be realized that although the feature is illustrated in this example via the sharing of a single remote control by three different individuals who identify themselves to the unit with each use, it could equally be implemented using three different remote controls, i.e. each user provided with a personal remote control customized to their particular preferences. An advantage to having the television viewing guide resident in the remote control 10 is that it allows such unique features to be offered to the consumer.

By way of further example, in cases where the remote control hardware supports a time-of-day clock, the remote control 10 could be used to issue a "missing program" reminder if it detects activity which indicates that the user is not currently watching TV (i.e., the remote is in a mode for controlling the operation of a CD player, audio equipment commands being issued, etc. and the user has programmed a reminder to watch a particular show). The remote control 10 could similarly be used to remind the user of "tonight's favorite programs" when it detects the user turning the TV on in the evening after a pre-determined "off" period which indicates that the user was away from home. The favorites could be entered by the user or determined from previous viewing habits (e.g., by tracking channel selections in time slots for a given day), etc.

For entering reminders into the remote control 10, an exemplary embodiment is illustrated in FIG. 27. Turning again to the program detail display 2750, two exit options are provided to the user. The first exit option, "BACK" 2760, simply returns the user to the previous page 2710. The second option, "REMIND ME" 2770 is associated with an MREM tag embedded in the HTML. Selection of this option will cause the Browser Application to extract the date, time, and program information contained in the MREM tag and register this data with the reminder function of the Remote Control Application for subsequent action as described in further detail later. More specifically, the Browser Application will store within a table in memory 110 the information pertaining to the reminder events. For example, when the Browser application encounters <MREM TTR="5-11-2001-16:00" LABEL="REMINDER: Channel 10 at 4:00 pm">, the Browser application would register a message display 2790 to appear at or near 4:00 pm on May 11, 2001. Thus, the Browser Application populates the table with the date/time, message, image, and URL link information from each MREM tag.

Figure 28:
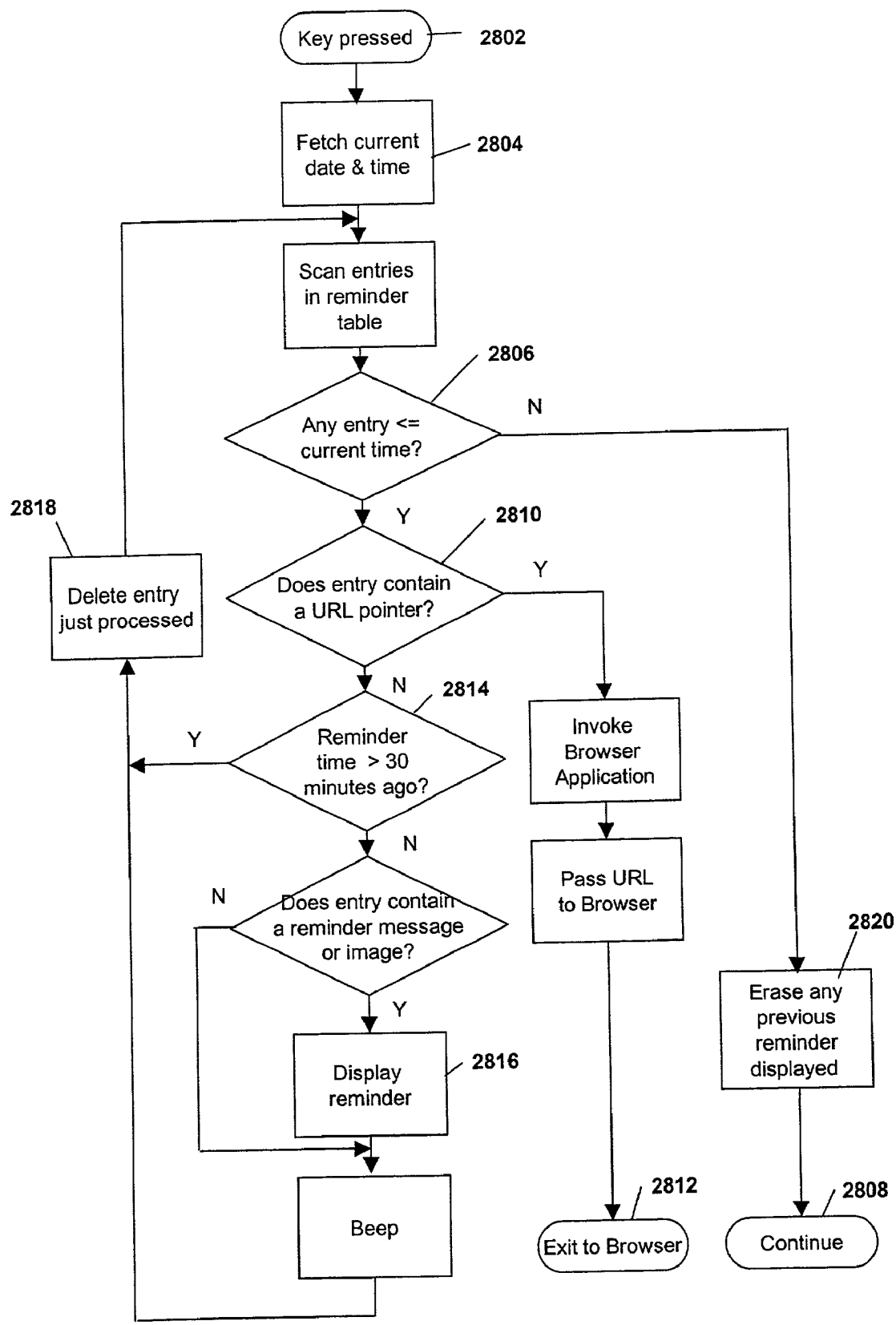
FIG. 28 illustrates an exemplary method by which the remote control illustrated in FIG. 1 can generate reminder displays of the type illustrated in FIG. 27.

To produce a reminder message 2790 on the standard remote control display 24 at an appropriate time, the steps illustrated in FIG. 28 can be followed. Turning now to FIG. 28, which illustrates an exemplary method by which reminder data is subsequently processed by the remote control application, whenever a key (hard or soft) is pressed 2802 by the user, movement of the remote control 10 is sensed, etc., the Remote Control Application first fetches the current time value 2804 and compares 2806 this value to those contained in the table of reminder data. If no entry exists in the table with a time value which is earlier than or equal to the current time, no reminder actions are required and the Remote Control Application continues 2808 to process the event in the usual manner. When no reminder actions are necessary, the remote control 10 can erase 2820 any previous reminder messages that had been displayed.

If, however, an entry is found in the table of reminder data with a time value less than or equal to the current time, the Remote Control Application next checks 2810 if the entry in question contains a URL pointer value (as described earlier in connection with the MREM tag definition, URL and message fields may be null) and, if a URL pointer exists, the Remote Control Application immediately invokes and passes control to the Browser Application 2812 to load and act on the specified HTML page. Thus, in this implementation, existence of a URL pointer takes priority over both any reminder message text as well as any remote control action called for by the key press which initiated table scan. It will, however, be appreciated by those skilled in the art that other prioritizations are possible.

If no URL pointer is present, the Remote Control Application next checks 2814 if the reminder table entry is "stale," i.e., reminders are scheduled for a time more than 30 minutes ago. If so, it simply ignores the message, deleting the table entry 2818 with no further action. Once again, those skilled in the art will recognize that other implementations are possible using a longer, shorter, or even no measure of "staleness." The 30 minute value in this exemplary implementation was selected as appropriate for the TV guide reminder feature it is being described in connection with.

If the entry is determined to be "not stale" or valid, the Remote Control Application then checks for the existence of any reminder display data, text, or graphic and generates 2816 any reminder message display required, e.g. 2790. A reminder may also cause the buzzer 102 to emit a sound, providing emphasis to the display. Thereafter, the Remote Control Application can delete 2818 the reminder table entry it has just acted upon and continue to scan and process any further table entries which may also be eligible for action.

Of particular advantage to this implementation of a reminder feature is the fact that the remote control logic is able to detect when the unit is in use (e.g., the consumer is pressing buttons, moved the remote, etc.) and thus displays the reminder message when the unit is actually in the consumers hand, as opposed to a passive display system dependent only on a timer where a reminder message would be displayed regardless of whether anyone is there to see it or not.

Use of the MREM tag is not limited to TV show reminders. When the remote control is used in communication with a PC or home automation server as described in conjunction with FIG. 14, application programs running on these devices can download appointment reminders, medication schedule reminders, etc. into the remote control via an HTML page in the manner described above. Equally, set top boxes could download reminders of special features, upcoming pay-per-view events, etc. Further, for use in connection with home automation applications, the reminder feature of remote control 10 can be used in conjunction with appliances and home systems to allow alarms and status messages to be displayed on the display 24 of the remote control 10 (e.g., freezer quit, oven timer expired, garage door ajar). To this end, the remote control 10 could periodically poll appliances or home automation servers and store messages received in the form of reminder tags to later inform the user ("beep and display") when the remote control 10 senses activity on the part of the user—i.e. the remote control 10 determines that it is being handled/looked at by a user.

In still another embodiment, the display 24 of the remote control 10 could be used to present closed caption text. To this end, a TV or set top box equipped (or retrofitted) with closed caption capability can communicate with the remote control 10 to transmit the closed caption data stream to the remote control 10 instead of the TV screen. When closed captioning is displayed on the screen 24 of the remote control 10 it allows one person to utilize the caption feature without affecting the program display on the TV screen.

Figure 25:
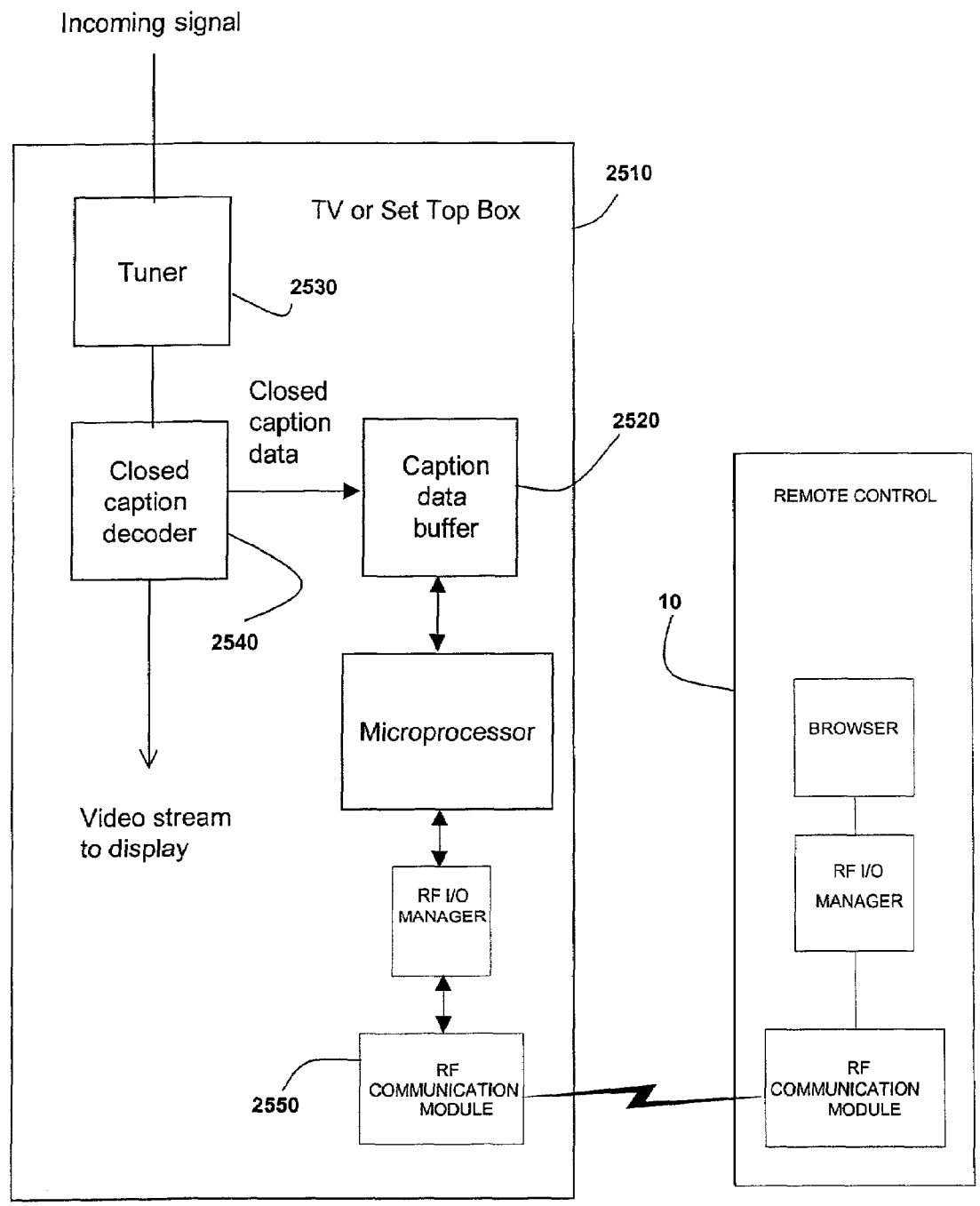
FIG. 25 illustrates an exemplary system for use in displaying closed captioning information using the remote control illustrated in FIG. 1.

To effect the display of close captioning information, the system may be arranged as illustrated in FIG. 25. In particular, the remote control 10 is adapted to communicate with a television, set-top box, or like device 2510 that has a memory 2520 in which the closed captioning information to be displayed is stored. In the illustrated example, the closed captioning information stored in the memory 2520 of the device 2510 is extracted from an incoming video signal using a tuner 2530 and closed caption decoder 2540. It will be appreciated that the closed captioning information may be included in a vertical blanking interval ("VBI") of the incoming video signal. While the illustrated example shows the closed captioning information being downloaded to the memory 2520 from an incoming video signal, it is contemplated that the closed captioning information can be received from other sources such as, for example, the Internet.

Figure 26:
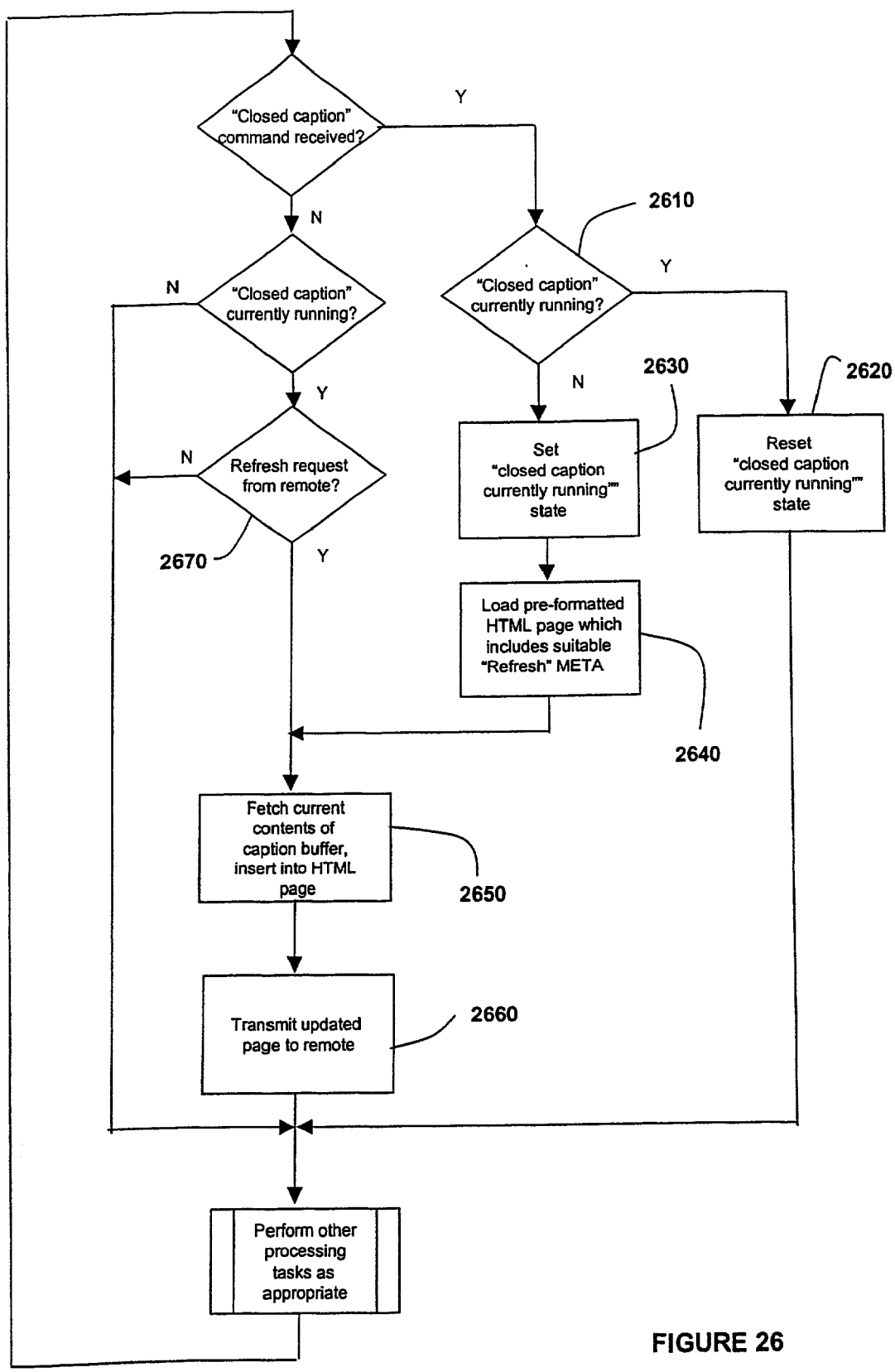
FIG. 26 illustrates an exemplary method for use in displaying closed captioning information using the system illustrated in FIG. 25.

To request that the device 2510 transmit the closed captioning information to the remote 10 for display on the LCD 24, the user may activate a soft key which will result in the transmission of a closed captioning request command from the remote control 10 to the device 2510. The transmission of the command can be accomplished using either the IR transmitter or the RF transmitter. Upon receipt of the closed captioning request command, as illustrated in FIG. 26, the device 2510 determines 2610 if it is currently in a closed captioning transmit mode. If the device 2510 is already sending closed captioning information to the remote control 10, via, for example, RF communication module 2550, the device 2510 ends this mode of operation, by clearing a flag used to indicate this operational mode 2620. If, however, the device 2510 is not presently sending closed captioning information to the remote control 10, the device 2510 sets the flag 2630 to indicate it has entered the closed captioning transmit mode of operation. It will be appreciated that the effect of this logic is to allow a single command (i.e., remote control button) to toggle the feature on and off by alternate presses. Other implementations are also possible, e.g., separate "on" and "off" buttons. On initially entering the closed caption transmit mode of operation, the device 2510 retrieves 2640 a pre-formatted Web page into which the closed captioning information will be placed.

To transmit the closed captioning information to the remote control 10 from the device 2510, the memory 2520 is accessed to load into the pre-formatted Web page the buffered closed captioning information 2650. The Web page containing the current closed caption information may then be transmitted 2660 to the remote control 10. When the device 2510 is in the transmit closed captioning information mode of operation, the steps of loading the current closed captioning information into the Web page and transmitting the Web page to the remote control 10 are repeated as requested by the remote control 10. This is accomplished by the remote control 10 issuing a closed captioning refresh request to the device 2510 which causes the device 2510, upon the receipt of the request 2670, to load the closed captioning information stored in the memory 2520 into the Web page and transmit the Web page to the remote control 10.

The rate at which the remote control issues such refresh requests is determined by the value contained in the special "Refresh" META statement in the HTML page loaded at step 2640. The value is preferably selected to adequately support the closed caption rate while taking into account the battery power consumption of the remote control. It will be appreciated that, in alternative applications where battery life is not a critical factor, for example, where the remote control unit is to be docked in a recharging base during closed caption display, the refresh interval can be made very small or even omitted entirely. In this manner, the remote control is continuously polling the device 2510 which can then refresh the display as often as is necessary to accommodate the streaming of information into memory 2520.

Using the above described procedure, the system can be further adapted to present "Fast news." In this regard, a "headline summary" feature can be implemented by storing the closed caption frames during a news broadcast and then displaying the captured frames as a scrollable text file on the display 24 of the remote control 10. In this regard, the fast news information can be stored in the memory 2520 of the device and accessed on request. Alternatively, the information could be placed into one or more Web pages that are transmitted to the remote control 10 and locally stored for later viewing. Still further, if the set top box or TV is equipped to communicate bi-directionally with the remote control 10, additional information about a show or event in progress (e.g. athlete statistics, actor biographies, etc.) could be displayed on the LCD 24 of the remote control 10 without interfering with the main picture on the TV screen. The information could be in the form of text or links to Web pages having the content which is accessible via the Internet. Again, this information would be received from an external source and transmitted to the remote control 10 by way of the device 2510.

The capabilities described above can further be used to allow the remote control 10 to communicate with an electronic device, such as a DVD player, CD player, etc. to display individual movie subtitles, karaoke lyrics, etc. on the display 24. This information could be transmitted in real-time or down-loaded and displayed in a manner synchronized with the electronic media using the procedure above-described. The display can be in paragraphs/verses, line-by-line or word-by-word. Also, since this information is conveyed to the remote control in HTML form, the subtitles, lyrics, etc. may comprise plain text data, graphic images, or a mixture of both.

Figure 24:
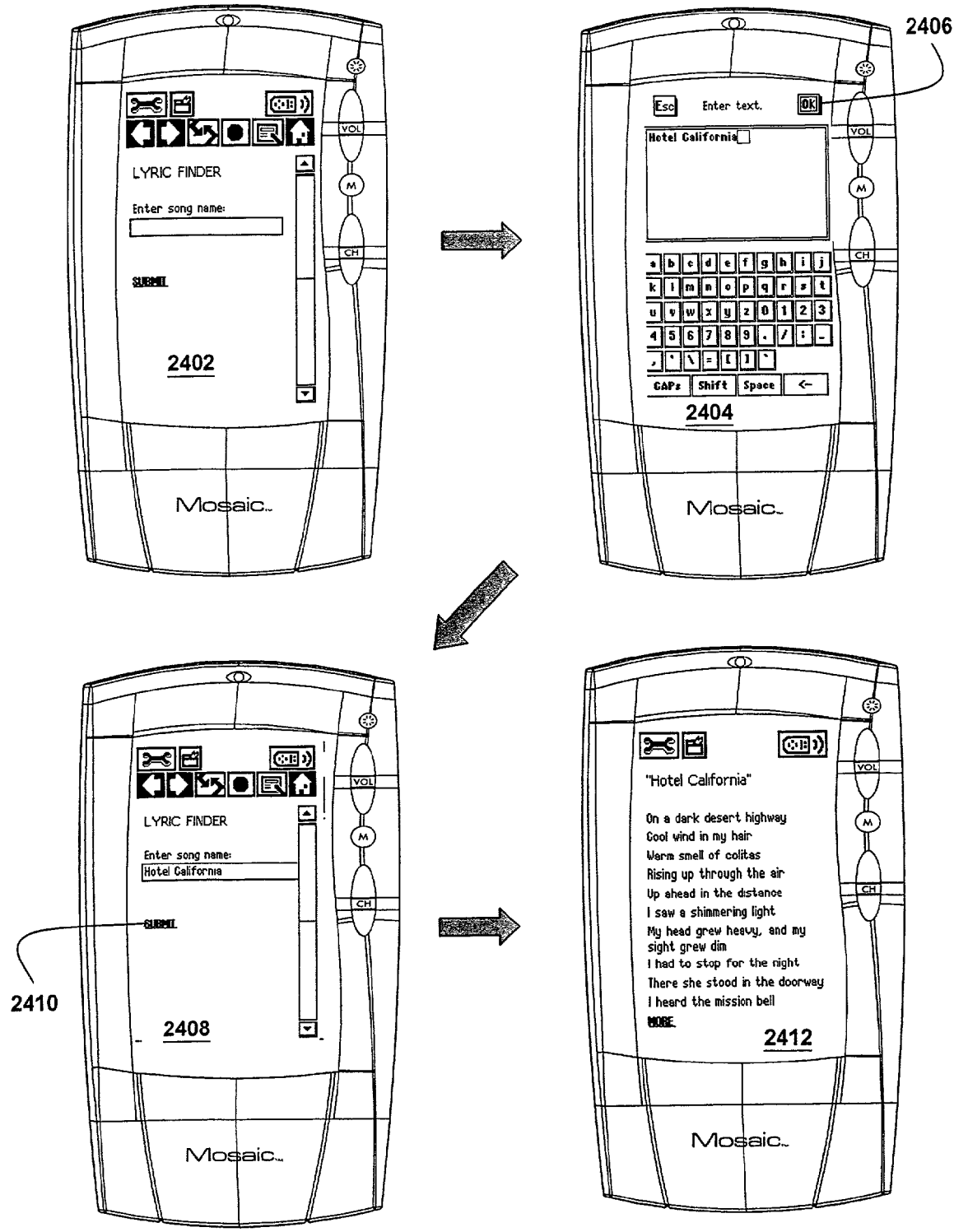
FIG. 24 illustrates an exemplary display of screens used to display song lyrics using the remote control illustrated in FIG. 1.

In yet another embodiment, FIG. 24 illustrates and application in which song lyrics may be obtained from a Web site using a personal computer 1420 or a set top box or other device 2510 as a gateway or proxy server. In this case, the first HTML page downloaded 2402 prompts the user to enter a song title. When the user activates the text entry field by touching within the indicated area, the Browser display can change to a keyboard arrangement 2404 (corresponding to HTML event 1018 shown in FIG. 10c) to allow entry of text data. On completion of text entry, the user can touch an "OK" soft button 2406 to return to the previous display (with the text data entered) 2408. Touching a "submit" soft button can be used to cause the text information to be transmitted back to the proxy server and, thereafter, to the Web site. In response, the Web site returns an HTML formatted data page to the proxy sever which page is transmitted to the remote control 10 to cause display of the appropriate lyrics 2412.

For displaying sub-titles for movies, etc. in a language that is not supported by the relevant media, the sub-titles etc. can be downloaded from a supporting Web site, kiosk, etc. In this regard, the information can be downloaded directly to the remote control 10, provided the memory is of sufficient size, or downloaded to a smart card or other releasable type of memory. It will be appreciated that, to support this latter described functionality, the remote control 10 can be adapted to include a releasable media reader or be adapted to communicate with releasable media reader. Synchronization of the playing of the media and the display of the sub-titles, etc. can be performed manually, e.g., by activating a key to initiate the reading and display of information from the memory at the time the movie, etc. Alternatively, a signal can be issued from the media player which will cause the remote control 10 to automatically initiate the reading and display of information from the memory at the time the movie, etc. Since a system and method for adapting a remote control to use a smart card is described in greater detail in U.S. Pat. No. 6,223,348 which is incorporated herein by reference in its entirety, it will not be discussed further for the sake of brevity.

Still further, the remote control 10 can be equipped with a bar code reader to facilitate the gathering of information related to programming the remote control 10, home appliances/consumer electronic devices, TV programming, etc. Alternatively, the bar code digits can be entered by the user. Use of a bar code to facilitate programming a remote control to match the consumer's equipment is disclosed in U.S. Pat. No. 6,225,938 entitled "Universal Remote Control System with Bar Code Setup" which is incorporated herein by reference in its entirety. In addition, use of a bar code reader allows the remote control 10 to retrieve information indicative of an item/article and, thereafter, display information relevant to the item/article (e.g., instructions, warnings, nutritional info, spare part lists, command codes for controlling its operation, etc.). Furthermore, the UPC/Bar code information could be used as a pointer to Web sites on the Internet. This bar code could be a standard Universal Product Code (UPC) or could be a special bar code format intended for use only with the remote control.

Figure 29:
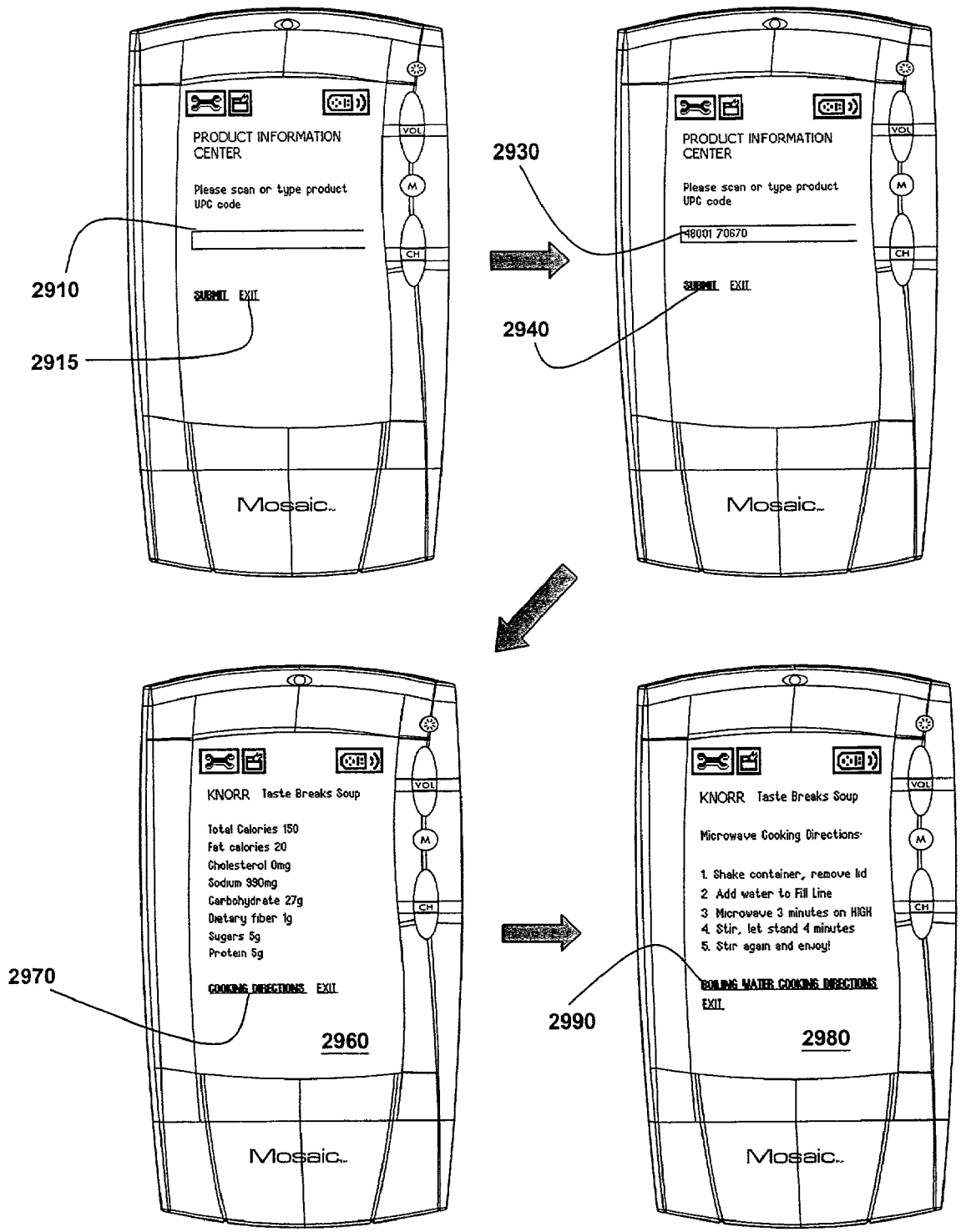
FIG. 29 illustrates an exemplary display of screens used to provide additional information about a product whose UPC bar code has been entered using a bar code reader attached to the remote control illustrated in FIG. 1.

In an exemplary implementation, a bar code reader module with a serial interface, such as are available from Symbol Technologies Inc., can be attached through the general purpose serial I/O connection 108 and UART port 330. This bar code reader module may be physically incorporated into the housing 13 of the remote control, or may be in the form of a self contained external module connected via a cable to the serial I/O jack 61. When so equipped, the bar code reader can be used as an alternative to the keyboard for entry of data into input fields in HTML pages. By way of example, FIG. 29 illustrates an application in which a consumer can obtain additional information regarding a product from the Internet, the remote control communicating with the Internet in a manner similar to that previously described in connection with FIGS. 14–15.

To request information in this manner, the user would initially request an HTML page containing an input field 2910 into which a UPC code is entered, either via the keyboard or by scanning the product itself with the bar code reader. Preferably keyboard entry is provided as a backup in the event the UPC bar code label on the product is damaged, obscured, unreachable, or the like. An "EXIT" button 2915 is also provided on this and subsequent pages so that the user can return to the Browser Application start page or other designated beginning point at any time. After capture of the UPC code 2930 by scanning the product with the bar code reader, selecting the "SUBMIT" 2940 button causes the remote control Browser Application to transmit the UPC code data back to the URL from which the initial HTML page originated. At the originating site, this data can be used to directly index into a database of product information or, alternatively, may be used to index into a table of other URLs (corresponding to manufacturer Web pages, for example) to transfer the request to a specific site from which the appropriate information is available. In either event, the resulting response is the transmission of a page of HTML formatted data back to the remote control 10 to cause display of the desired product information 2960. This page of information can itself contain link(s) to additional page(s) of information as seen in this example where selecting "COOKING DIRECTIONS" 2970 results in the display of a secondary page of information 2980, which in turn can contain a link 2990 to yet another page, and so on. In this manner all needed product information can be made available to a consumer.

The bar code reader may also be used in many other Internet based applications implemented in a similar manner to that described above for example, grocery shopping, on line warranty registration, product and/or price comparisons, and the like. It may also be used as an alternative input means during the process of acquiring song lyrics or user manual information as described earlier, by swiping the UPC on the product packaging in place of manually entering text or setup data.

Figure 17:
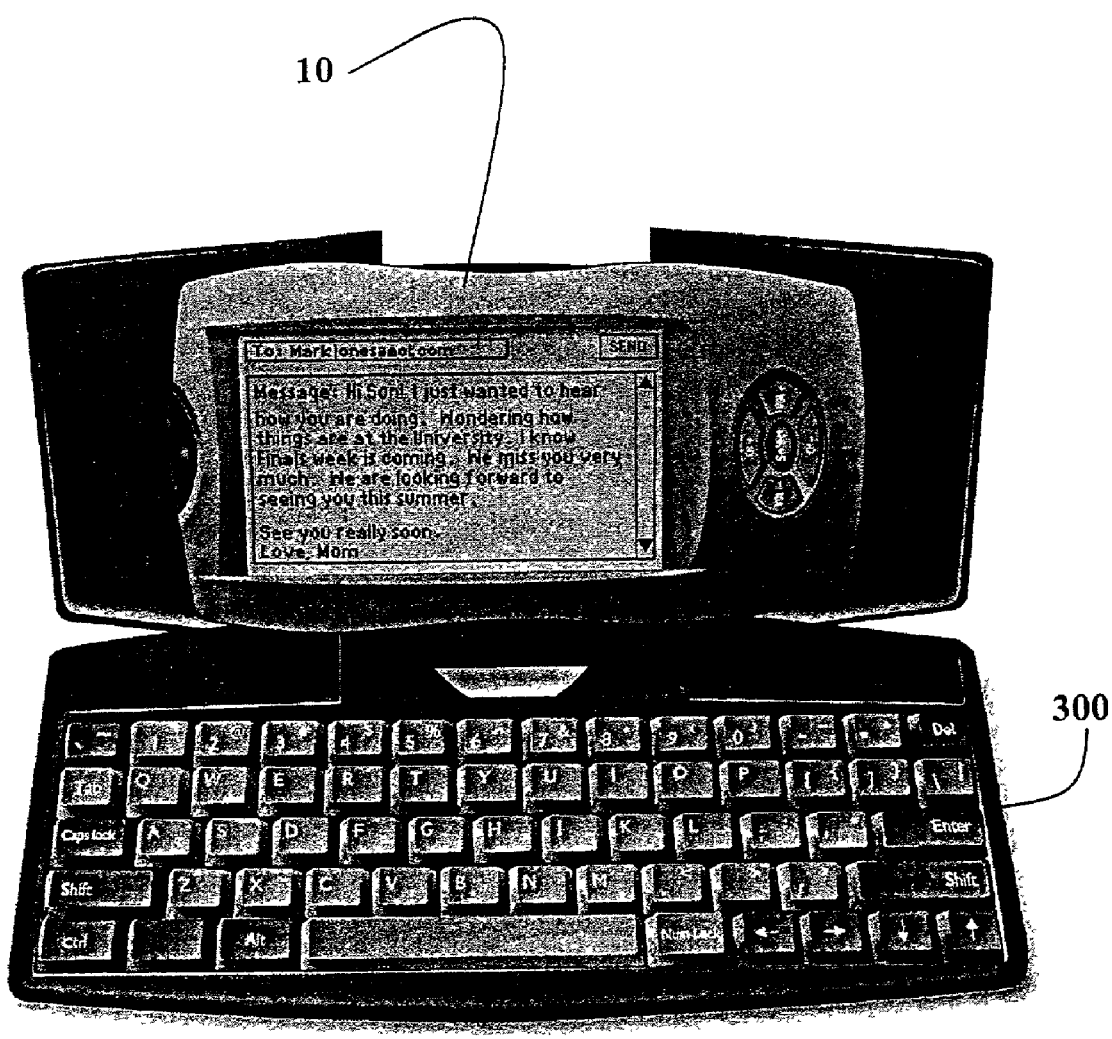
FIG. 17 illustrates the universal remote control illustrated in FIG. 1 docked to an optional keyboard.

For use in facilitating interaction with the Internet and/or other modes of communication both wireless and wired, the remote control 10 can be adapted to dock to a keyboard. A view of the remote control 10 used in a landscape mode is illustrated in FIG. 17. In this manner, the keyboard 300 and the remote control 10 can communicate such that the remote control 10 can be used for sending email, talking in Internet chat rooms, etc. Communications via a network Internet would occur in a manner similar to that described in connection with FIGS. 14–15.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A system, comprising:
   a hand-held device having a display; and
   a consumer appliance having an application for reading closed captioning information from a video signal and for loading the closed captioning information read from the video signal into a pre-formatted mark-up language page;
   wherein the hand-held device and the consumer appliance are adapted to communicate such that the consumer appliance can transmit the mark-up language page to the hand-held device and the hand-held device can display the mark-up language page including a representation of the closed captioning information in the display.

2. The system as recited in claim 1, wherein the hand-held device comprises a memory for storing the mark-up language page and a program for replaying the stored closed captioning information included in the mark-up language page.

3. The system as recited in claim 1, wherein the hand-held device comprises a browser application for displaying the mark-up language page in the display.

4. The system as recited in claim 1, wherein the hand-held device comprises a remote-control having a memory in which is stored command codes for commanding the operation of a plurality of different consumer appliances.

5. The system as recited in claim 1, wherein the hand-held device periodically transmits requests to the consumer appliance to receive a refresh of the mark-up language page.

6. The system as recited in claim 5, wherein the requests are periodically transmitted at a refresh time interval specified within a field within the mark-up language page.

7. A system, comprising:
   a hand-held device having a display; and
   a karaoke device having an application for reading song lyrics from a recorded media and for loading the song lyrics read from the recorded media into a pre-formatted mark-up language page;
   wherein the hand-held device and the karaoke device are adapted to communicate such that the karaoke device can transmit the mark-up language page to the hand-held device and the hand-held device can display the mark-up language page including a representation of the song lyrics in the display.

8. A system, comprising:
   a hand-held device having a display; and
   a consumer appliance having an application for reading movie sub-titles from a recorded media and for loading the movie sub-titles read from the recorded media into a pre-formatted mark-up language page;
   wherein the hand-held device and the consumer appliance are adapted to communicate such that the consumer appliance can transmit the mark-up language page to the hand-held device and the hand-held device can display the mark-up language page including a representation of the movie sub-titles in the display.

9. The system as recited in claim 8, wherein the recorded media is a digital video disc.

10. In a hand-held device having a display operable in connection with a consumer appliance having an application for reading closed captioning information from a video signal, a method for displaying information related to a viewed program, comprising:
   transmitting to the consumer appliance a request to receive a mark-up language page including information indicative of the closed captioning information and a field which specifies a refresh time interval; and
   displaying the received mark-up language page including the information indicative of the closed captioning information in the display;

wherein the request to receive information is periodically transmitted at the refresh time interval specified within the field included within the mark-up language page.

11. The method as recited in claim 10, wherein the hand-held device comprises a browser application for displaying the mark-up language page received from the consumer appliance in which is placed the closed captioning information.

12. The method as recited in claim 10, further comprising the step of storing the closed captioning information and the step of displaying is performed in response to activation of a key associated with the hand-held device.

13. A readable media having instructions for displaying information, comprising:

transmitting to a consumer appliance a request to receive a mark-up language page including the information and a field which specifies a refresh time interval; and displaying the received mark-up language page including the information in the display;

wherein the request to receive information is periodically transmitted at the refresh time interval specified within the field included within the mark-up language page.

14. The readable media as recited in claim 13, wherein the hand-held device comprises a browser application for displaying the mark-up language page received from the consumer appliance.

15. The readable media as recited in claim 14, wherein the instructions further perform the step of storing the information and wherein the step of displaying is performed in response to activation of a key associated with the hand-held device.

* * * * *